(12) United States Patent
McNamer et al.

(10) Patent No.: US 10,080,012 B2
(45) Date of Patent: Sep. 18, 2018

(54) METHODS, SYSTEMS, AND COMPUTER-READABLE STORAGE MEDIA FOR GENERATING THREE-DIMENSIONAL (3D) IMAGES OF A SCENE

(71) Applicant: 3DMedia Corporation, Durham, NC (US)

(72) Inventors: Michael McNamer, Apex, NC (US); Marshall Robers, Durham, NC (US); Tassos Markas, Chapel Hill, NC (US); Jason Paul Hurst, Cary, NC (US)

(73) Assignee: 3DMedia Corporation, Durham, NC (US)

(*) Notice: Subject to any disclaimer, the term of this patent is extended or adjusted under 35 U.S.C. 154(b) by 53 days.

(21) Appl. No.: 15/193,623

(22) Filed: Jun. 27, 2016

(65) Prior Publication Data

US 2016/0309137 A1    Oct. 20, 2016

Related U.S. Application Data

(63) Continuation of application No. 13/115,459, filed on May 25, 2011, now Pat. No. 9,380,292, which is a (Continued)

(51) Int. Cl.
*H04N 13/00* (2018.01)
*H04N 13/221* (2018.01)
(Continued)

(52) U.S. Cl.
CPC .......... *H04N 13/221* (2018.05); *G06T 7/593* (2017.01); *G06T 7/596* (2017.01); *H04N 5/23293* (2013.01); *H04N 13/026* (2013.01); *H04N 13/0221* (2013.01); *H04N 13/0257* (2013.01); *H04N 13/257* (2018.05); *H04N 13/261* (2018.05)

(58) Field of Classification Search
CPC ...................................................... H04N 13/00
USPC ....................................................... 348/42–60
See application file for complete search history.

(56) References Cited

U.S. PATENT DOCUMENTS

2011/0025829 A1* 2/2011 McNamer ............ H04N 13/021
348/50

OTHER PUBLICATIONS

Notice of Allowance (Corrected) for related U.S. Appl. No. 14/447,578 dated Jan. 6, 2017.

* cited by examiner

*Primary Examiner* — Andy Rao
(74) *Attorney, Agent, or Firm* — Olive Law Group, PLLC

(57) ABSTRACT

Disclosed herein are methods, systems, and computer-readable storage media for generating three-dimensional (3D) images of a scene. According to an aspect, a method includes capturing a real-time image and a first still image of a scene. Further, the method includes displaying the real-time image of the scene on a display. The method also includes determining one or more properties of the captured images. The method also includes calculating an offset in a real-time display of the scene to indicate a target camera positional offset with respect to the first still image. Further, the method includes determining that a capture device is in a position of the target camera positional offset. The method also includes capturing a second still image. Further, the method includes correcting the captured first and second still images. The method also includes generating the three-dimensional image based on the corrected first and second still images.

20 Claims, 41 Drawing Sheets

Related U.S. Application Data continuation-in-part of application No. 12/842,084, filed on Jul. 23, 2010, now Pat. No. 8,508,580, said application No. 13/115,459 is a continuation-in-part of application No. 12/842,171, filed on Jul. 23, 2010, now Pat. No. 8,436,893.

(60) Provisional application No. 61/230,131, filed on Jul. 31, 2009, provisional application No. 61/230,133, filed on Jul. 31, 2009.

(51) Int. Cl.
*H04N 13/257* (2018.01)
*H04N 13/261* (2018.01)
*H04N 13/02* (2006.01)
*H04N 5/232* (2006.01)
*G06T 7/593* (2017.01)

METHODS, SYSTEMS, AND COMPUTER-READABLE STORAGE MEDIA FOR GENERATING THREE-DIMENSIONAL (3D) IMAGES OF A SCENE

CROSS REFERENCE TO RELATED APPLICATIONS

This application is a continuation application of pending U.S. utility patent application Ser. No. 13/115,459, filed May 25, 2011, which is a continuation-in-part application of pending U.S. utility patent application Ser. No. 12/842,084 (now U.S. Pat. No. 8,508,580), filed Jul. 23, 2010, which claims the benefit of U.S. provisional patent application Ser. No. 61/230,131, filed Jul. 31, 2009; the disclosures of which are incorporated herein by reference in their entireties. Also, this application claims priority to U.S. utility patent application Ser. No. 13/115,459, which claims the benefit of U.S. utility patent application Ser. No. 12/842,171 (now U.S. Pat. No. 8,436,893), filed Jul. 23, 2010, which claims the benefit of U.S. provisional patent application Ser. No. 61/230,133, filed Jul. 31, 2009; the disclosures of which are incorporated herein by reference in their entireties.

TECHNICAL FIELD

The subject matter disclosed herein relates to generating an image of a scene. In particular, the subject matter disclosed herein relates to methods, systems, and computer-readable storage media for generating three-dimensional images of a scene.

BACKGROUND

Stereoscopic, or three-dimensional, imagery is based on the principle of human vision. Two separate detectors detect the same object or objects in a scene from slightly different positions and/or angles and project them onto two planes. The resulting images are transferred to a processor which combines them and gives the perception of the third dimension, i.e. depth, to a scene.

Many techniques of viewing stereoscopic images have been developed and include the use of colored or polarizing filters to separate the two images, temporal selection by successive transmission of images using a shutter arrangement, or physical separation of the images in the viewer and projecting them separately to each eye. In addition, display devices have been developed recently that are well-suited for displaying stereoscopic images. For example, such display devices include digital still cameras, personal computers, digital picture frames, set-top boxes, high-definition televisions (HDTVs), and the like.

The use of digital image capture devices, such as digital still cameras, digital camcorders (or video cameras), and phones with built-in cameras, for use in capturing digital images has become widespread and popular. Because images captured using these devices are in a digital format, the images can be easily distributed and edited. For example, the digital images can be easily distributed over networks, such as the Internet. In addition, the digital images can be edited by use of suitable software on the image capture device or a personal computer.

Digital images captured using conventional image capture devices are two-dimensional. It is desirable to provide methods and systems for using conventional devices for generating three-dimensional images. In addition, it is desirable to provide methods and systems for aiding users of image capture devices to select appropriate image capture positions for capturing two-dimensional images for use in generating three-dimensional images. Further, it is desirable to provide methods and systems for altering the depth perceived in three-dimensional images.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

Disclosed herein are methods, systems, and computer-readable storage media for generating three-dimensional (3D) images of a scene. According to an aspect, a method includes using at least one processor and at least one image capture device for capturing a real-time image and a first still image of a scene. Further, the method includes displaying the real-time image of the scene on a display. The method also can include determining one of an image sensor property, optical property, focal property, and viewing property of the captured images. The method also includes calculating one of camera positional offset and pixel offset indicia in a real-time display of the scene to indicate a target camera positional offset with respect to the first still image based on the captured images and potentially one of the image sensor property, optical property, focal property, and viewing property of the captured images. Further, the method includes determining that the at least one capture device is in a position of the target camera positional offset. The method also includes capturing a second still image. Further, the method includes correcting the captured first and second still images to compensate for at least one of camera vertical shift, vertical tilt, horizontal tilt, and rotation. The method also includes generating the three-dimensional image based on the corrected first and second still images.

According to another aspect, a method for generating a three-dimensional image includes using at least one processor for receiving, from an image capture device, a plurality of images of a scene from different positions from an image capture device. The method also includes determining attributes of the images. Further, the method includes generating, based on the attributes, a pair of images from the plurality of images for use in generating a three-dimensional image. The method also includes correcting the pair of images to compensate for one of camera vertical shift, vertical tilt, horizontal tilt, and rotation. Further, the method includes generating a three-dimensional image based on the corrected pair of images.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

Figure 1:
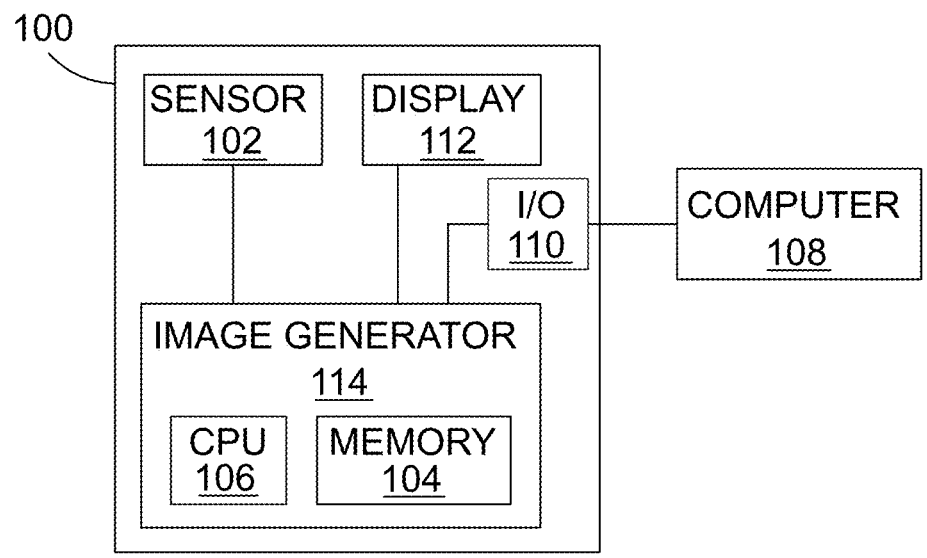
FIG. 1 is a block diagram of an exemplary device for generating three-dimensional images of a scene according to embodiments of the presently disclosed subject matter.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Embodiments of the presently disclosed subject matter are based on technology that allows a user to capture a plurality of different images of the same object within a scene and to generate one or more stereoscopic images using the different images. Particularly, methods in accordance with the present subject matter provide assistance to camera users in capturing pictures that can be subsequently converted into high-quality three-dimensional images. The functions disclosed herein can be implemented in hardware and/or software that can be executed within, for example, but not limited to, a digital still camera, a video camera (or camcorder), a personal computer, a digital picture frame, a set-top box, an HDTV, a phone, or the like. A mechanism to automate the image capture procedure is also described herein.

Methods, systems, and computer program products for selecting an image capture position to generate a three-dimensional image in accordance with embodiments of the present subject matter are disclosed herein. According to one or more embodiments of the present subject matter, a method includes determining a plurality of first guides associated with a first still image of a scene. The method can also include displaying a real-time image of the scene on a display. Further, the method can include determining a plurality of second guides associated with the real-time image. The method can also include displaying the first and second guides on the display for guiding selection of a position of an image capture device to automatically or manually capture a second still image of the scene, as well as any images in between in case the image capture device is set in a continuous image capturing mode, for pairing any of the captured images as a stereoscopic pair of a three-dimensional image. Such three-dimensional images can be viewed or displayed on a suitable stereoscopic display.

The functions and methods described herein can be implemented on a device capable of capturing still images, displaying three-dimensional images, and executing computer executable instructions on a processor. The device may be, for example, a digital still camera, a video camera (or camcorder), a personal computer, a digital picture frame, a set-top box, an HDTV, a phone, or the like. The functions of the device may include methods for rectifying and registering at least two images, matching the color and edges of the images, identifying moving objects, removing or adding moving objects from or to the images to equalize them, altering the perceived depth of objects, and any final display-specific transformation to generate a single, high-quality three-dimensional image. The techniques described herein may be applied to still-captured images and video images, which can be thought of as a series of images; hence for the purpose of generalization the majority of the description herein is limited to still-captured image processing.

Methods, systems, and computer program products for generating one or more three-dimensional images of a scene are disclosed herein. The three-dimensional images can be viewed or displayed on a stereoscopic display. The three-dimensional images may also be viewed or displayed on any other display capable of presenting three-dimensional images to a person using other suitable equipment, such as, but not limited to, three-dimensional glasses. In addition, the functions and methods described herein may be implemented on a device capable of capturing still images, displaying three-dimensional images, and executing computer executable instructions on a processor. The device may be, for example, a digital still camera, a video camera (or camcorder), a personal computer, a digital picture frame, a set-top box, an HDTV, a phone, or the like. Such devices may be capable of presenting three-dimensional images to a person without additional equipment, or if used in combination with other suitable equipment such as three-dimensional glasses. The functions of the device may include methods for rectifying and registering at least two images, matching the color and edges of the images, identifying moving objects, removing or adding moving objects from or to the images to equalize them, altering a perceived depth of objects, and any final display-specific transformation to generate a single, high-quality three-dimensional image. The techniques described herein may be applied to still-captured images and video images, which can be thought of as a series of images; hence for the purpose of generalization the majority of the description herein is limited to still-captured image processing.

In accordance with embodiments, systems and methods disclosed herein can generate and/or alter a depth map for an image using a digital still camera or other suitable device. Using the depth map for the image, a stereoscopic image pair and its associated depth map may be rendered. These processes may be implemented by a device such as a digital camera or any other suitable image processing device.

It should be noted that any of the processes and steps described herein may be implemented in an automated fashion. For example, any of the methods and techniques described herein may be automatically implemented without user input after the capture of a plurality of images.

FIG. 1 illustrates a block diagram of an exemplary image capture device 100 for generating three-dimensional images of a scene according to embodiments of the presently disclosed subject matter. In this example, device 100 is a digital camera capable of capturing several consecutive, still digital images of a scene. In another example, the device 100 may be a video camera capable of capturing a video sequence including multiple still images of a scene. A user of the device 100 may position the camera in different positions for capturing images of different perspective views of a scene. The captured images may be suitably stored, analyzed and processed for generating three-dimensional images as described herein. For example, subsequent to capturing the images of the different perspective views of the scene, the device 100, alone or in combination with a computer, may use the images for generating a three-dimensional image of the scene and for displaying the three-dimensional image to the user.

Referring to FIG. 1, the device 100 may include a sensor array 102 of charge coupled device (CCD) or CMOS sensors which may be exposed to a scene through a lens and exposure control mechanism as understood by those of skill in the art. The device 100 may also include analog and digital circuitry such as, but not limited to, a memory 104 for storing program instruction sequences that control the device 100, together with a CPU 106, in accordance with embodiments of the presently disclosed subject matter. The CPU 106 executes the program instruction sequences so as to cause the device 100 to expose the sensor array 102 to a scene and derive a digital image corresponding to the scene. The digital image may be captured and stored in the memory 104. All or a portion of the memory 104 may be removable, so as to facilitate transfer of the digital image to other devices such as a computer 108. Further, the device 100 may be provided with an input/output (I/O) interface 110 so as to facilitate transfer of digital image even if the memory 104 is not removable. The device 100 may also include a display 112 controllable by the CPU 106 and operable to display the captured images in real-time for real-time viewing by a user.

Figure 2:
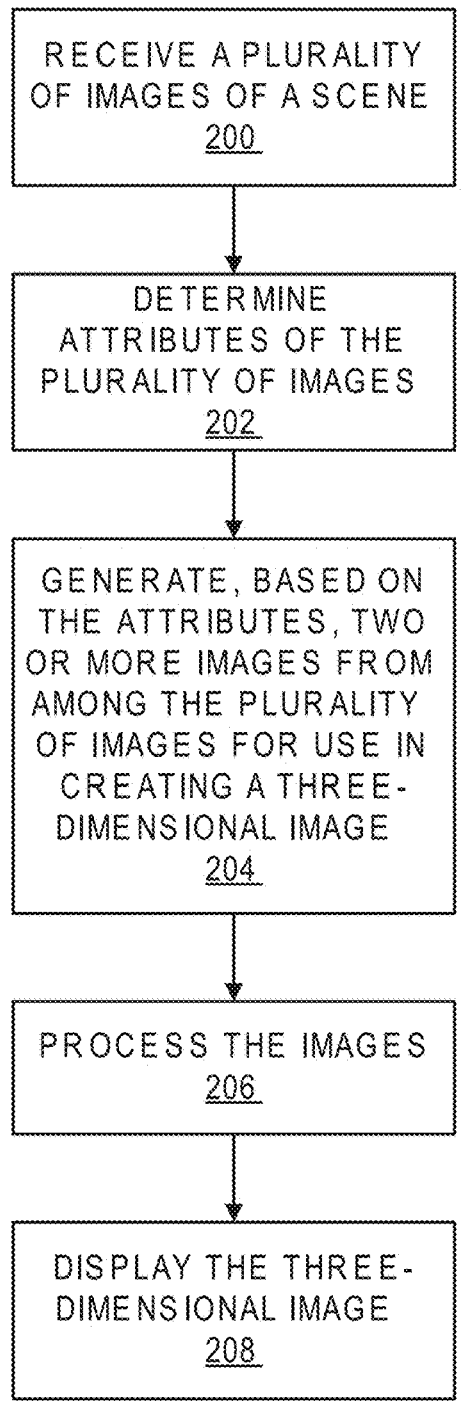
FIG. 2 is a flow chart of an exemplary method for generating a three-dimensional image of a scene using the device shown in FIG. 1, alone or together with any other suitable device, in accordance with embodiments of the present disclosure.
Figure 3A:
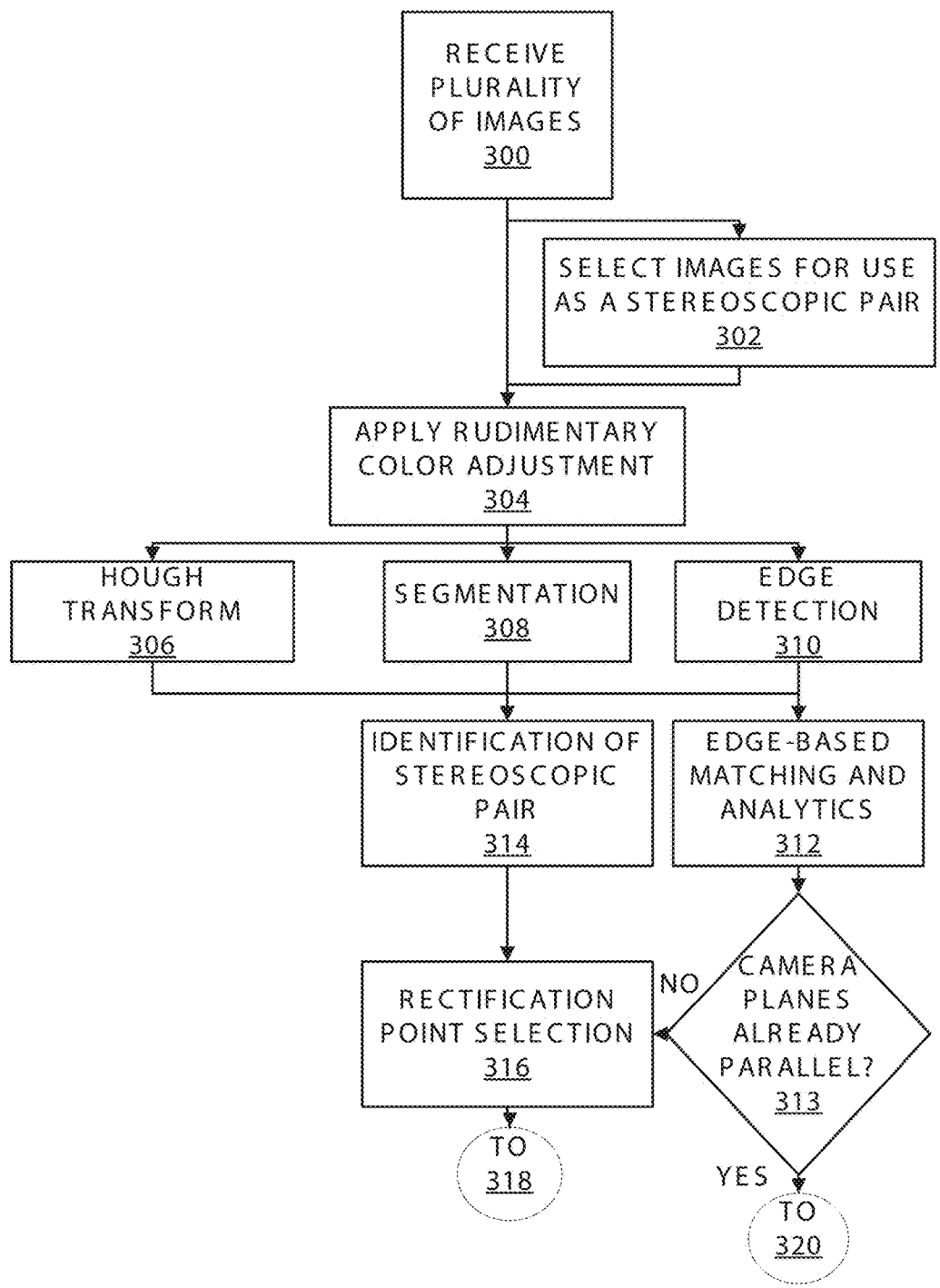
FIGS. 3A-3D illustrate a flow chart of an exemplary method for generating a three-dimensional image of a scene in accordance with embodiments of the present subject matter.
Figure 3B:
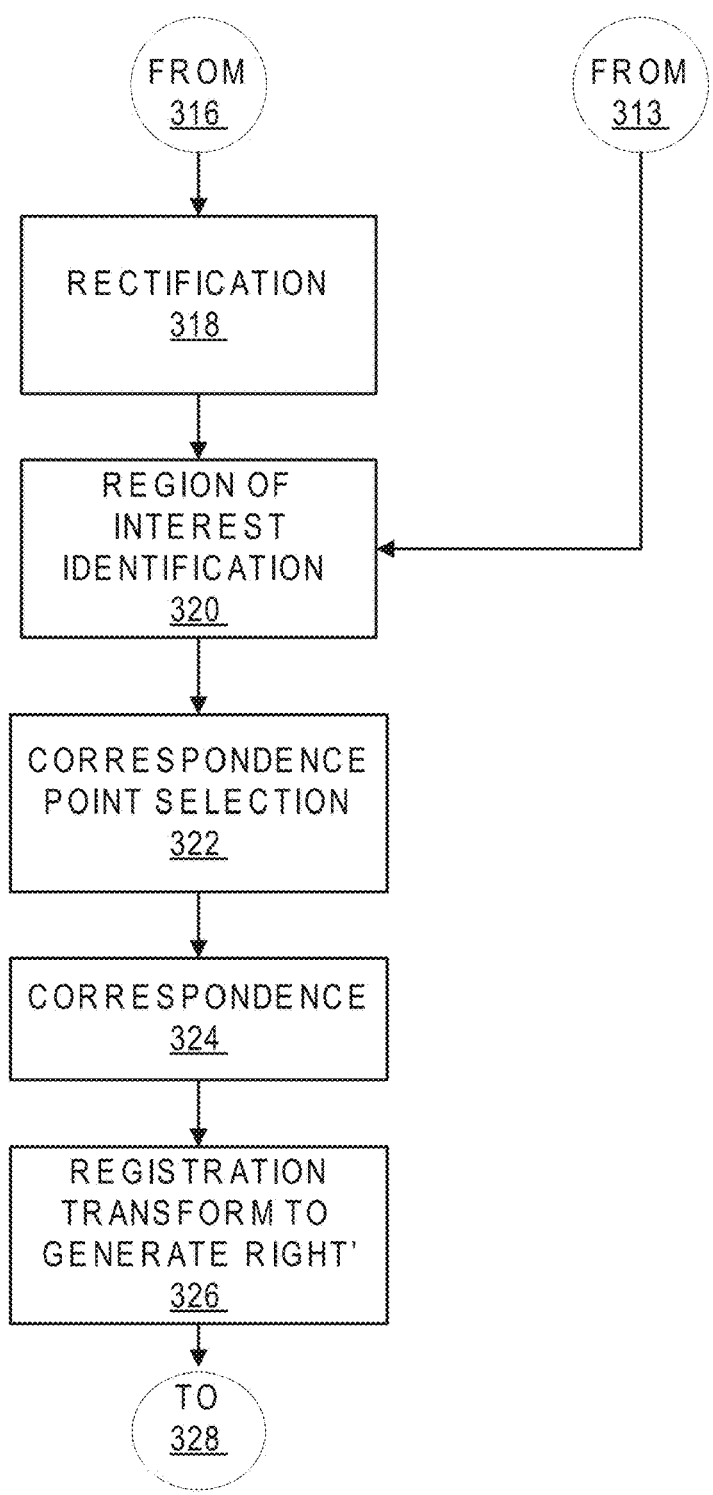
Figure 3C:
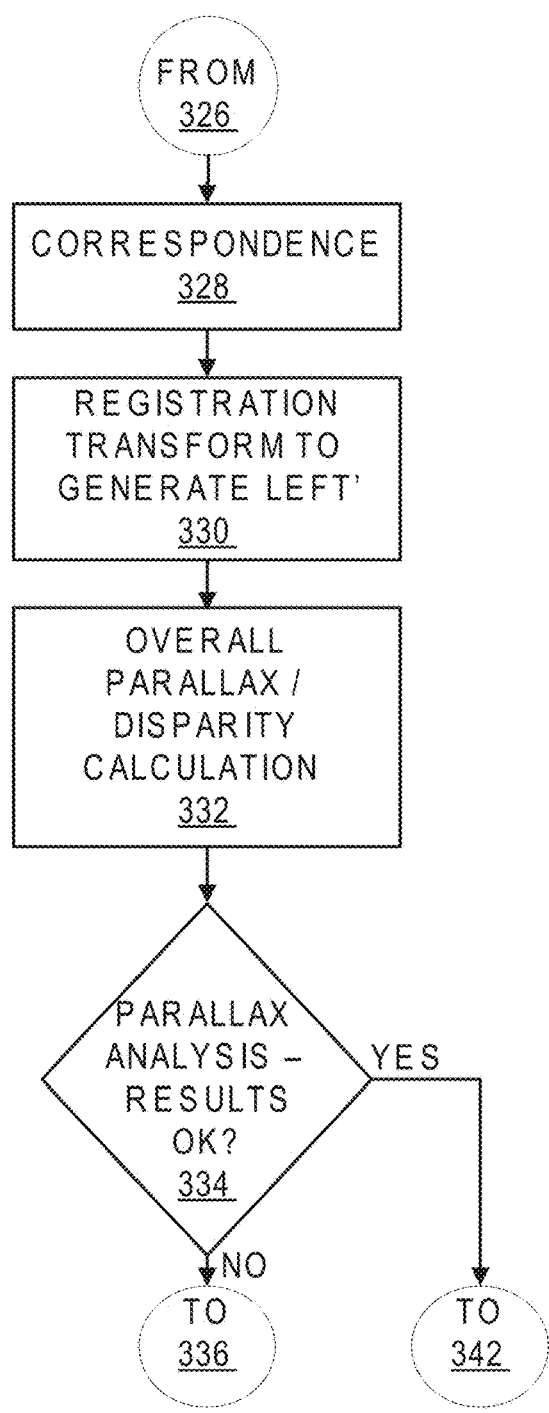
Figure 3D:
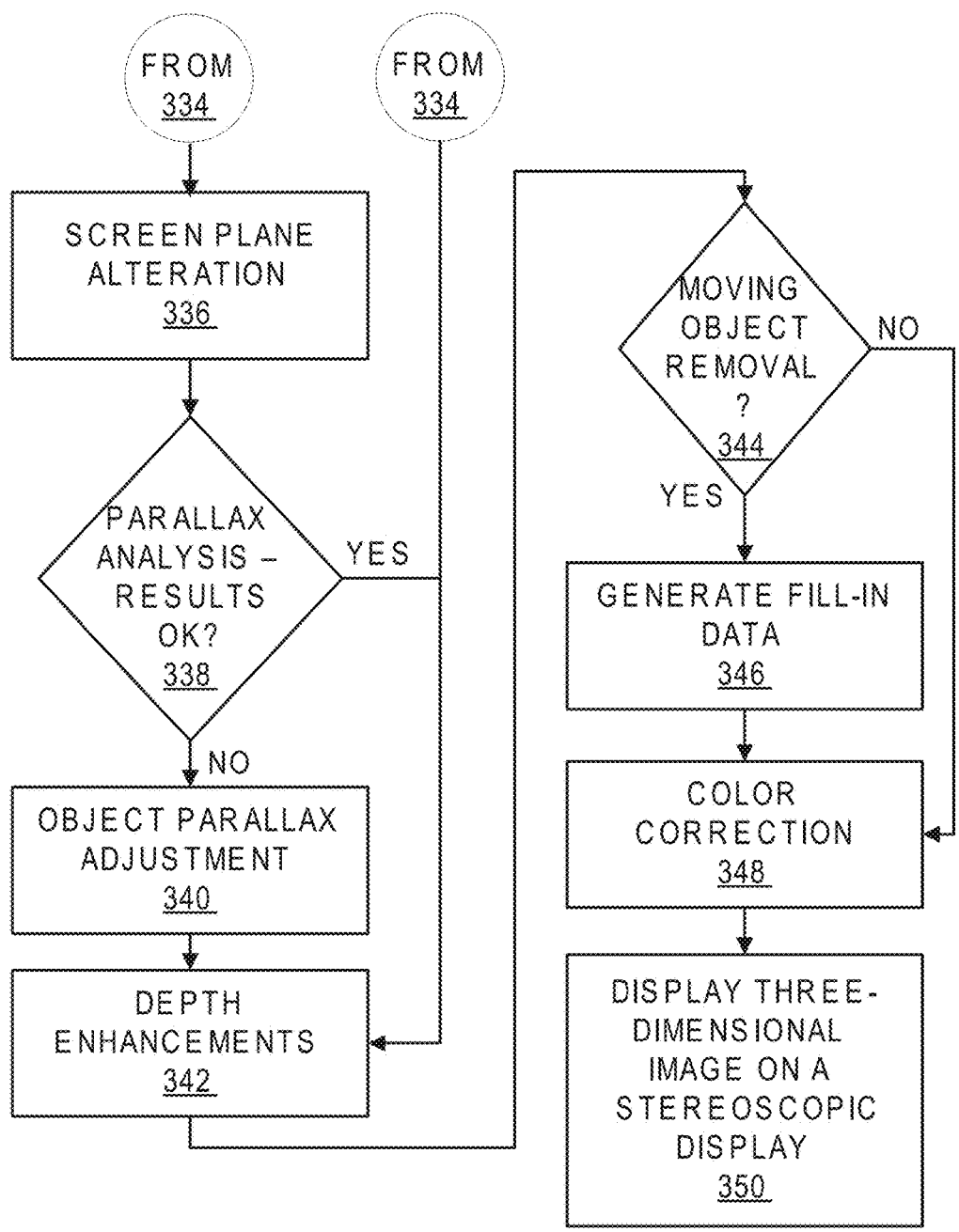

The memory 104 and the CPU 106 may be operable together to implement an image generator function 114 for generating three-dimensional images in accordance with embodiments of the presently disclosed subject matter. The image generator function 114 may generate a three-dimensional image of a scene using two or more images of the scene captured by the device 100. FIG. 2 illustrates a flow chart of an exemplary method for generating a three-dimensional image of a scene using the device 100, alone or together with any other suitable device, in accordance with embodiments of the present disclosure. Referring to FIG. 2, the method includes receiving 200 a plurality of images of a scene. For example, the device 100 may capture one or more real-time images. Further, for example, a user of the device 100 may use the input features of the device and move the device to different positions for capturing multiple images of a scene to which the sensor array 102 is exposed. The different images can include images of different perspective views of the scene. The CPU 106 may then implement instructions stored in the memory 104 for storing the captured images in the memory 104.

The method of FIG. 2 includes determining 202 attributes of the plurality of images. For example, attributes of an image captured by an image capture device may include, but are not limited to, analysis of color(s), including mean, standard deviation, histogram correlation, cross correlation, edges, junctions, identified objects, size, orientation, and timestamps of images. For each captured image, the image generator function 114 can determine one or more attributes. Additional exemplary details of determining attributes of images are provided herein.

The method of FIG. 2 also includes generating 204, based on the attributes, two or more images from among the plurality of images for use in generating a three-dimensional image. For example, the image generator function 114 may compare the measured value of an attribute of one image to the measured value of an attribute of another image for determining a difference of the measured values. The image generator function 114 may then determine whether the difference meets a threshold value level. If the threshold criterion is met, the image generator function 114 determines that the images may be selected for use in generating a three-dimensional image. This process may be used for preliminarily and efficiently determining whether images are candidates for pairing as a three-dimensional image as described in further detail herein.

The generated two or more images may also be suitably processed 206. For example, the images may be corrected and adjusted for display as described herein.

The method of FIG. 2 includes displaying 206 the three-dimensional image. For example, the three-dimensional image may be displayed on the display 112. In another example, the three-dimensional image may be communicated to and displayed on another device such as, but not limited to, a computer, video camera, digital picture frame, a set-top box, and a high-definition television.

Although the above examples are described for use with a device capable of capturing images, embodiments of the present subject matter described herein are not so limited. Particularly, the methods described herein for generating a three-dimensional image of a scene may for example be implemented in any suitable system including a memory and computer processor. The memory may have stored therein computer-executable instructions. The computer processor may execute the computer-executable instructions. The memory and computer processor may be configured for implementing methods in accordance with embodiments of the subject matter described herein.

FIGS. 3A-3D illustrate a flow chart of an exemplary method for generating a three-dimensional image of a scene in accordance with embodiments of the present subject matter. The method can convert a plurality of images to a three-dimensional image that can be viewed on a stereoscopic display. Referring to FIGS. 3A-3D, the method can begin with receiving 300 a plurality of images of a scene. For example, the images can be captured by a standard digital video or still camera, or a plurality of different cameras of the same type or different type. A camera user may capture an initial image. Next, the camera user may capture subsequent image(s) at positions to the left or right of the position at which the initial image was captured. These images may be captured as still images or as a video sequence of images. The images may be captured using a device such as the device 100 shown in FIG. 1. The images may be stored in a memory such as the memory 104 shown in FIG. 1. In another example, the images may be received at a device after they have been captured by a different device.

Figure 4A:
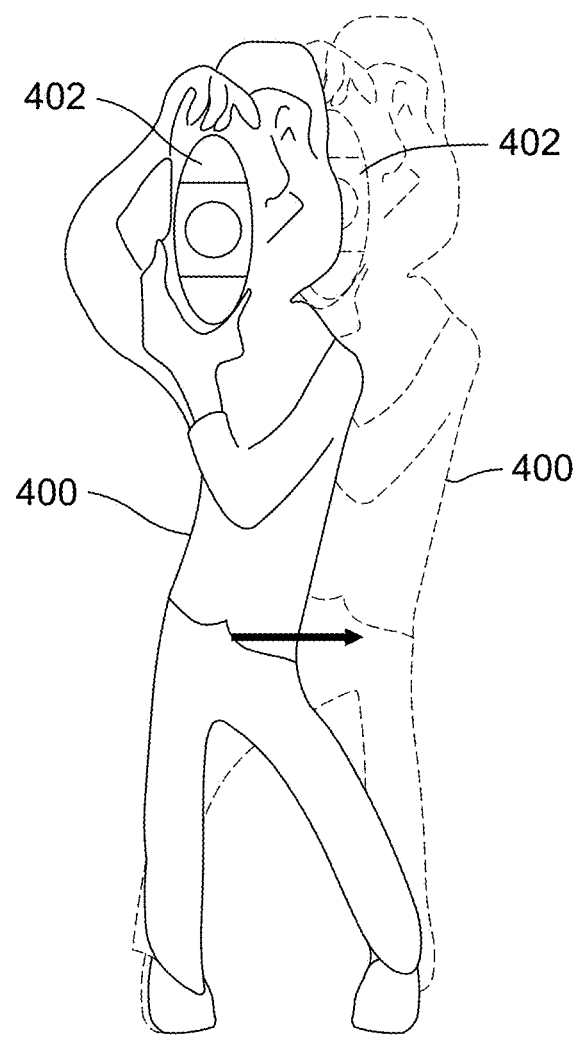
FIG. 4A is a front view of a user moving between positions for capturing different images using a camera in accordance with embodiments of the present subject matter.

Images suitable for use as a three-dimensional image may be captured by a user using any suitable technique. For example, FIG. 4A illustrates a front view of a user 400 moving between positions for capturing different images using a camera 402 in accordance with embodiments of the present subject matter. Referring to FIG. 4A, the user 400 is shown in solid lines in one position for capturing an image using the camera 402. The user 400 is shown in broken lines in another position for capturing another image using the camera 402. The camera 402 is also at different positions for capturing images offering different perspective views of a scene. In this example, the user 400 stands with his or her feet separated by a desired binocular distance, then captures the first image while aligning the camera over his or her right foot (the position of the user 400 shown in solid lines). Then the user captures the second image, and possibly other images in between, while aligning the camera 402 over his or her left foot (the position of the user 400 shown in broken lines). The captured images may be used for generating a three-dimensional image in accordance with embodiments of the present subject matter.

Figure 4B:
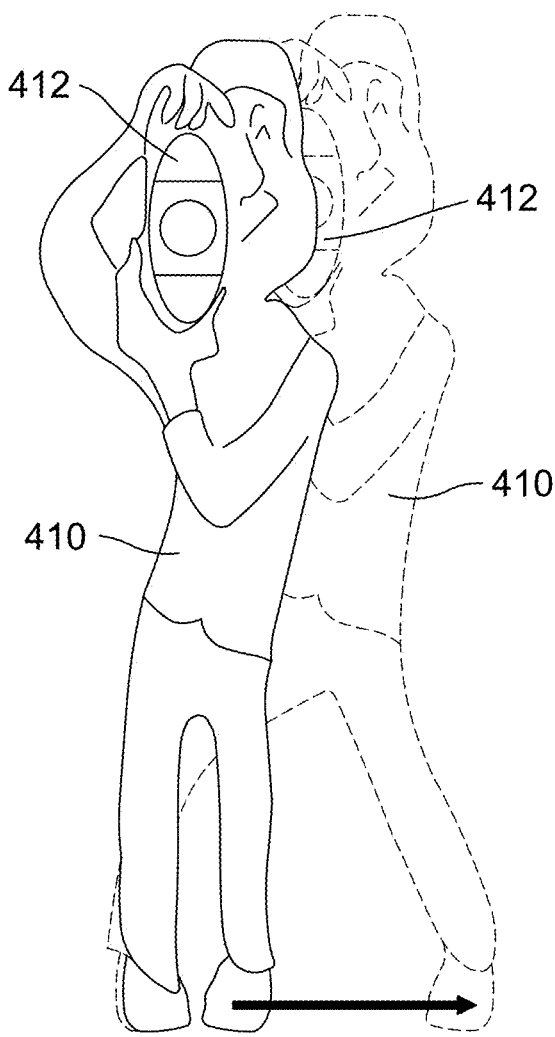
FIG. 4B is a front view of a user moving between positions for capturing images using a camera in accordance with embodiments of the present subject matter.

In another example, FIG. 4B illustrates a front view of a user 410 moving between positions for capturing different images of a scene using a camera 412 in accordance with embodiments of the present subject matter. Referring to FIG. 4B, the user 410 stands with his or her feet together and uses the camera 412 to capture the first image while maintaining a centered pose (the position of the user 410 shown in solid lines). Then the user moves one of his or her feet away from the other by twice the desired binocular distance while maintaining a centered pose and uses the camera 412 to capture the second image, and possibly other images in between (the position of the user 410 shown in broken lines). The captured images may be used for generating a three-dimensional image in accordance with embodiments of the present subject matter. The previously described two methods are just examples, and a user can capture the images by standing still and just moving the camera left or right to capture multiple images of the scene just looking at the live view images on the display 112.

The distance between positions at which images are captured (the stereo baseline) for generating a three-dimensional image can affect the quality of the three-dimensional image. The optimal stereo baseline between the camera positions can vary anywhere between 3 centimeters (cm) and several feet, dependent upon a variety of factors, including the distance of the closest objects in frame, the lens focal length or other optics properties of the camera, the camera crop factor (dependent on sensor size), the size and resolution of the display on which the images will be viewed, and the distance from the display at which viewers will view the images. A general recommendation is that the stereo baseline should not exceed the distance defined by the following equation:

$$B = \frac{12D}{30FC/50},$$

where B is the stereo baseline separation in inches, D is the distance in feet to the nearest object in frame, F is the focal length of the lens in millimeters (mm), and C is the camera crop factor relative to a full frame (36×24 square mm.) digital sensor (which approximates the capture of a 35 mm analog camera). In the examples provided herein, it is assumed that at least two images have been captured, at least two of which can be interpreted as a stereoscopic pair.

The identification of stereo pairs in 302 is bypassed in the cases where the user has manually selected the image pair for 3D image registration. This bypass can also be triggered if a 3D-enabled capture device is used that identifies the paired images prior to the registration process. Returning to FIGS. 3A-3D, the method includes selecting 302 two images among the plurality of captured images for use as a stereoscopic pair. For example, the image generator function 114 shown in FIG. 1 may be used for selecting captured images for use as a stereoscopic pair. One or more metrics can be defined for measuring one or more attributes of the plurality of images for selecting a stereoscopic pair. For example, a buffer of M consecutive images may be maintained, or stored in the memory 104. The attributes of image with index m are compared with the corresponding attributes of image m+1. If there is no match between those two images, image m+1 is compared with image m+2. If images are determined to be sufficiently matched so as to be stereoscopic, and after those images have been processed as described below to generate a three-dimensional image, the m and m+2 images are compared to also identify a possible stereoscopic pair. The process may continue for all or a portion of the images in the buffer.

Figure 5:
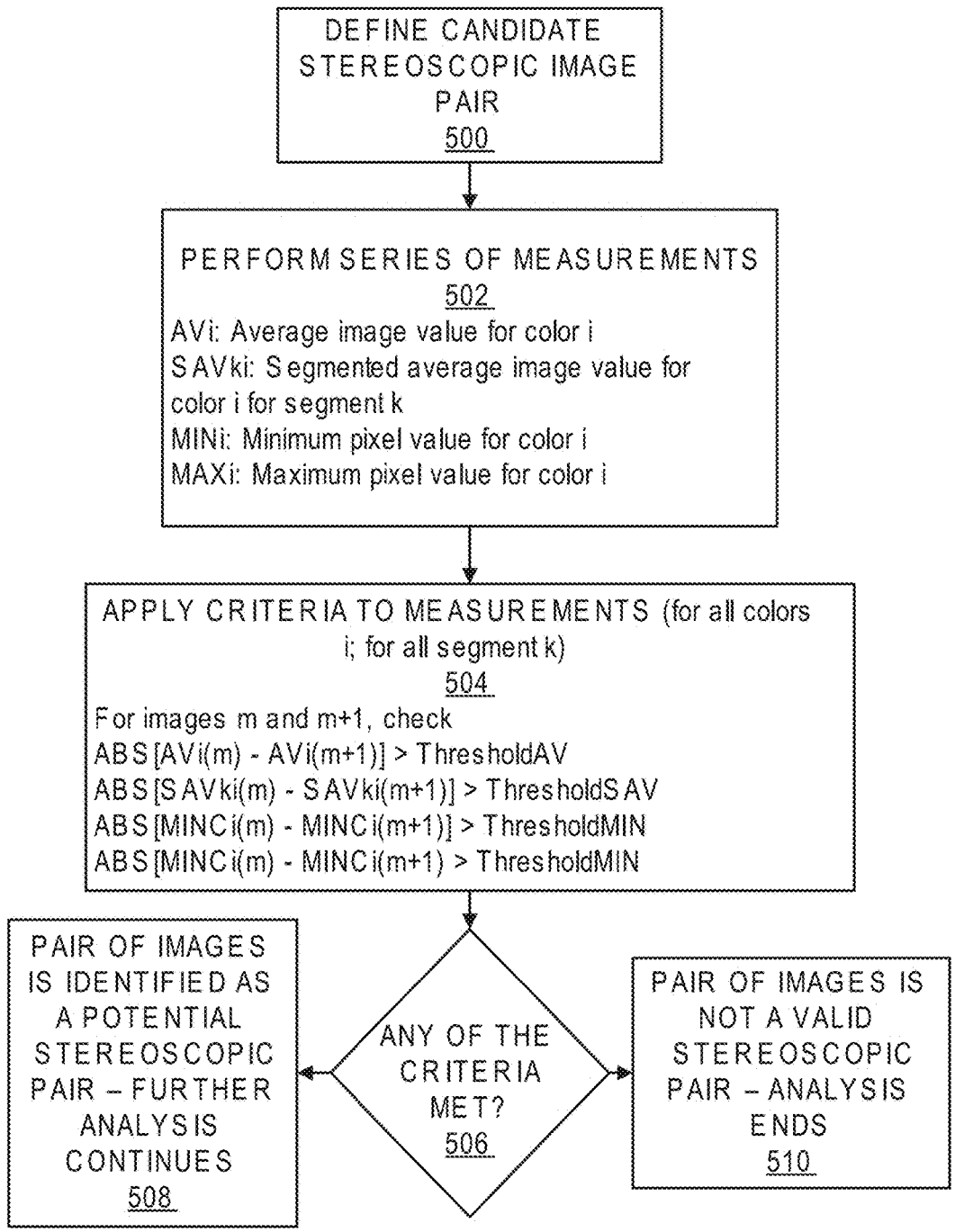
FIG. 5 is a flow chart of an exemplary method for a preliminary, quick analysis to pre-screen whether an image pair may be a valid stereoscopic pair in accordance with embodiments of the present subject matter.

A preliminary, quick analysis may be utilized for determining whether images among the plurality of captured images are similar enough to warrant a more detailed analysis. This analysis may be performed by, for example, the image generator function 114 shown in FIG. 1. FIG. 5 illustrates a flow chart of an exemplary method for a preliminary, quick analysis to pre-screen whether an image pair may be a valid stereoscopic pair in accordance with embodiments of the present subject matter. Referring now to FIG. 5, the method includes defining 500 a candidate stereoscopic pair. For example, the image generator function 114 may define the image with index m and the image m+1 as a candidate stereoscopic pair.

The method of FIG. 5 includes performing 502 a series of measurements of the candidate stereoscopic image pair. The measurements may be of attributes of the image pair. For example, for each color, the image generator function 114 may measure or calculate the following values:

Average image value $$AV = \left(\frac{1}{image\_size}\right) \sum_{i=1}^{image\_size} Ii$$

Segmented average image value: Divide image in k segments and take the average of those segments Minimum pixel value for each color of the image (MIN)

Maximum pixel value for each color of the image (MAX)

The method of FIG. 5 includes applying 504 criteria to the measurements. For example, the image function generator 114 shown in FIG. 1 may apply several criteria for determining if the images are a possible stereoscopic pair. Exemplary equations defining the application of these criteria to the image m and image m+1 follow:

Image pair is not stereoscopic=ABS($AV_m$−$AV_{m+1}$)>ThresholdAV

OR

For all $k$, ABS($SAV_{k,m}$−$SAV_{k,m+1}$)>ThresholdSAV

OR

ABS($MAX_m$−$MAX_{m+1}$)>ThresholdMAX

OR

ABS($MIN_m$−$MIN_{m+1}$)>ThresholdMIN

ThresholdAV, ThresholdSAV, ThresholdMAX, and ThresholdMIN are threshold value levels for the average, segmented average, maximum and minimum, respectively. These equations can be applied to all or at least some of the colors.

The method of FIG. 5 includes determining 506 whether any of the criteria are met. The image generator function 114 may determine whether any of the criteria are met. If the differences between the values for each image are less than a defined threshold, analysis can continue using more complex techniques for determining whether the images are a suitable stereoscopic pair. For example, the method of FIGS. 6A-6C, described below, can be applied for determining whether the images are a suitable stereoscopic pair 508. Otherwise, if all the differences are greater than the defined threshold, the images are rejected as a stereoscopic pair 510.

Referring again to FIGS. 3A-3D, after images are determined to be a potential stereoscopic pair, the method includes applying 304 rudimentary color adjustment to the images. For example, the image generator function 114 shown in FIG. 1 may apply color adjustment to the images. This optional color adjustment can be a normalized adjustment or DC-correction applied to a single image to allow luminance-based techniques to work better. In addition, several additional criteria may typically be applied to the luminance planes (or optionally to all color planes), including, but not limited to, a Hough transform analysis 306, segmentation 308, edge detection 310, and the like. For example, segmented objects or blocks with high information content can be compared between the two image views using motion estimation techniques, based on differential error measures, such as, but not limited to, sum of absolute difference (SAD) or sum of squared errors (SSE), or correlation based measures, such as phase correlation or cross correlation. Rotational changes between the two images may be considered and identified during this procedure. Segmented objects that are in one view only are indicative of occlusion, and having a significant number of occluded regions is indicative of a poor image pair for stereoscopy. Regions of occlusion identified during this process are recorded for use in later parts of the conversion process. Similarly, motion vector displacement between matching objects may be recorded or stored for further use.

Using the results of the motion estimation process used for object similarity evaluation, vertical displacement can be assessed. Vertical motion vector components are indicative of vertical parallax between the images, which when large can indicate a poor image pair. Vertical parallax must be corrected via rectification and registration to allow for comfortable viewing, and this correction will reduce the size of the overlapping region of the image in proportion to the original amount of vertical parallax.

Using the motion vectors from the similarity of objects check, color data may be compared to search for large changes between images. Such large changes can represent a color difference between the images regardless of similar luminance.

Figure 6A:
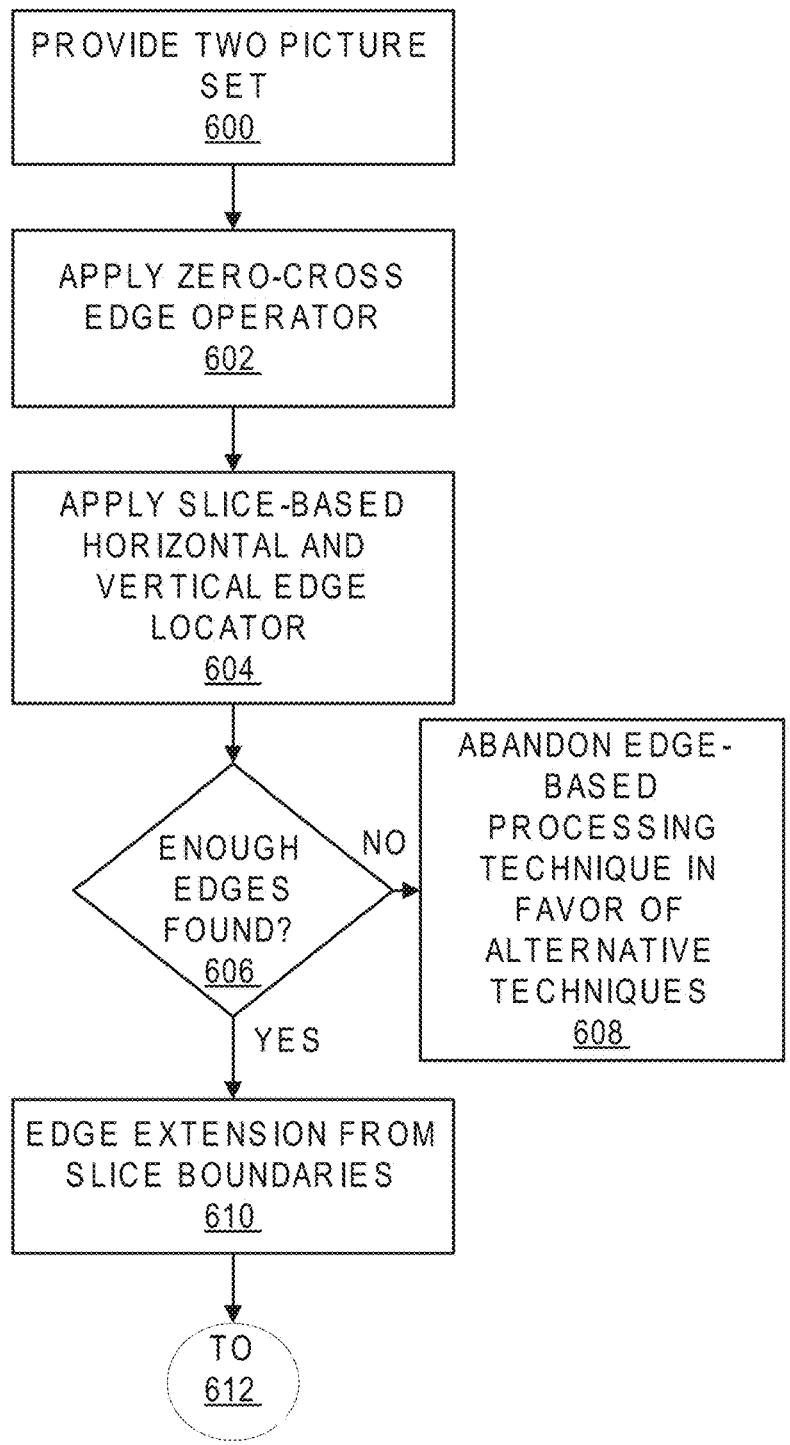
FIGS. 6A-6C are a flow chart of an exemplary method for edge-based analytics and matching for image correspondence, determination of right/left image, and camera toe-in/parallel plane configuration according to embodiments of the present disclosure.
Figure 6B:
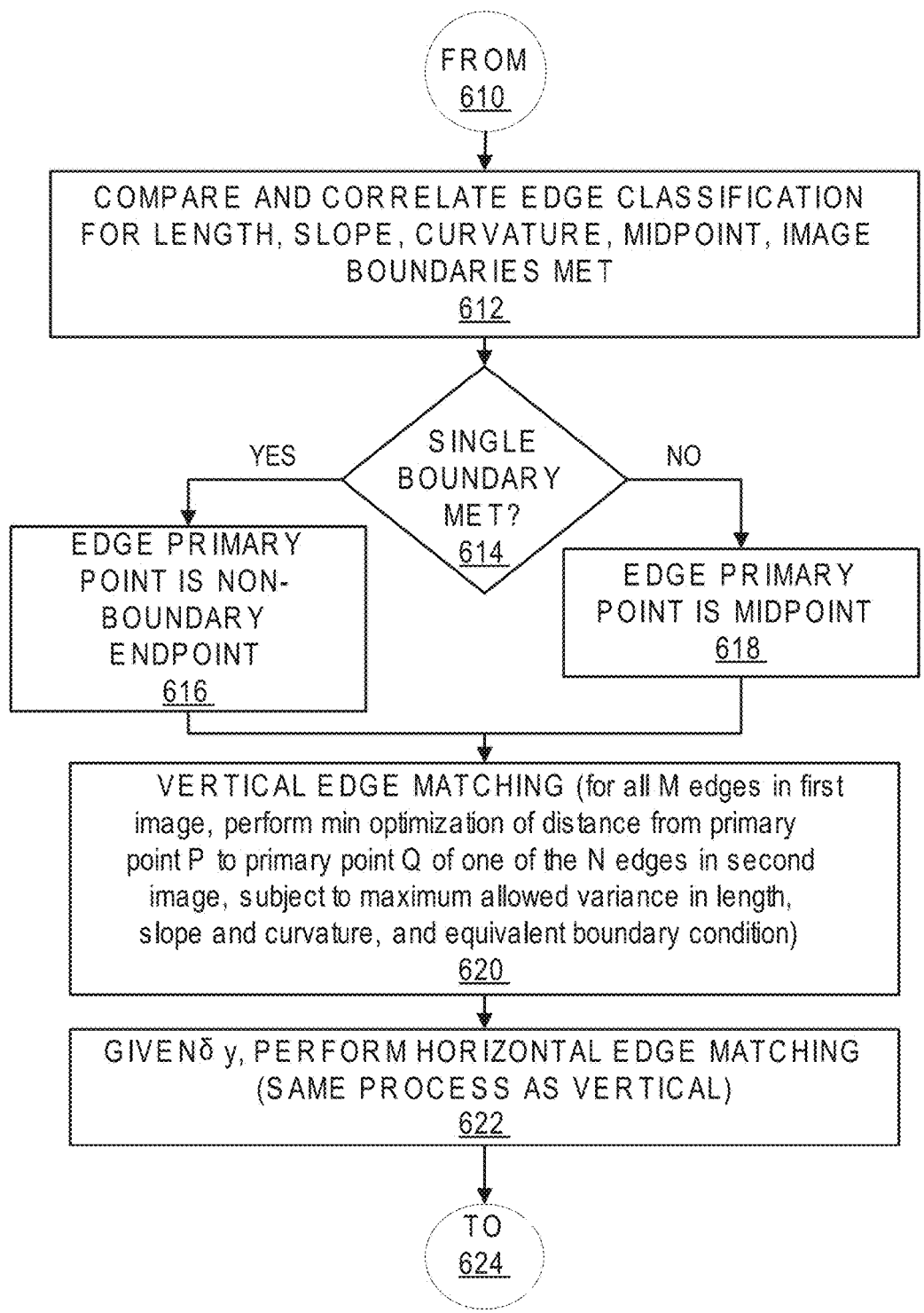
Figure 6C:
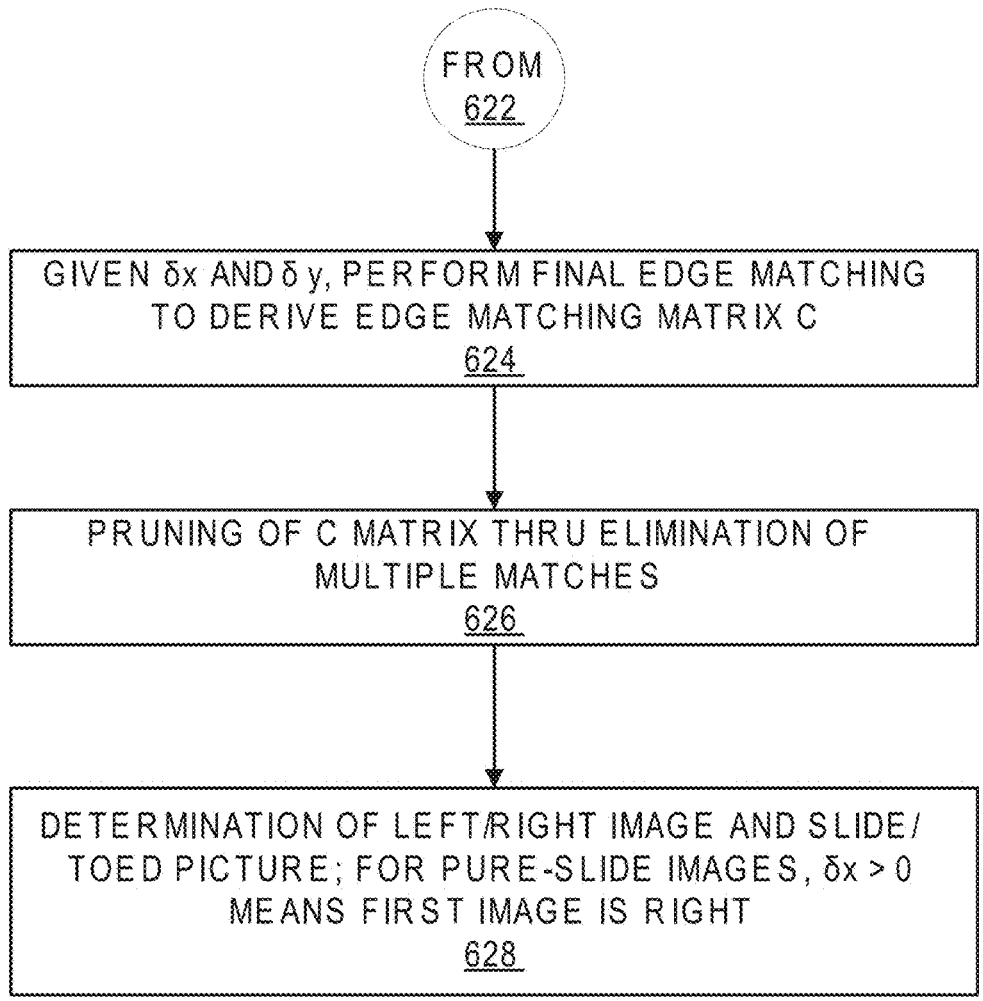

The method of FIGS. 3A-3D includes performing 312 edge-based analytics and matching for determining whether camera planes are parallel 313. For example, FIGS. 6A-6C illustrate a flow chart of an exemplary method for edge-based analytics and matching for image correspondence, determination of right/left image, and camera toe-in/parallel plane configuration according to embodiments of the present subject matter. This method may be implemented by the image generator function 114 shown in FIG. 1. Referring to FIGS. 6A-6C, two images are provided 600. Edge detection, when applied to both images, can be the foundation for image analysis and correspondence. In an example, the image generator function 114 shown in FIG. 1 may apply 602 numerous edge operators for this analysis. The edge operators may include, but are not limited to, zero-cross or gradient-based operations. Following the application of edge operators, the image generator function 114 may apply 604 a slice-based horizontal and vertical edge locator function for extracting edges from the binary images.

Referring to FIGS. 6A-6C, the image generator function 114 may also determine whether enough edges have been found 606. This stage (606) involves a comparison of the edges found from the two pictures to make sure that they meet a predefined minimum edge count. This stage also confirms the similarity of the two pictures by comparing the edge count of the two images to assure they are within a predefined percentage of each other. If enough edges have not been found, techniques alternative to edge-based processing techniques may be used 608. These techniques include motion-estimation-based image matching and quadrant-based or full-image based cross correlation of the input images. Edge extensions from slice boundaries can be generated 610 if enough edges have been found. This scheme simplifies the overall amount of calculation to determine the edges within the images by first considering edge segments that span a slice and then growing these edge segments to determine the exact edge size and endpoints. Next, the method of FIGS. 6A-6C includes comparing and correlating 612 the lengths, slope, curvature, midpoints/offset position, boundaries, and primary points of the resulting edges within the two images as an additional check of potential correspondence. Block 614 tests each edge to see if it intersects with a single image boundary (i.e., top, bottom, left or right boundary of image). In the event of an edge intersecting a single image boundary, block 616 classifies its primary point as the endpoint which is not on the boundary. Otherwise, block 618 classifies its primary point as the midpoint of the edge. Block 620 involves solving a minimization problem via vertical edge matching in order to determine the optimal selection for the vertical shift between the two images. In an example for block 620, the following equation may be used:

$$\min_{\delta_y=-\varepsilon_y}^{\varepsilon_y} \sum_{i=1}^{M} \min_{j=1}^{N} (\min(\| P_i(x, y+\delta_y) - Q_j(x, y) \|, \varepsilon_x + \varepsilon_y)$$

For each vertical edge in one image, determine the closest edge in the other image, subject to meeting criteria for length, slope and curvature. For distance, use the distance between the primary points. If this distance is larger than $\varepsilon$, it is deemed that no edge matches, and this edge contributes c to the cost function. The end result of the optimization is the determination of $\delta$, the optimal shift between the two images based on this vertical edge matching. In box 622, the same optimization process from box 620 is repeated; this time, however, is for horizontal edge matching, and utilizes the vertical $\delta$ already determined from box 620.

In an example for block 622, the following equation may be used:

$$\min_{\delta_x=-\varepsilon_x}^{\varepsilon_x} \sum_{i=1}^{M} \min_{j=1}^{N} \min(\| P_i(x+\delta_y, y+\delta_y) - Q_j(x, y) \|, \varepsilon_x + \varepsilon_y)$$

Block 624 then uses the calculated horizontal and vertical $\delta$'s to match each edge with its closest edge that meets the length, slope and curvature criteria. In an example for block 624, the following equation may be used:

$$C_{i,j} = \begin{cases} 1 \text{ if } P_i \text{ matches } Q_j \\ 0 \text{ otherwise} \end{cases}$$

The output of this stage is the matrix C, which has 1 in location i,j if edge i and j are matching edges and otherwise 0. This matrix is then pruned in Box 626 so that no edge is matched with multiple other edges. In the event of multiple matches, the edge match with minimal distance is used. Finally, in Box 628, the edge matches are broken down into regions of the image. The set of matching edges within each region are then characterized by the mean shift, and this mean shift is then the characteristic shift of the region. By examining the direction of the shifts of each subregion, it is thus possible to determine which picture is left and which is right. It is also possible to determine whether the second captured picture was captured with a focal axis parallel to the first picture. If not, there is some amount of toe-in or toe-out which can be characterized by the directional shifts of the subregions.

Referring to FIGS. 6A-6C, the extracted edge sets from the two input images can be compared as part of a minimal optimization, in order to solve for the optimal delta translation between images. This $\delta$ value allows for determination of which image is left and right, as well as whether the cameras were in parallel configuration. When the cameras focal axes are parallel (or near parallel), the algorithm (from FIGS. 3A-3D) can proceed to the image registration without performing image rectification.

Figure 7:
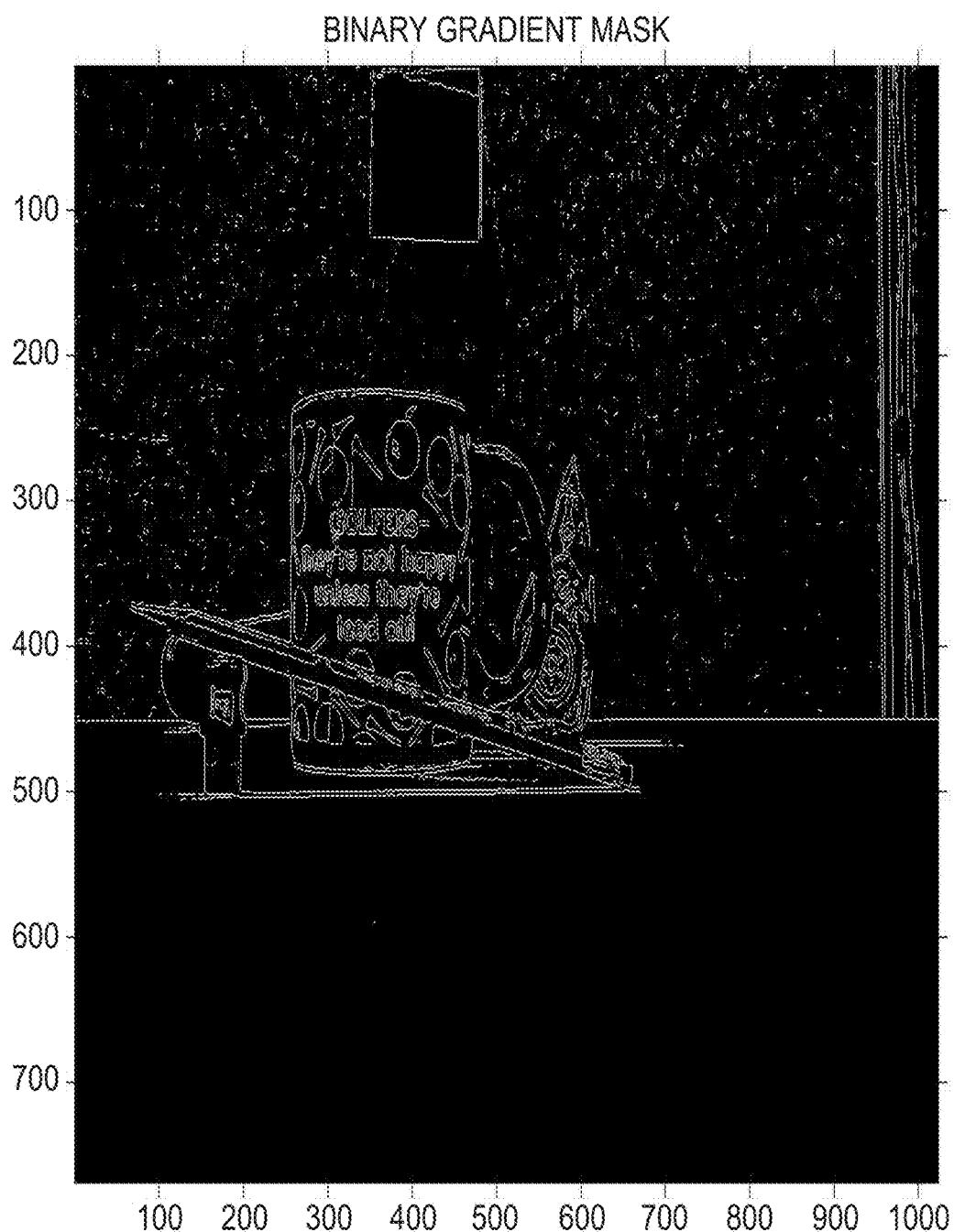
FIG. 7 is a graphical depiction of an edge detection example in accordance with embodiments of the present subject matter.

FIG. 7 is a graphical depiction of an edge detection example in accordance with embodiments of the present subject matter. The example of FIG. 7 shows the edge detection map when edge detection is applied to a captured image, and demonstrates that the extracted images can be a representation of image composition.

A Hough transform can be applied 306 to identify lines in the two images of the potential stereoscopic pair. Lines that are non-horizontal, non-vertical, and hence indicate some perspective in the image can be compared between the two images to search for perspective changes between the two views that may indicate a perspective change or excessive toe-in during capture of the pair.

The aforementioned criteria may be applied to scaled versions of the original images for reducing computational requirements. The results of each measurement may be gathered, weighted, and combined to make a final decision regarding the probable quality of a given image pair as a stereoscopic image pair.

Figure 8A:
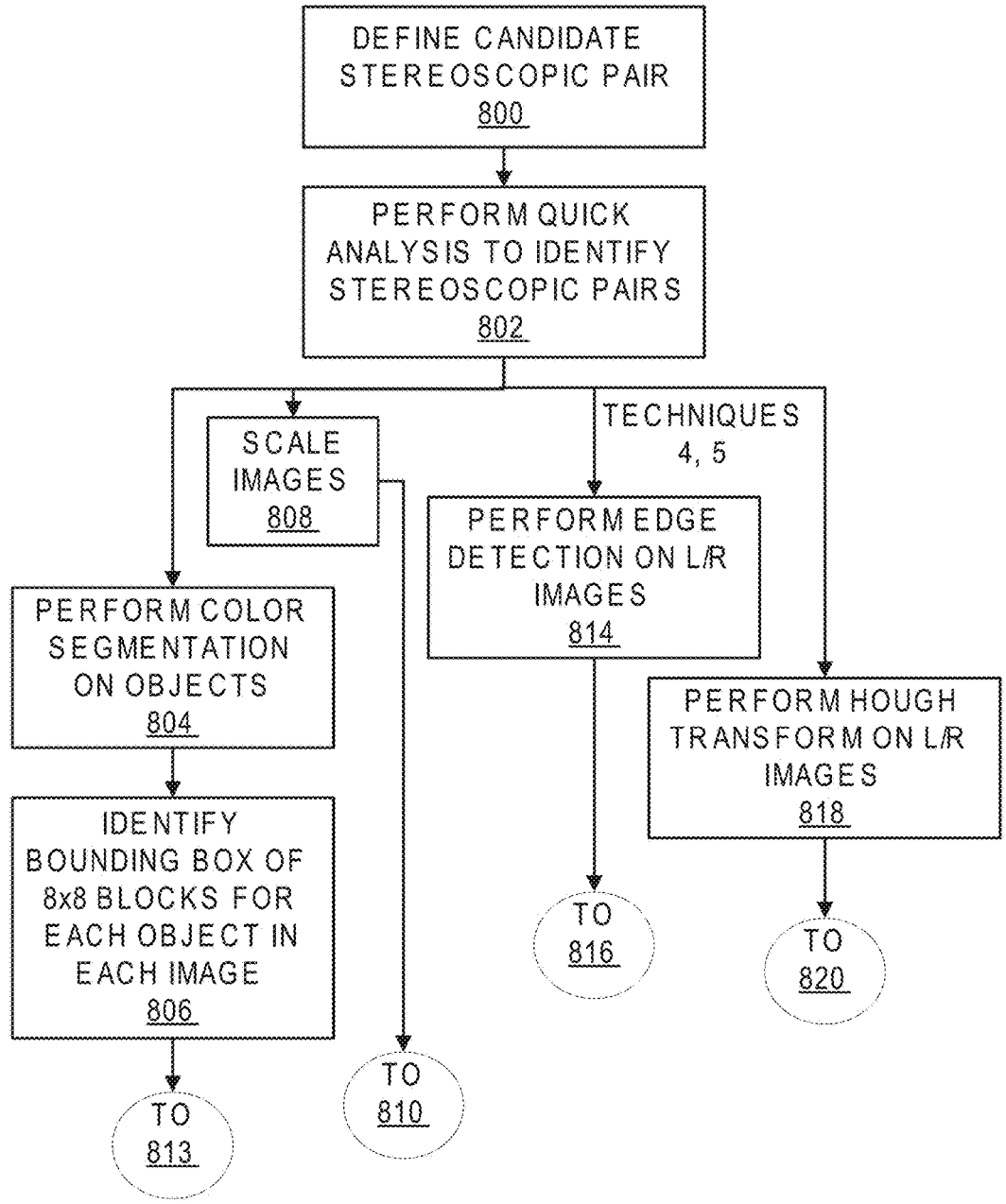
FIGS. 8A and 8B illustrate a flow chart of an exemplary method for determining whether an image pair is a valid stereoscopic pair and which image is left and right according to embodiments of the present disclosure.
Figure 8B:
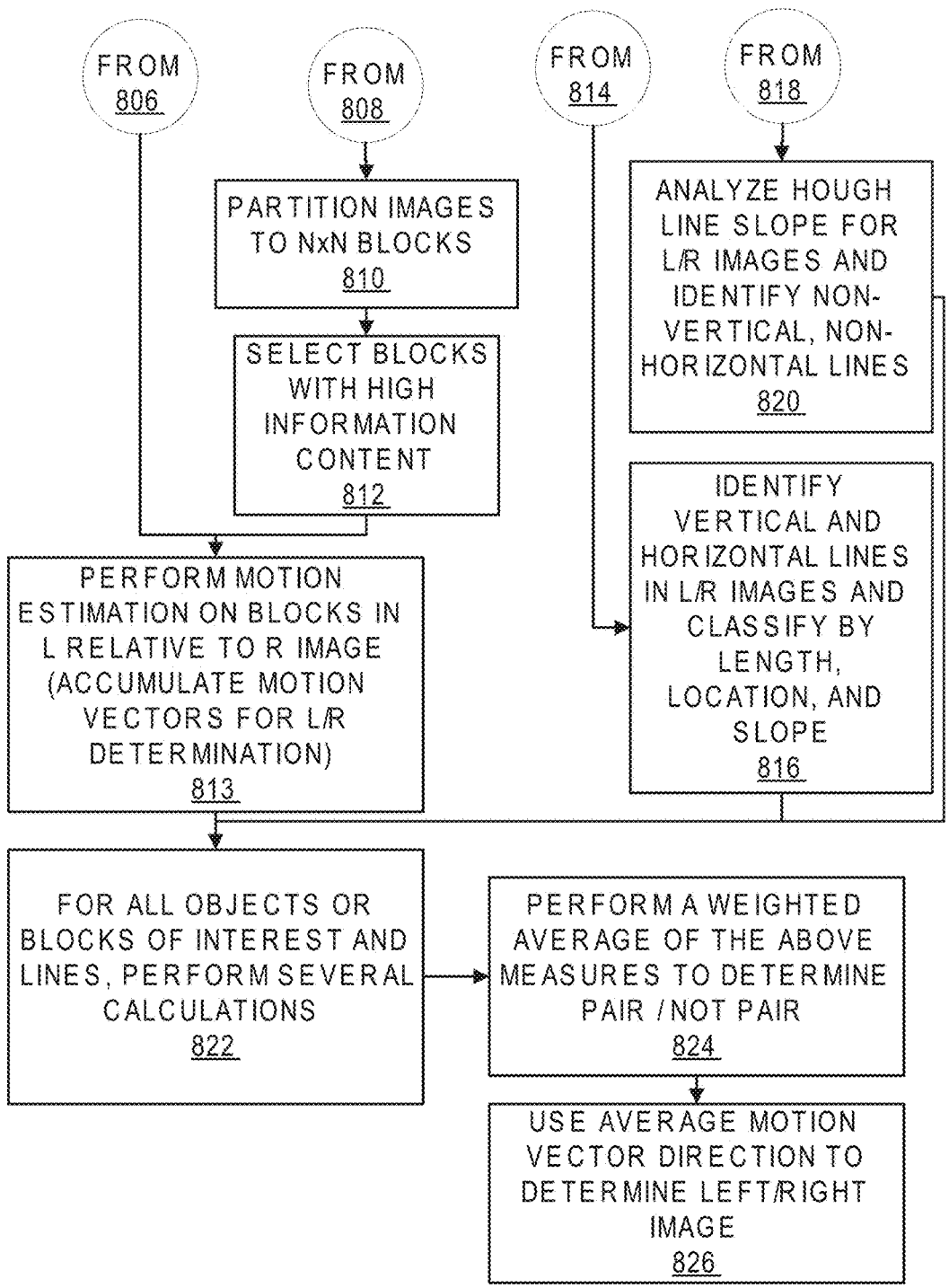

The method of FIGS. 3A-3D includes identifying 314 a valid stereoscopic pair. For example, FIGS. 8A and 8B illustrate a flow chart of an exemplary method for determining whether an image pair is a valid stereoscopic pair and which image is left and right according to embodiments of the present disclosure. This method may be implemented, for example, by the image generator function 114 shown in FIG. 1. Referring to FIGS. 8A and 8B, the method includes defining 800 a candidate stereoscopic image pair. In this example, two images with indices m and m+1 are examined. The method includes performing 802 a quick analysis to identify stereoscopic pairs.

At step 804, color segmentation is performed on the objects. At step 806, the bounding box of 8×8 blocks for each object in each image may be identified. At step 810, images may be partitioned into N×N blocks. At step 812, blocks with high information content may be selected. At step 813, the method includes performing motion estimation on blocks in L relative to R image (accumulate motion vectors for L/R determination. These steps may be considered Techniques 1, 2, and 3.

At step 814, edge detection may be performed on left/right images. Next, at step 816, vertical and horizontal lines in left/right images may be identified and may be classified by length, location, and slope. At step 818, a Hough transform may be performed on the left/right images. Next, at step 820, the method includes analyzing Hough line slope for left/right images and identifying non-vertical and non-horizontal lines.

Referring to FIGS. 8A and 8B, LDIAG represents the set of lines that have been identified as non-vertical or non-horizontal using the Hough transform. LHV represents lines that have been classified as either vertical or horizontal. MVY are the luminance motion vectors, and MVCRB the chrominance motion vectors, for each segmented object or N×N block. Similarly, MVYM is the mean luminance motion vector measurement, and MYCRBM the mean chrominance motion vectors. BMAD is the mean accumulated best match difference. ORG is the measurement of how well origins of horizontal/vertical lines match. LEN is the measurement of how well lengths of horizontal/vertical lines match. SLP is the measurement of how well slopes of horizontal/vertical lines match. TIN is the measurement of how well slopes of diagonal lines match.

At step 822, the following calculations may be performed for all objects or blocks of interest and lines:

$$MVYM = \sum_{i,j} MVY_{i,j,m},$$

where i: object ID, j: motion vector ID, m: image ID $$BMAD = \sum_{i} abs[block_{0,i,j,m} - block_{mv,i,j,m+1}],$$

where i: object ID, j: motion vector ID, m: image ID, mv: best match vector for block j $$MVCRBM_{i,j} = \sum MVCRB_{i,j,m}$$

-continued $$ORG = \sum_{i} abs[origin(LHV_{i,m}) - origin(LHV_{i,m+1})]$$

$$LEN = \sum_{i} abs[length(LHV_{i,m}) - length(LHV_{i,m+1})]$$

$$SLP = \sum_{i} abs[slope(LHV_{i,m}) - slope(LHV_{i,m+1})]$$

$$TIN = \sum_{i} abs[slope(LDIAG_{i,m}) - slope(LDIAG_{i,m+1})]$$

At step 824, a weighted average of the above measures may be performed to determine whether images are a pair or not. Next, at step 826, average motion vector direction may be used to determine left/right images.

Referring again to FIGS. 3A-3D, the method can next include determining which image of the stereoscopic pair represents the left view image and which image represents the right view image. This aspect can be important in many applications since, for example, a user can capture a plurality of images moving to the left or right. First, image segmentation 308 can be performed to identify objects within the two captured views. The motion estimation step that has been defined before saves the motion vectors of each object or block with high information content. If the general motion of segmented objects is to the right for one view relative to the other, it is indicative of a left view image, and vice versa. Since the process of motion estimation of segmented objects is also used in stereoscopic pair evaluation, left/right image determination can be performed in parallel.

For a stereo pair of left and right view images, the method of FIGS. 3A-3D includes rectification point selection 316, rectification 318, and region of interest identification 320. For example, interest points for stereo correspondence, rectification and registration can be identified. According to embodiments of the present subject matter, the left view image, sized N×M, is broken into a number, N, of smaller n×m sub-images. Each sub-image can be filtered to find junction points, or interest points, within and between objects in view. Interest points can be identified, for example, by performing horizontal and vertical edge detection, filtering for strong edges of a minimum length, and identifying crossing points of these edges. Interest point determination can be assisted by Hough transform line analysis when determining the dominant edges in a scene. Interest points may not be selected from areas identified as occluded in the initial analysis of a stereo pair. Interest points can span the full image.

Figure 9:
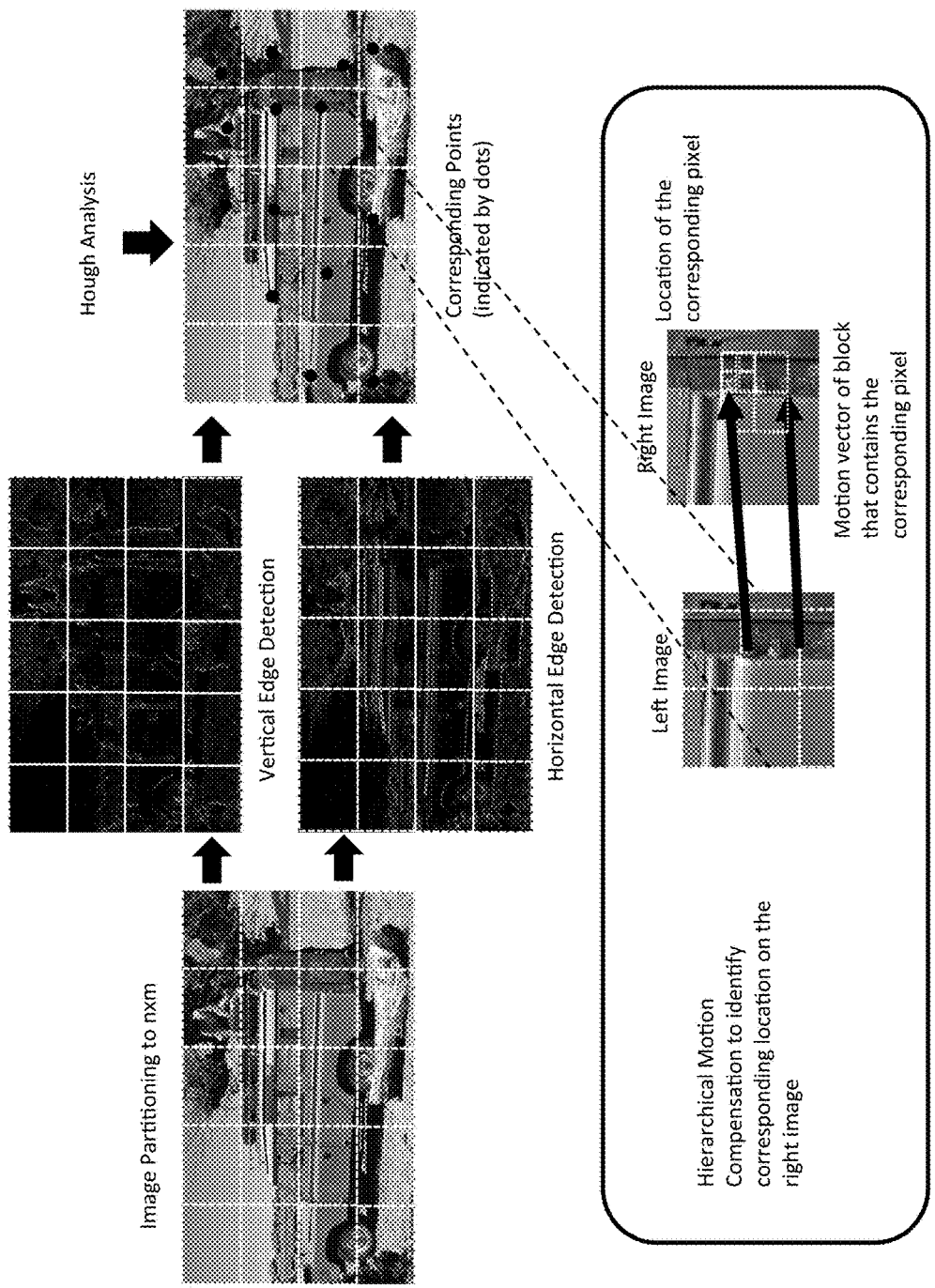
FIG. 9 is a diagram depicting a technique for identifying corresponding points in left and right view images in accordance with embodiments of the present disclosure.

For a stereo pair of left and right view images with a set of identified interest points, rectification 318 may be performed on the stereo pair of images. Using the interest point set for the left view image, motion estimation techniques (as described in stereo pair identification above) and edge matching techniques are applied to find the corresponding points in the right view image. FIG. 9 depicts an example of applying this technique. Referring to FIG. 9, the N corresponding points in the left and right view images are made into a 3×N set of point values, for example:

$$right_{pts} = \begin{Bmatrix} x1_r & x2_r & x3_r \\ y1_r & y2_r & y3_r... \\ 1 & 1 & 1 \end{Bmatrix} \text{ and}$$

-continued $$left_{pts} = \begin{Bmatrix} x1_l & x2_l & x3_l \\ y1_l & y2_l & y3_l... \\ 1 & 1 & 1 \end{Bmatrix},$$

and the fundamental matrix equation $$right_{pts}{}^T * F * left_{pts} = 0$$

is solved or approximated to determine the 3×3 fundamental matrix, F, and epipoles, e1 and e2. The camera epipoles are used with the interest point set to generate a pair of rectifying homographies. It can be assumed that the camera properties are consistent between the two captured images. The respective homographies are then applied to the right and left images, generating the rectified images. The overlapping rectangular region of the two rectified images is then identified, the images are cropped to this rectangle, and the images are resized to their original dimensions, generating the rectified image pair, right_r and left_r. The rectified image pair can be defined by the following equations:

$$right\_r = cropped(F * right)$$

$$left\_r = cropped(F * left)$$

For the stereo pair of "left_r" and "right_r" images, registration is next performed on the stereo pair. A set of interest points is required, and the interest point set selected for rectification (or a subset thereof) may be translated to positions relative to the output of the rectification process by applying the homography of the rectification step to the points. Optionally, a second set of interest points may be identified for the left_r image, and motion estimation and edge matching techniques may be applied to find the corresponding points in the right_r image. The interest point selection process for the registration operation is the same as that for rectification. Again, the N corresponding interest points are made into a 3×N set of point values as set forth in the following equations:

$$right\_r_{pts} = \begin{Bmatrix} x'1_r & x'2_r & x'3_r \\ y'1_r & y'2_r & y'3_r... \\ 1 & 1 & 1 \end{Bmatrix} \text{ and}$$

$$left\_r_{pts} = \begin{Bmatrix} x'1_l & x'2_l & x'3_l \\ y'1_l & y'2_l & y'3_l... \\ 1 & 1 & 1 \end{Bmatrix},$$

and the following matrix equation $$left\_r_{pts} = Tr * right\_r_{pts}$$

is approximated for a 3×3 linear conformal transformation, Tr, which may incorporate both translation on the X and Y axes and rotation in the X/Y plane. The transform Tr is applied to the right_r image to generate the image "Right" as defined by the following equation:

$$Right' = Tr * right\_r;$$

where right_r is organized as a 3×N set of points (xi_r, yi_r, 1) for i=1 to image_rows*image cols.

Finally, the second set of interest points for the left_r image may be used to find correspondence in the Right' image, the set of points as set forth in the following equations:

$$Right'_{pts} = \begin{Bmatrix} x'1_r & x'2_r & x'3_r \\ y'1_r & y'2_r & y'3_r... \\ 1 & 1 & 1 \end{Bmatrix} \text{ and}$$

$$left\_r_{pts} = \begin{Bmatrix} x'1_l & x'2_l & x'3_l \\ y'1_l & y'2_l & y'3_l... \\ 1 & 1 & 1 \end{Bmatrix},$$

is identified and composed, and the equation $$Right'_{pts} = Tl * left\_r_{pts}$$

is approximated for a second linear conformal transformation, Tl. The transform Tl is applied to the left_r image to generate the image "Left", as defined by the following equation:

$$Left' = Tl * left\_r$$

"Right" and "Left" images represent a rectified, registered stereoscopic pair.

The method of FIGS. 3A-3D includes an overall parallax, or disparity, calculation 332. According to embodiments of the present subject matter, for a stereoscopic pair of registered "Left" and "Right" images, a pixel-by-pixel parallax, or disparity, map is created. This can be performed, for example, by using a hierarchical motion estimation operation between the Left' and Right' images, starting with blocks sized N×N and refining as necessary to smaller block sizes. During the estimation process, only horizontal displacement may be considered, limiting the search range. After each iteration of the process, the best match position is considered for pixel-by-pixel differences, and the next refinement step, if needed, is assigned by noting the size of the individual pixel differences that are greater than a threshold, Tp. Regions of the image previously identified as occluded in one image are assigned the average parallax value of the pixels in the surrounding neighborhood. Regions of an image that are not known to be occluded from previous steps in the process, and for which an appropriate motion match cannot be found (pixel differences are never<Tp) are assigned to the maximum possible parallax value to allow for simple identification in later steps of the stereo composition process. In the example of FIGS. 3A-3D, the method includes correspondence point selection 322, correspondence 324 and registration transform to generate the Right' image 326. In addition, the method includes correspondence 328 and registration transform to generate the Left' image 330.

Figure 10:
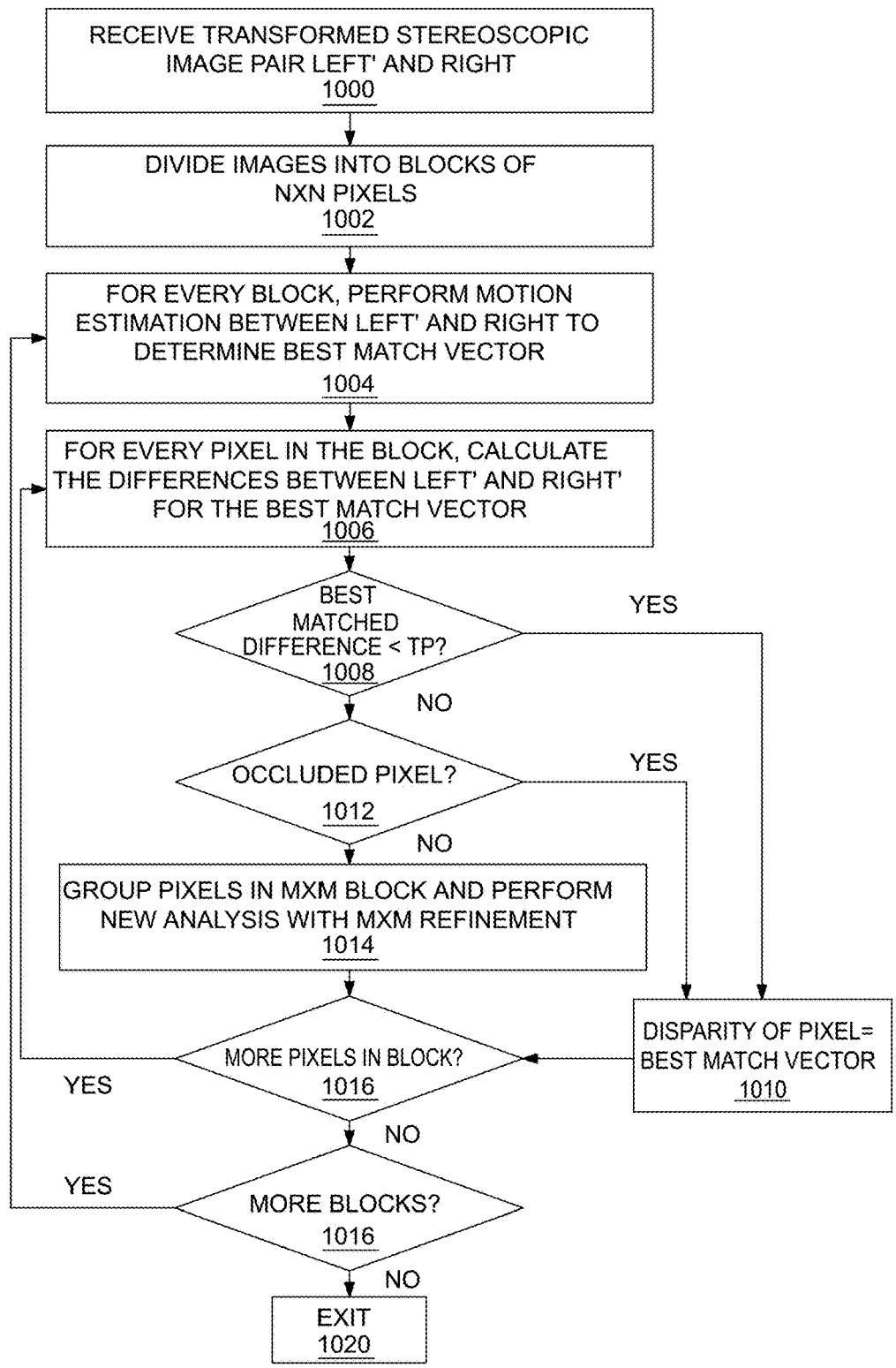
FIG. 10 is a flow chart of an exemplary method for determining pixel disparities according to embodiments of the present subject matter.

FIG. 10 illustrates a flow chart of an exemplary method for determining pixel disparities according to embodiments of the present subject matter. The method may be implemented, for example, by the image generator function 114 shown in FIG. 1. Referring to FIG. 10, the method includes receiving 1000 a transformed stereoscopic image pair, including a left and right image. The method includes dividing 1002 the images into blocks of N×N pixels. For every block, the method includes performing 1004 motion estimation between left and right to determine a best match vector. Next, for every pixel in each block, the method includes calculating 1006 the differences between left and right for the best match vector.

The method of FIG. 10 includes determining 1008 whether the best match difference is less than the threshold Tp. If the best match difference is less than the threshold Tp, the disparity of the pixel is set equal to the best match vector 1010. Otherwise, if the best match difference is not less than the threshold Tp, the method includes determining 1012 whether the pixel is occluded. If the pixel is determined to be occluded, the disparity of the pixel is set equal to the best match vector 1010. If the pixel is determined not to be occluded, the method includes grouping pixels in an M×M block and performing a new analysis with M×M refinement 1014.

After steps 1010 and 1014 of FIG. 10, the method includes determining 1016 whether there are more pixels in the current block being processed. If there are more pixels, the method returns to step 1006. Otherwise, the method determines 1018 whether there are more blocks to be processed. If not, the method exits 1020. If there are more blocks, the method returns to step 1004.

Returning now to FIGS. 3A-3D, the method includes applying 334 a parallax analysis. For example, for a stereoscopic pair of registered "Left" and "Right" images, the maximum and minimum pixel parallax values can be analyzed to decide whether the maximum or minimum parallax is within the ability of a viewer to resolve a three-dimensional image. If it is determined that the parallax is within the ability of a viewer to resolve the three-dimensional image, the method proceeds to step 342. If not, the method proceeds to step 336. Occluded regions and pixels with "infinite" parallax are not considered in this exemplary method.

For a stereoscopic pair of registered "Left" and "Right" images, the screen plane of the stereoscopic image can be altered 336, or relocated, to account for disparities measured as greater than a viewer can resolve. This is performed by scaling the translational portion of transforms that created the registered image views by a percent offset and re-applying the transforms to the original images. For example, if the initial left image transform is as follows:

$$Tl = \begin{Bmatrix} S*\cos\theta & S*\sin\theta & Tx \\ -S*\sin\theta & S*\cos\theta & Ty \\ 0 & 0 & 1 \end{Bmatrix}$$

for scaling factor S, X/Y rotation angle θ, and translational offsets Tx and Ty, the adjustment transform becomes $$Tl_{alt} = \begin{Bmatrix} S*\cos\theta & S*\sin\theta & Tx*Xscale \\ -S*\sin\theta & S*\cos\theta & Ty*Yscale \\ 0 & 0 & 1 \end{Bmatrix}$$

where Xscale and Yscale are determined by the desired pixel adjustment relative to the initial transform adjustment, i.e., $$Xscale = 1 + \frac{(desired\_pixel\_adjustment)}{Tx}.$$

Only in rare occurrences will Yscale be other than zero, and only then as a corrective measure for any noted vertical parallax. Using the altered transform, a new registered image view is created, e.g. the following:

Left'=$Tl_{alt}$*left_r

Such scaling effectively adds to or subtracts from the parallax for each pixel, effectively moving the point of now parallax forward or backward in the scene. The appropriate scaling is determined by the translational portion of the transform and the required adjustment.

At step 338 of FIGS. 3A-3D, it is determined whether the parallax is within the ability of a viewer to resolve the three-dimensional image. If it is determined that the parallax is within the ability of a viewer to resolve the three-dimensional image, the method proceeds to step 342. If not, the method proceeds to step 340. For a stereoscopic pair of registered "Left" and "Right" images, the pixel-by-pixel parallax for pixels of segmented objects may also be adjusted 340, or altered, which effectively performs a pseudo-decrease (or increase) in the parallax of individual segmented objects for objects that still cannot be resolved after the screen adjustments above. This process involves the same type of manipulation and re-application of a transform, but specific to a given region of the picture, corresponding to the objects in question.

Since moving an object region in the image may result in a final image that has undefined pixel values, a pixel-fill process is required to ensure that all areas of the resultant image have defined pixel values after object movement. An exemplary procedure for this is described below. Other processes, both more or less complex, may be applied.

Figure 11:
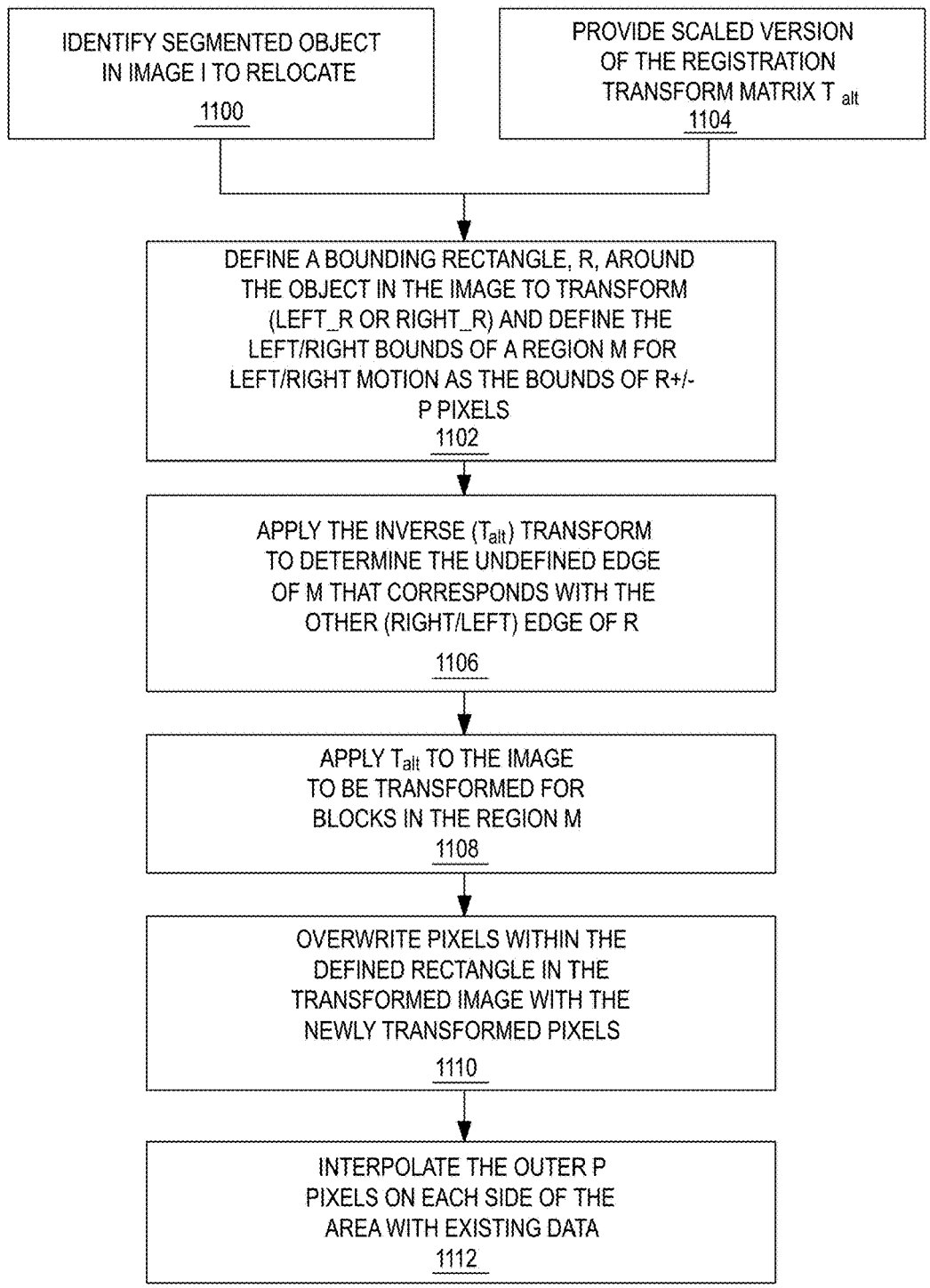
FIG. 11 is a flow chart of an exemplary method for adjusting parallax of segmented, moving objects according to embodiments of the present subject matter.
Figure 12:
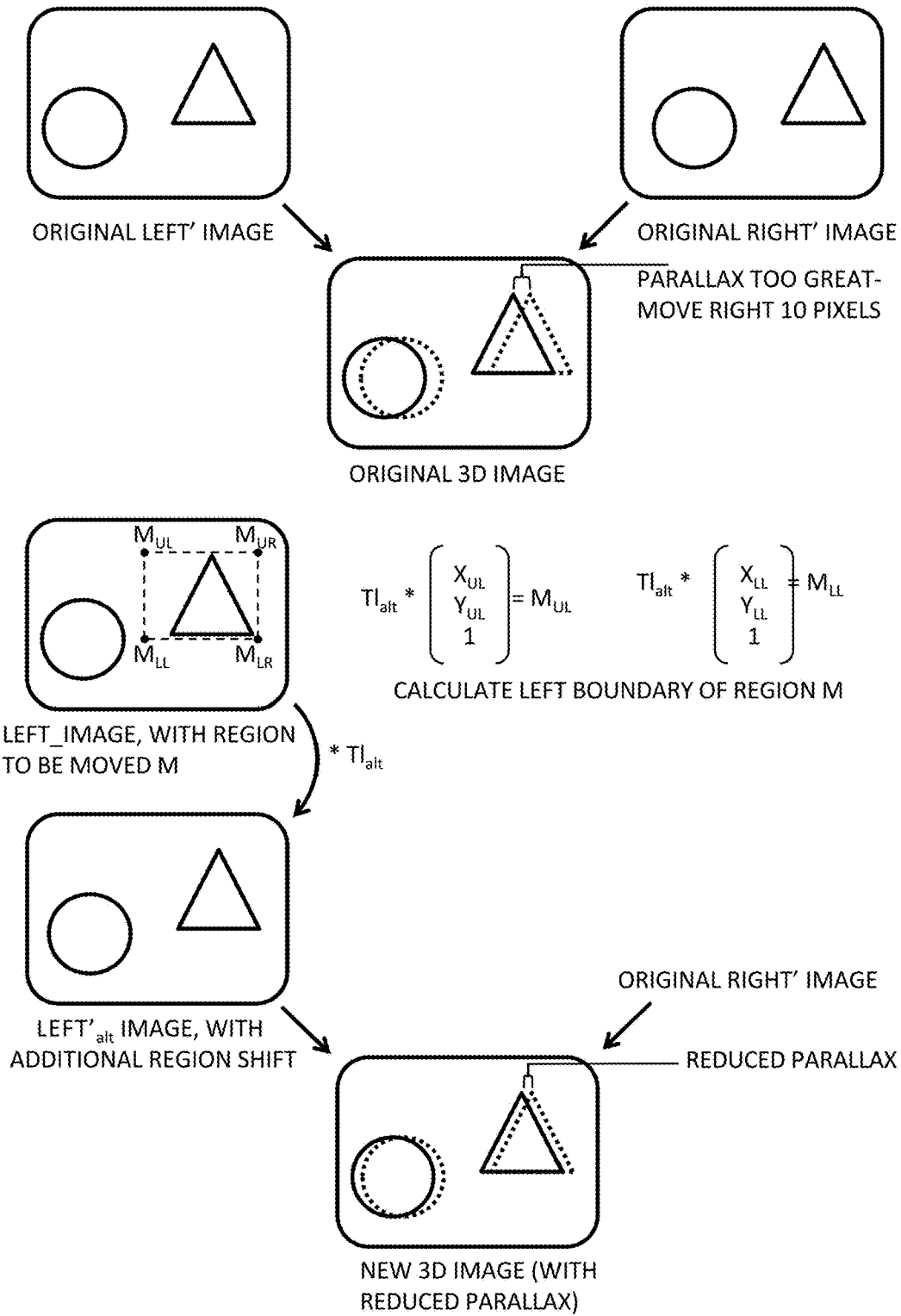
FIG. 12 is an exemplary diagram of a method for adjusting parallax of moving, segmented objects according to embodiments of the present subject matter.

FIG. 11 illustrates a flow chart of an exemplary method for adjusting parallax of segmented, moving objects according to embodiments of the present subject matter. Further, FIG. 12 illustrates an exemplary diagram of a method for adjusting parallax of moving, segmented objects according to embodiments of the present subject matter. The method may be implemented, for example, by the image generator function 114 shown in FIG. 1. Referring now to FIG. 11, the method includes identifying 1100 a segmented object in an image I to relocate. The method of FIG. 11 also includes defining a bounding rectangle R around the object and defining left/right bounds of a region M for left/right motion 1102. In an example of defining the bounding rectangle R, the segmented region to be moved may be identified as a rectangular region of pixels, R, in the left_r or right_r image (whichever is to be altered), sized X columns by Y rows with the following coordinates:

$R_{ul}=(x_l, y_u)$; the upper left coordinate
$R_{ll}=(x_l, y_l)$; the lower left coordinate
$R_{ur}=(x_r, y_u)$; the upper right coordinate
$R_{lr}=(x_r, y_l)$; the lower right coordinate For a large or complex object, multiple rectangular regions may need to be defined and moved, but the process executes identically for each region.

In an example of defining left/right bounds of a region M for left/right motion, the region M is the region to which the altered transform can be applied. This process first assesses the direction of movement to occur and defines one side of region M. If the intended movement is to the right, then the right bounding edge of region M is defined by the following coordinate pair in the appropriate left_r or right_r image (whichever is to be adjusted):

$M_{ur}=(x_r+P,y_u)$;upper right $M_{lr}=(x_r+P,y_l)$;lower right

If movement is to the left, the left bounding edge of region M is defined as:

$M_{ul}=(x_l-P,y_u)$;upper left $M_{ll}=(x_l-P,y_l)$;lower left

P is an extra number of pixels for blending purposes. The scaled version of the registration transform matrix $T_{alt}$ is provided 1104. The inverse of the altered transform (assumed already calculated as above for movement of the screen plane for the whole image) may then be applied 1106 to the opposite edge of the region R to get the other edge of region M. For the sake of example, assume that the movement of R is intended to be to the right, and that the left image is to be altered (meaning $Tl_{alt}$ has been created for the intended movement). Since the right side of M is already known, the other side can now be determined as:

$$M_{ul} = Tl_{alt}^{-1} * R_{ul} + (P,0); \text{upper right}$$

$$M_{ll} = Tl_{alt}^{-1} * R_{ll} + (P,0); \text{lower right}$$

Again, P is an extra number of pixels for blending, and $Tl_{alt}^{-1}$ is the inverse transform of $Tl_{alt}$. Note that P is added after the transform application, and only to the X coordinates. The region to be moved is now defined as the pixels within the rectangle defined by M.

The method also includes applying 1108 the inverse transform of $Tl_{alt}$ to the image to be transformed for blocks in the region M. For example, from this point, one of two operations can be used, depending on a measurement of the uniformity (texture) or the area defined by the coordinates $M_{ul}$, $M_{ll}$, $R_{ul}$, and $R_{ll}$ (remembering again that the region would be using other coordinates for a movement to the left). Uniformity is measured by performing a histogram analysis on the RGB values for the pixels in this area. If the pixel variation is within a threshold, the area is deemed uniform, and the movement of the region is affected by applying the following equation: Left'=$Tl_{alt}$*left_r, for left_r∈M. This is the process shown in the example method of FIG. 12. Alternatively, if the area is not uniform, movement of the object is applied to the smaller area:

Left'=$Tl_{alt}$*left_r, for the left_r region defined by $R_{ul}$, $R_{ll}$, $M_{ur}$, and $M_{lr}$.

The method of FIG. 11 includes overwriting 1110 pixels within the defined rectangle in the transformed image with the newly transformed pixels.

The method of FIG. 11 includes interpolating the outer P pixels on each side of the area with existing data. For example, the area in Left' defined by the coordinates $M_{ul}$, $M_{ll}$, $R_{ur}$, and $R_{lr}$ will be empty, but is filled with a linear gradient fill between points on each horizontal line in the region. The fill-in process first determines the following distance d:

$$d = R_{ul}(x) - M_{ul}(x)$$

for the x-coordinates of $R_{ul}$ and $M_{ul}$, and then proceeds to determine an interpolated gradient between the two pixel positions to fill in the missing values. For simplicity of implementation, the interpolation is always performed on a power of two, meaning that the interpolation will produce one of 1, 2, 4, 8, 16, etc. pixels as needed between the two defined pixels. Pixel regions that are not a power of two are mapped to the closest power of two, and either pixel repetition or truncation of the sequence is applied to fit. As an example, if $R_{ul}(x)=13$ and $M_{ul}(x)=6$, then d=7, and the following intermediate pixel gradient is calculated for a given row, j, in the region:

$$p1 = \frac{7}{8} * (x_6, y) + \frac{1}{8} * (x_{13}, y)$$

$$p2 = \frac{6}{8} * (x_6, y) + \frac{2}{8} * (x_{13}, y)$$

$$p3 = \frac{5}{8} * (x_6, y) + \frac{3}{8} * (x_{13}, y)$$

$$p4 = \frac{4}{8} * (x_6, y) + \frac{4}{8} * (x_{13}, y)$$

$$p5 = \frac{3}{8} * (x_6, y) + \frac{5}{8} * (x_{13}, y)$$

$$p6 = \frac{2}{8} * (x_6, y) + \frac{6}{8} * (x_{13}, y)$$

$$p7 = \frac{1}{8} * (x_6, y) + \frac{7}{8} * (x_{13}, y)$$

$$p8 = (x_{13}, y)$$

Since only 7 values are needed, p8 would go unused in this case, such that the following assignments would be made:

$(x_6, y_j)$=p1
$(x_7, y_j)$=p2
$(x_8, y_j)$=p3
$(x_9, y_j)$=p4
$(x_{10}, y_j)$=p5
$(x_{11}, y_j)$=p6
$(x_{12}, y_j)$=p7.

This process can repeat for each row in the empty region.

A weighted averaging the outer P "extra" pixels on each side of the rectangle with the pixel data currently in those positions is performed to blend the edges.

As an alternative to the procedure of applying movement and pixel blending to alter the parallax of an object, the disparity map calculated using the two views, "Left" and "Right'," can be altered for the region M to reduce the disparity values in that region, and then applied to one of the "Left" or "Right" single image views to create a new view (e.g., "Left_disparity"). The result of this process is a new stereo pair (e.g., "Left" and "Left_disparity") that recreates the depth of the original pair, but with lesser parallax for the objects within the region M. Once created in this manner, the "disparity" view becomes the new opposite image to the original, or for example, a created "Left_disparity" image becomes the new "Right" image.

Returning to FIGS. 3A-3D, the method includes performing 342 depth enhancements. For example, for a stereoscopic pair of registered "Left" and "Right" images, the screen plane of the stereoscopic image may be relocated to allow a viewer to emphasize or de-emphasize object depth in the three-dimensional image. This relocation may be implemented to enhance the subjective quality of the displayed image or to create three-dimensional effects that involve changing object depth over time to simulate motion. The process for this uses the same procedures as for general readjustment of the screen plane, and for segmented object specific adjustments, but is performed voluntarily for effect, rather than necessarily for correction.

The method of FIGS. 3A-3D includes removing 344 moving objects. For example, for a stereoscopic pair of registered "Left" and "Right" images, disparity differences can be identified which indicate object motion within, into, or out of the image frame for one image. These areas can be identifiable as those which have "infinite" parallax assignments from the disparity map step of the process. Areas indicating such motion are replicated or removed using data from the other image view and/or other views captured between the "Left" and "Right" images. Without any loss of generality, we will assume that first picture taken is the leftmost, and the last picture taken is the rightmost. In actuality, the opposite can occur. In the following description the following definitions apply:

First picture: the first picture captured in the sequence (1)
Last picture: the last picture captured in the sequence (N)
Leftmost pictures: any set of pictures from $1^{st}$ to N−1
Rightmost pictures: any set of pictures from $2^{nd}$ to Nth
Left target picture: any of the leftmost pictures or a modified version of all captured pictures that will be used during the 3D generation process as left picture
Right target picture: any of the rightmost pictures or a modified picture that will be used during the 3D generation process as right picture The method of identifying and compensating for moving objects consists of the following steps. For a given sequence of pictures captured between two positions, divide each picture into smaller areas and calculate motion vectors between all pictures in all areas. Calculate by a windowed moving average the global motion that results from the panning of the camera. Then subtract the area motion vector from the global motion to identify the relative motion vectors of each area in each picture. If the motion of each area is below a certain threshold, the picture is static and the first and last picture, or any other set with the desired binocular distance, can be used as left and right target pictures to form a valid stereoscopic pair that will be used for registration, rectification, and generation of a 3D picture. If the motion of any area is above an empirical threshold, then identify all other areas that have zero motion vectors and copy those areas from any of the leftmost pictures to the target left picture and any of the rightmost pictures to the target right picture.

For objects where motion is indicated and where the motion of an object is below the acceptable disparity threshold, identify the most suitable image to copy the object from, copy the object to the left and right target images and adjust the disparities as shown in the attached figure. The more frames that are captured, the less estimation is needed to determine the rightmost pixel of the right view. Most of occluded pixels can be extracted from the leftmost images. For an object that is moving in and out of the scene between the first and last picture, identify the object and completely remove it from the first picture if there is enough data in the captured sequence of images to fill in the missing pixels.

For objects where motion is indicated and where the motion is above the acceptable disparity, identify the most suitable picture from which to extract the target object and extrapolate the proper disparity information from the remaining captured pictures.

The actual object removal process involves identifying N×N blocks, with N empirically determined, to make up a bounding region for the region of "infinite" parallax, plus an additional P pixels (for blending purposes), determining the corresponding position of those blocks in the other images using the parallax values of the surrounding P pixels that have a similar gradient value (meaning that high gradient areas are extrapolated from similar edge areas and low gradient areas are extrapolated from similar surrounding flat areas), copying the blocks/pixels from the opposite locations to the intended new location, and performing a weighted averaging of the outer P "extra" pixels with the pixel data currently in those positions to blend the edges. If it is determined to remove an object, fill-in data is generated 346. Otherwise, the method proceeds to step 348.

Figure 13A:
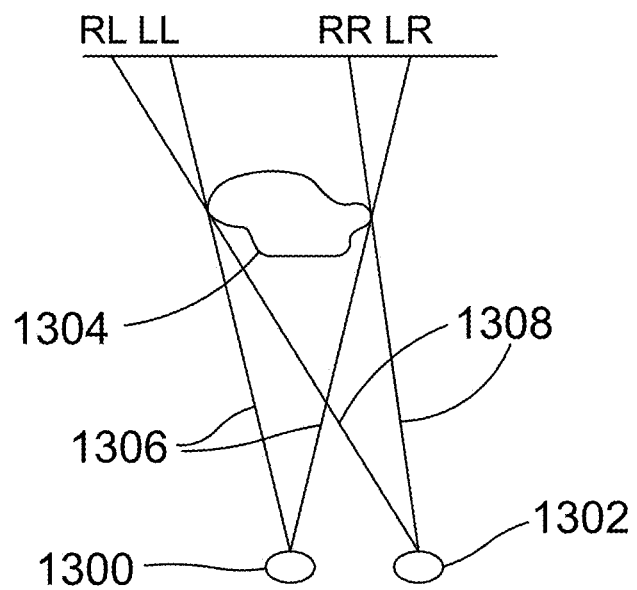
FIGS. 13A, 13B, and 13C illustrate an exemplary process for disparity interpolation according to embodiments of the present subject matter.
Figure 13B:
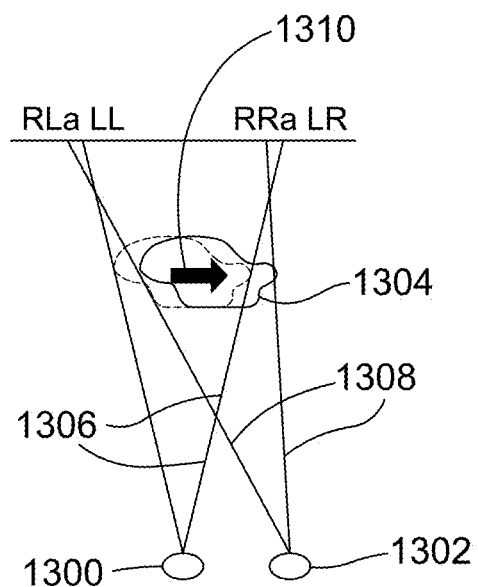
Figure 13C:
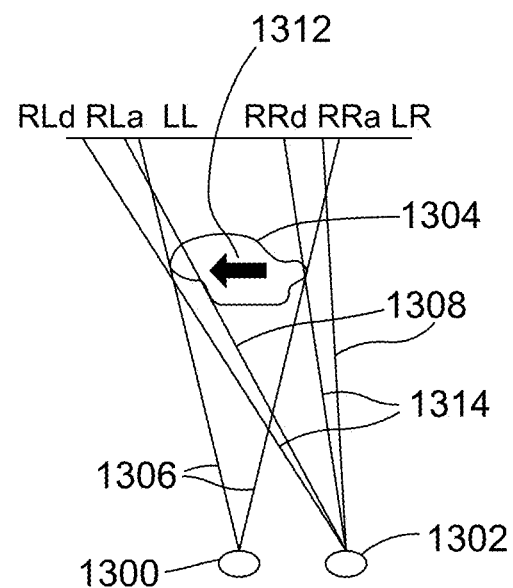

FIGS. 13A, 13B, and 13C illustrate an exemplary process for disparity interpolation according to embodiments of the present subject matter. Referring to FIGS. 13A, 13B, and 13C, positions 1300 and 1302 are positions of a camera (not shown) when capturing images of object 1304 at different times. The image captured at position 1300 was captured prior to the image captured at position 1302. A view of the object 1304 from position 1300 is indicated by lines 1306, and a view of the object 1304 from position 1302 is indicated by lines 1308. As shown by direction arrow 1310 in FIG. 13B, the object 1304 is moving from left to right across the camera's view. Between the image capture times, the object 1304 has moved from a position 1304A (shown in a broken line) to the position 1304 shown in FIG. 13B) as shown in FIG. 13B.

The movement of the object 1304 is such that the disparity is unacceptable and should be corrected. In this example, the image obtained from position 1300 can be utilized for creating a three-dimensional image, and the image obtained from position 1302 can be altered for use together with the other image in creating the three-dimensional image. To correct, the object 1304 may be moved to the left (as indicated by direction arrow 1312 in FIG. 13C) in the image captured from position 1302. The object 1304 may be moved to the left to a position of a desired left view (i.e., the positioning of the object 1304 within the view from position 1302 as indicated by lines 1314 shown in FIG. 13C. The desired left image for the three-dimensional image may be composed by reducing visibility of the left-most pixel from RLa to RLd; and by increasing visibility of the right-most pixel by interpolating the [RRd, RRa] area from pixels found in the right-most of RRa.

Figure 14:
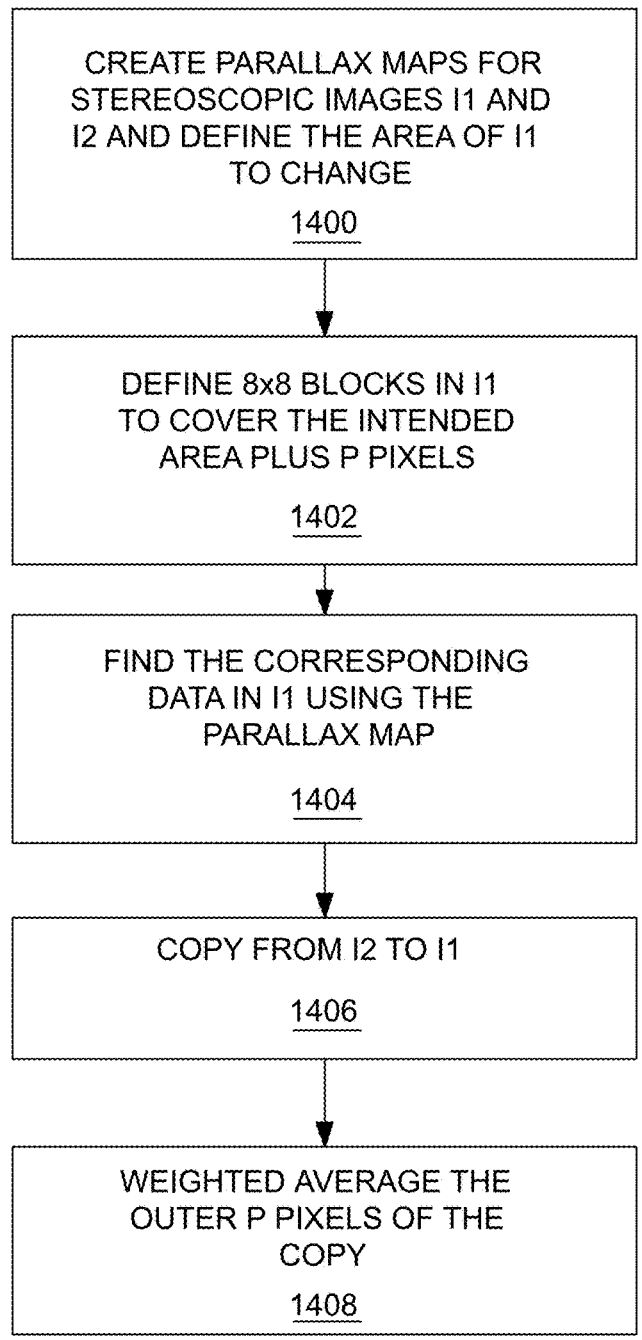
FIG. 14 is a flow chart of an exemplary method for adding/removing objects from a single image according to embodiments of the present subject matter.
Figure 15:
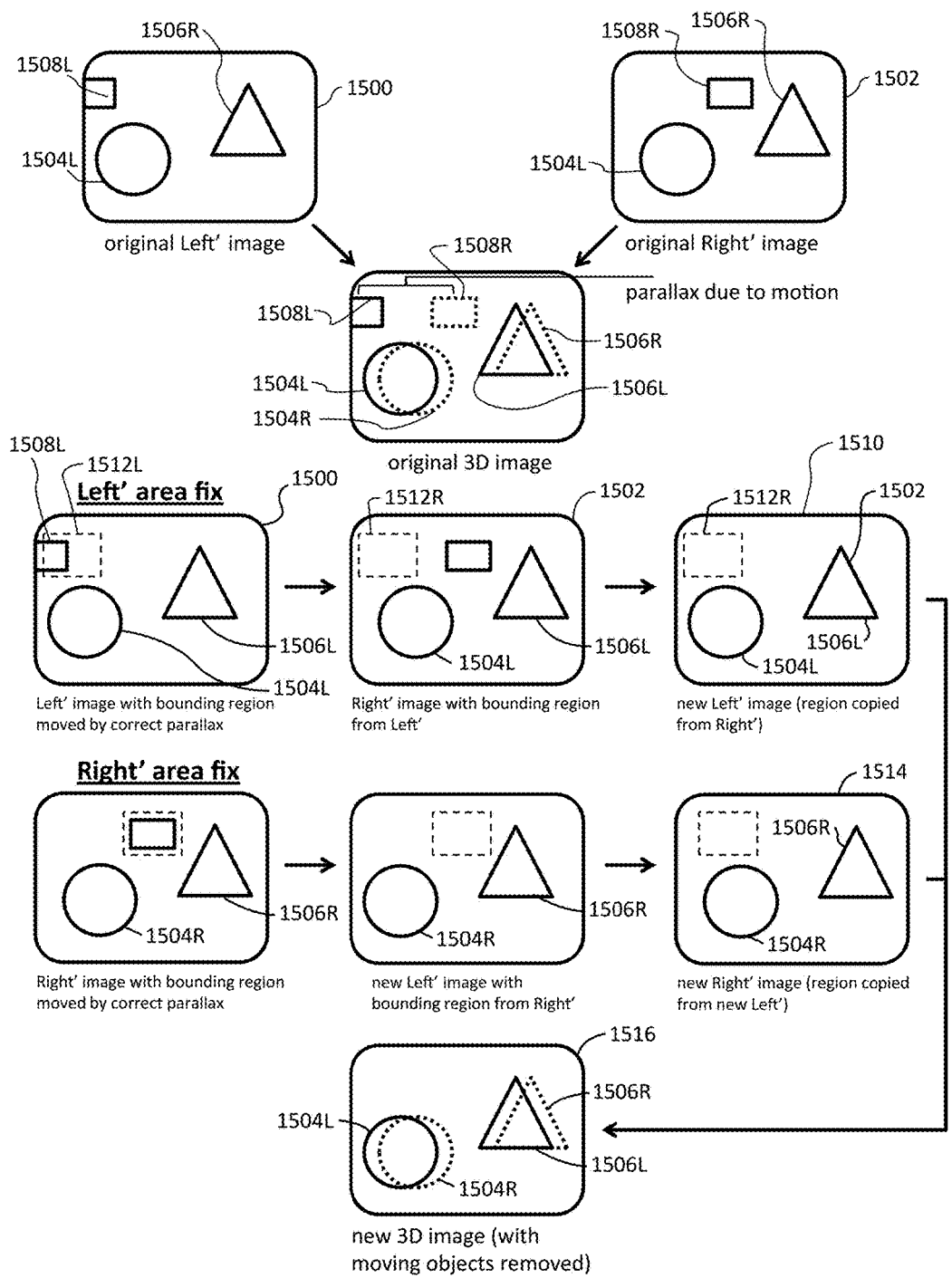
FIG. 15 is an exemplary diagram of a process for adding/removing objects from a single image according to embodiments of the present disclosure.

Another example of a process for adding/removing objects from a single image is illustrated in FIGS. 14 and 15. FIG. 14 illustrates a flow chart of an exemplary method for adding/removing objects from a single image according to embodiments of the present subject matter. Referring to FIG. 14, the method includes creating parallax maps for stereoscopic images I1 and I2 and defining the area of image I1 to change (step 1400). The method of FIG. 13 also includes defining 1402 8×8 blocks in image I1 to cover the intended area plus P pixels. Using the parallax map, the corresponding data in image 12 is found (step 1404). The corresponding data is copied from image 12 to image I1 (step 1406). Next, the method includes applying a weighted average of the outer P pixels of the copy (step 1408).

Referring to FIG. 15, the figure is a diagram of an exemplary method for adding/removing objects from a single image according to embodiments of the present subject matter. An original "Left" image 1500 and an original "Right" image 1502 are provided. The images may be paired to form a three-dimensional image in accordance with embodiments of the subject matter described herein. The images 1500 and 1502 both show objects, which are designated 1504L and 1506L, respectively, in the "Left" image 1500, and designated 1504R and 1506R, respectively, in the "Right" image 1502. The parallax of these objects is such that three-dimensional display of these objects in the three-dimensional image 1504 would be satisfactory to a viewer.

Referring to FIG. 15, the images of another object (designated 1508L in the "Left" image 1500, and designated 1508R in the "Right" image 1502) were captured while the object was moving at such a speed such that the parallax disparity of the object in the "Left" image 1500 and the "Right" image 1502 makes viewing the three-dimensional image 1504 of the object unsatisfactory to a viewer. For this reason, the moving object may be removed from the "Left" image 1500 and the "Right" image 1502. A new "Left" image 1510 without the moving object may be generated by bounding a region 1512L to be corrected in the original "Left" image 1500 for removing the moving object (i.e., an area including the moving object in the "Left" image 1500). A corresponding area in the original "Right" image 1502 may be copied and used for replacing the bounded region 1512L in the original "Left" image 1500 to render the new "Left" image 1510. In a similar manner, a new "Right" image 1514 without the moving object can be rendered. The new "Left" image 1510 and the new "Right" image 1514 can then be paired for rendering a new three-dimensional image 1516 without the moving object.

As an alternative to the procedure of identifying bounding regions of 8×8 blocks around objects to be added or removed in a view, the disparity map calculated using multiple views, "Left", "Right", and/or the images in between, can be applied to one of the "Left" or "Right" single image views to create a new view (e.g., "Left_disparity"). The result of this process is a new stereo pair (e.g., "Left" and "Left_disparity") that effectively recreates the depth of the original pair, but without object occlusions, movement, additions, or removals. Once created in this manner, the "disparity" view becomes the new opposite image to the original, or for example, a created "Left_disparity" image becomes the new "Right" image. Effectively, this procedure mimics segmented object removal and/or addition, but on a full image scale.

Returning to FIGS. 3A-3D, the method includes applying 348 color correction to the images. For example, for a plurality of images, a pixel-by-pixel color comparison may be performed to correct lighting changes between image captures. This is performed by using the parallax map to match pixels from Left' to Right' and comparing the luminance and chrominance values of those pixels. Pixels with both large luminance and chrominance discrepancies are ignored, assuming occlusion. Pixels with similar luminance and variable chrominance are altered to average their chrominance levels to be the same. Pixels with similar chrominance and variable luminance are altered to average their luminance values to account for lighting and reflection changes.

For a finalized, color corrected, motion corrected stereoscopic image pair, the "Left" and "Right" images are ordered and rendered to a display as a stereoscopic image. The format is based on the display parameters. Rendering can require interlacing, anamorphic compression, pixel alternating, and the like.

For a finalized, color corrected, motion corrected stereoscopic image pair, the "Left" view may be compressed as the base image and the "Right" image may be compressed as the disparity difference from the "Left" using a standard video codec, differential JPEG, or the like.

The method of FIGS. 3A-3D includes displaying 350 the three-dimensional image on a stereoscopic display. For example, the three-dimensional image may be displayed on the display 112 of the device 100 or a display of the computer 108. Alternatively, the three-dimensional image may be suitably communicated to another device for display.

When a video sequence is captured with lateral camera motion as described above, stereoscopic pairs can be found within the sequence of resulting images. Stereoscopic pairs are identified based on their distance from one another determined by motion analysis (e.g., motion estimation techniques). Each pair represents a three-dimensional picture or image, which can be viewed on a suitable stereoscopic display. If the camera does not have a stereoscopic display, the video sequence can be analyzed and processed on any suitable display device. If the video sequence is suitable for creating three-dimensional content (e.g., one or more three-dimensional images), it is likely that there are many potential stereoscopic pairs, as an image captured at a given position may form a pair with images captured at several other positions. The image pairs can be used to create three-dimensional still images or re-sequenced to create a three-dimensional video.

Figure 16:
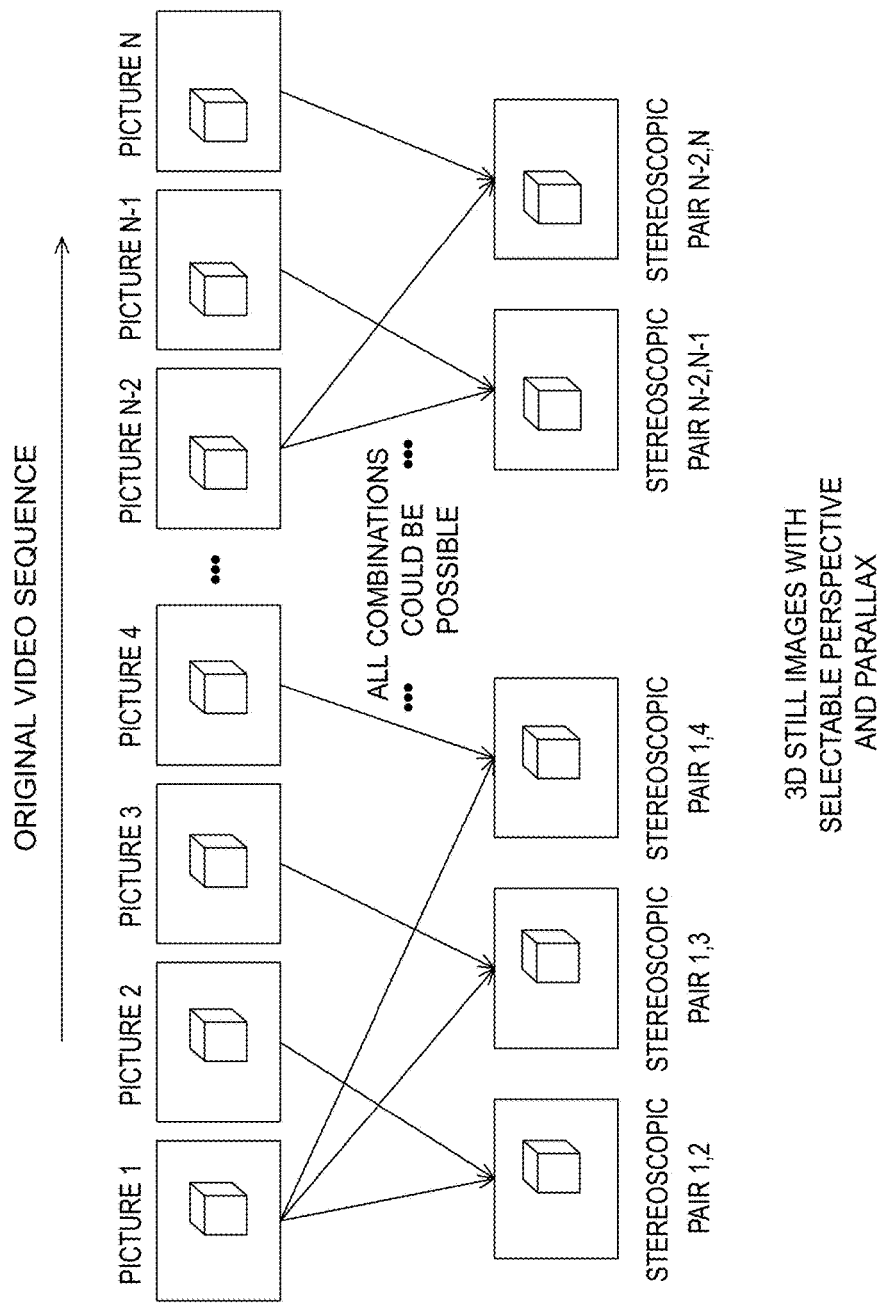
FIG. 16 illustrates an exemplary process for creating three-dimensional still images from a standard two-dimensional video sequence by identifying stereoscopic pairs in accordance with embodiments of the present disclosure.
Figure 17:
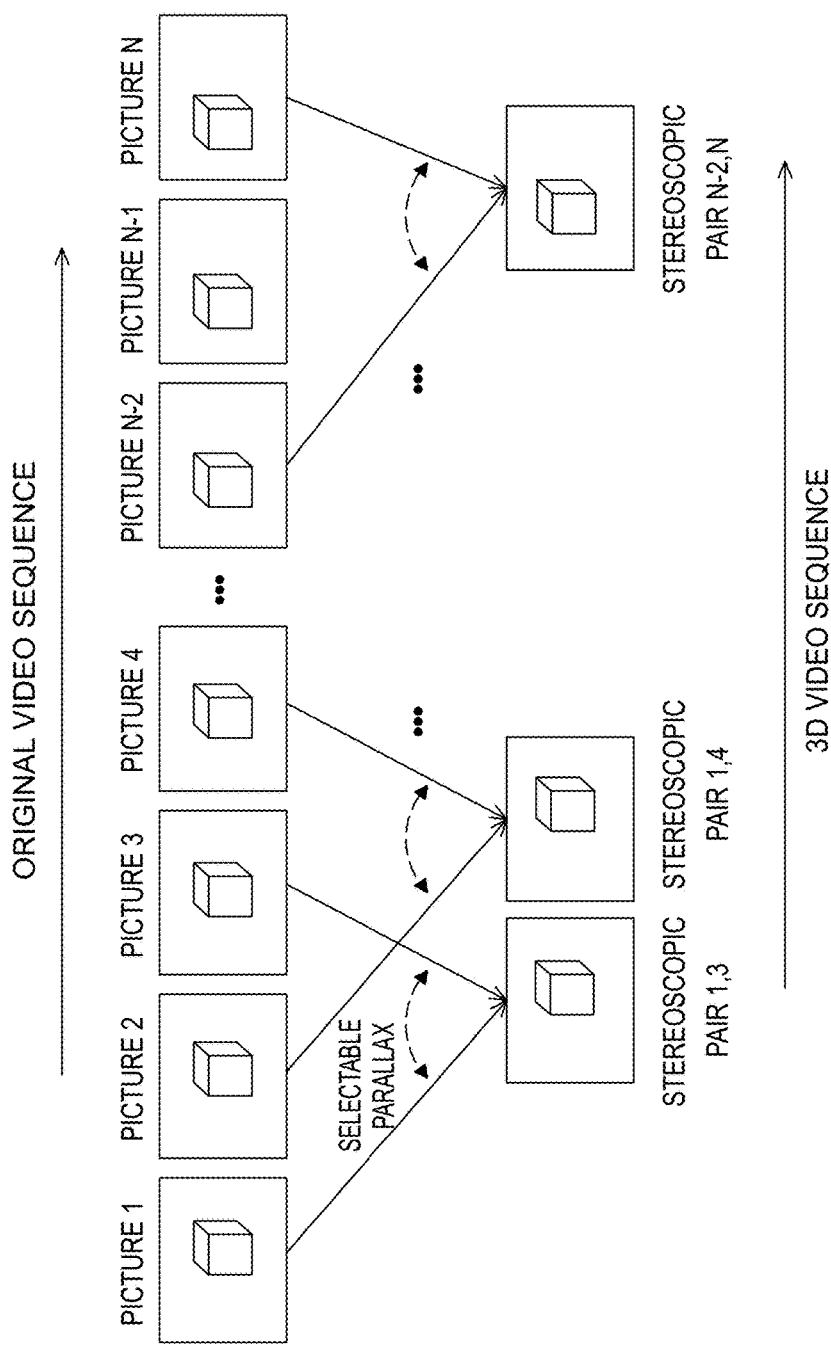
FIG. 17 illustrates an exemplary process for creating three-dimensional video from a standard two-dimensional video sequence according to embodiments of the present disclosure.

When creating three-dimensional still images, the user can select which images to use from the potential pairs, thereby adjusting both the perspective and parallax of the resulting images to achieve the desired orientation and depth. FIG. 16 illustrates an exemplary process for generating three-dimensional still images from a standard two-dimensional video sequence by identifying stereoscopic pairs in accordance with embodiments of the present subject matter. Referring to FIG. 16, this process can be used to create content for multi-view stereoscopic displays by creating a set of three-dimensional images of a subject with the same parallax but captured from slightly different positions. A three-dimensional video sequence can be created using one of the following methods. The first method is to select stereoscopic pairs with a constant positional offset, and sequence them in the same relative order in which they were captured. The user can select the offset to achieve the desired depth. During playback this method creates the effect of camera motion the same as occurred during capture, while the depth of the scene remains constant due to the fixed parallax. FIG. 17 illustrates an exemplary process for generating three-dimensional video from a standard two-dimensional video sequence according to embodiments of the present subject matter.

Figure 18:
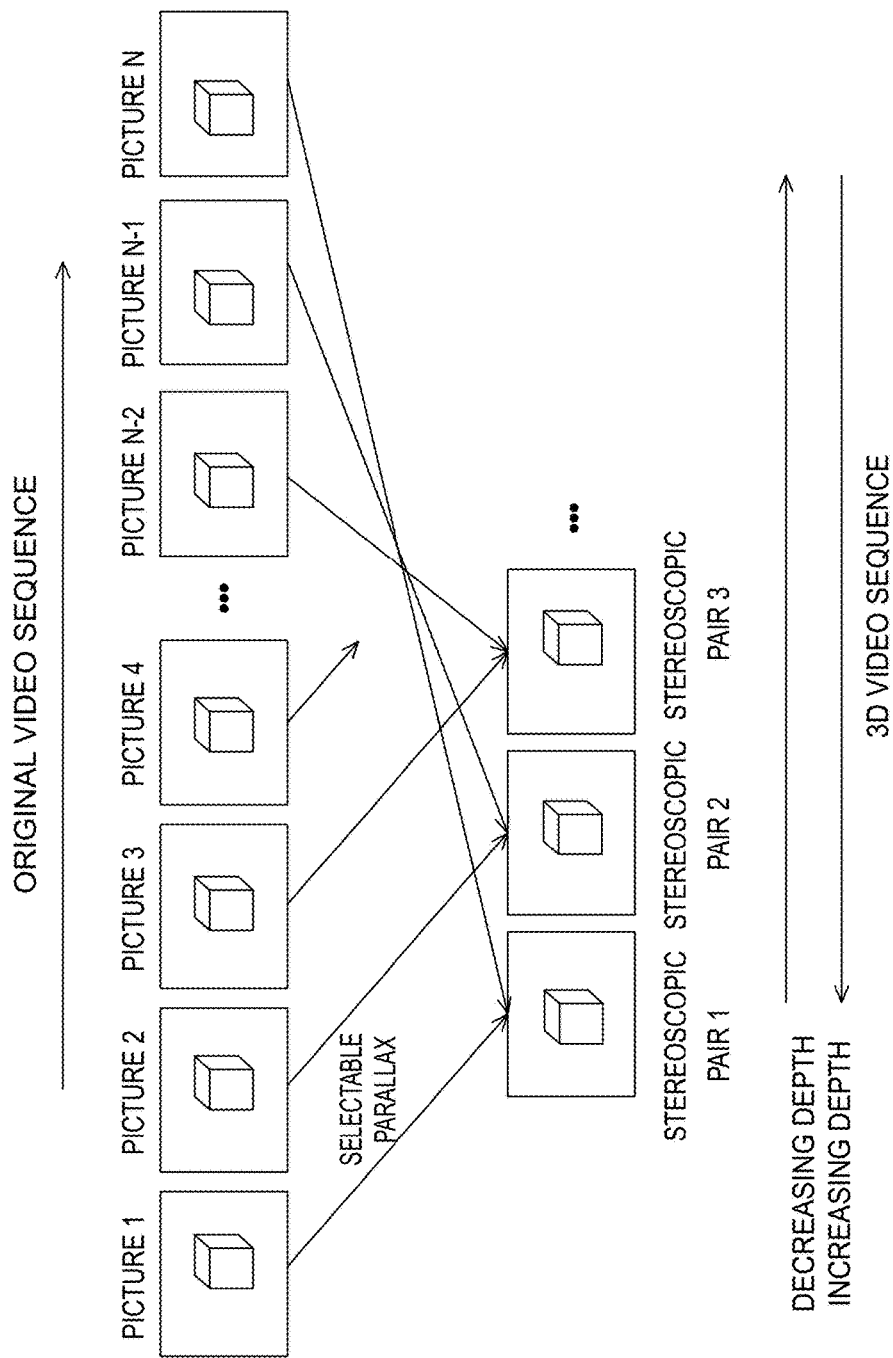
FIG. 18 illustrates an exemplary process of creating three-dimensional video with changing parallax and no translational motion from a standard two-dimensional video sequence in accordance with an embodiment of the subject matter disclosed herein.

Another method of creating a three-dimensional sequence includes creating stereoscopic pairs by grouping the first and last images in the sequence, followed by the second and next-to-last images, and so on until all images have been used. During playback this creates the effect of the camera remaining still while the depth of the scene decreases over time due to decreasing parallax. The three-dimensional images can also be sequenced in the opposite order so that the depth of the scene increases over time. FIG. 18 illustrates an exemplary process of generating three-dimensional video with changing parallax and no translational motion from a standard two-dimensional video sequence in accordance with an embodiment of the subject matter disclosed herein. The camera or other display device can store a representation of the resulting three-dimensional still images or video in an appropriate compressed format. For more efficient storage of still images, one of the images in the stereoscopic pair can be compressed directly, while the other image is represented by its differences with the first image. For video sequences, the first stereoscopic pair in the sequence can be stored as described above for still images, while all images in other pairs are represented by their differences with the first image.

The generation and presentation, such as display, of three-dimensional images of a scene in accordance with embodiments of the present subject matter may be implemented by a single device or combination of devices. In one or more embodiments of the present subject matter, images may be captured by a camera such as, but not limited to, a digital camera. The camera may be connected to a personal computer for communication of the captured images to the personal computer. The personal computer may then generate one or more three-dimensional images in accordance with embodiments of the present subject matter. After generation of the three-dimensional images, the personal computer may communicate the three-dimensional images to the camera for display on a suitable three-dimensional display.

The camera may include a suitable three-dimensional display. Also, the camera may be in suitable electronic communication with a high-definition television for display of the three-dimensional images on the television. The communication of the three-dimensional images may be, for example, via an HDMI connection.

In one or more other embodiments of the present subject matter, three-dimensional images may be generated by a camera and displayed by a separate suitable display. For example, the camera may capture conventional two-dimensional images and then use the captured images to generate three-dimensional images. The camera may be in suitable electronic communication with a high-definition television for display of the three-dimensional images on the television. The communication of the three-dimensional images may be, for example, via an HDMI connection.

Figure 19:
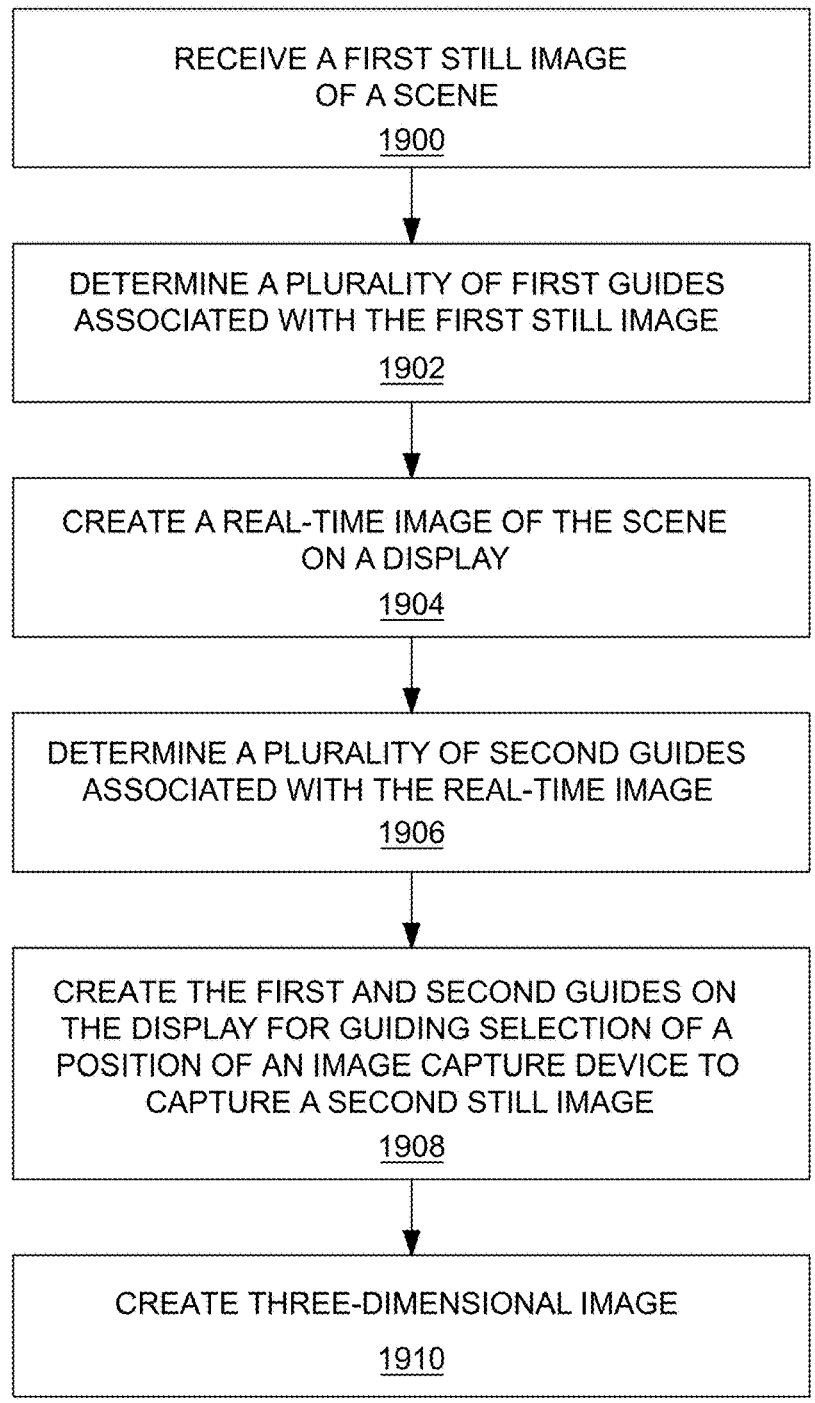
FIG. 19 is a flow chart of an exemplary method for generating a three-dimensional image of a scene using the device shown in FIG. 1, alone or together with any other suitable device, in accordance with embodiments of the present disclosure.

In accordance with embodiments of the presently disclosed subject matter, the memory 104 and the CPU 106 shown in FIG. 1 may be operable together to implement an image generator function 114 for generating three-dimensional images. The image generator function 114 may generate a three-dimensional image of a scene using two or more images of the scene captured by the device 100. FIG. 19 illustrates a flow chart of an exemplary method for generating a three-dimensional image of a scene using the device 100, alone or together with any other suitable device, in accordance with embodiments of the present disclosure. In this example, the device 100 may be operating in a "stereoscopic mode" for assisting the camera user in generating high-quality, three-dimensional images of a scene. Referring to FIG. 19, the method includes receiving 1900 a first still image of a scene to which the sensor array 102 is exposed. For example, the sensor array 102 may be used for capturing a still image of the scene. The still image and settings of the device 100 during capture of the image may be stored in memory 104. The CPU 106 may implement instructions stored in the memory 104 for storing the captured image in the memory 104.

The method of FIG. 19 includes determining 1902 a plurality of first guides associated with the first still image. For example, depth detection and edge and feature point extraction may be performed on the first still image to identify a set of interest points (IP) for use in assisting the user to move the camera for capturing a second still image to be used for generating a three-dimensional image. Additional details of this technique are described in further detail herein.

The method of FIG. 19 includes displaying a real-time image of the scene on a display. For example, the device 100 may enter a live-view mode in which the user may direct the device 100 such that the sensor array 102 is exposed to a scene, and in this mode an image of the scene is displayed on the display 112 in real-time as understood by those of skill in the art. As the device 100 is moved, the real-time image displayed on the display 112 also moves in accordance with the movement of the device 100.

The method of FIG. 19 includes determining 1906 a plurality of second guides associated with the real-time image. For example, one or more of the image sensor data, an image sensor property, optical property, focal property, and viewing property of the captured images may be determined. In addition for example, the method may include calculating one of camera positional offset and pixel offset indicia in a real-time display of the scene to indicate a target camera positional offset with respect to one captured image and potentially, one of the image sensor property, optical property, focal property, and viewing property of the captured images. Further, for example, for vertical and perspective alignment, a Hough or any other transform for line identification may be applied, and the dominant horizontal and perspective lines in the two images (alternately colored) may be superimposed over the displayed real-time image in the live-view mode to assist the user in aligning the second picture vertically and for perspective. Further, a procedure to calculate required horizontal displacement, as described in more detail herein, may use the interest point set (IP) of the first image for performing a point correspondence operation to find similar points in the displayed real-time image as guidance for the capture of a second image.

The method of FIG. 19 includes displaying 1908 the first and second guides on the display for guiding selection of a position of an image capture device to capture a second still image of the scene for pairing the first and second still images as a stereoscopic pair of a three-dimensional image. For example, an "alignment guide" may be displayed on the display 112, as described in more detail herein, for assisting a user to position the device 100 for capturing a second image of the scene that would be suitable to use with the first captured image for generation of a three-dimensional image. Once the device 100 is positioned in suitable alignment for capturing the second image, the image generator 114 can determine such condition and take the second image automatically, or the user may then operate the device 100 for capturing the second image, such as, but not limited to, depressing an image capture button on the device 100. After the second image is captured, the first and second captured images may be suitably processed in accordance with embodiments of the present disclosure for creating a three-dimensional image as shown in step 1910. Particularly, two of the captured still images can be corrected to compensate for one or more of camera vertical shift, vertical tilt, horizontal tilt, and rotation. Other images may also be automatically captured between the time the first and second images are captured, and may also be used for generating a three-dimensional image based on the corrected still images. The method of FIG. 19 may include displaying 210 the three-dimensional image. For example, the image may be displayed on the display 112 or any other suitable display.

Although the above examples are described for use with a device capable of capturing images, embodiments described herein are not so limited. Particularly, the methods described herein for assisting a camera user to generate a three-dimensional image of a scene may, for example, be implemented in any suitable system including a memory and computer processor. The memory may have stored therein computer-executable instructions. The computer processor may execute the computer-executable instructions. The memory and computer processor may be configured for implementing methods in accordance with embodiments of the present disclosure.

Figure 20A:
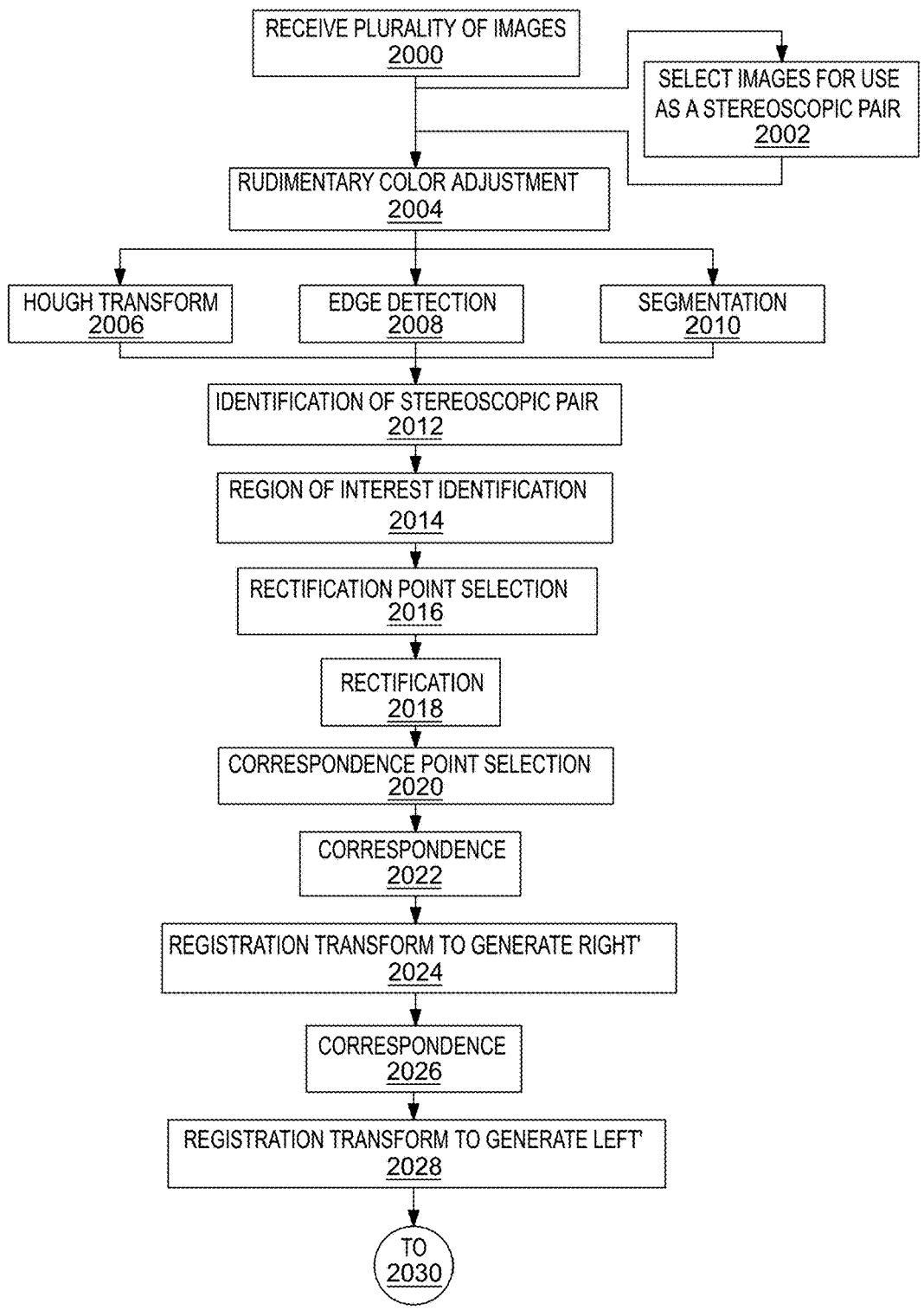
FIGS. 20A and 20B illustrate a flow chart of an exemplary method for generating a three-dimensional image of a scene in accordance with embodiments of the present disclosure.
Figure 20B:
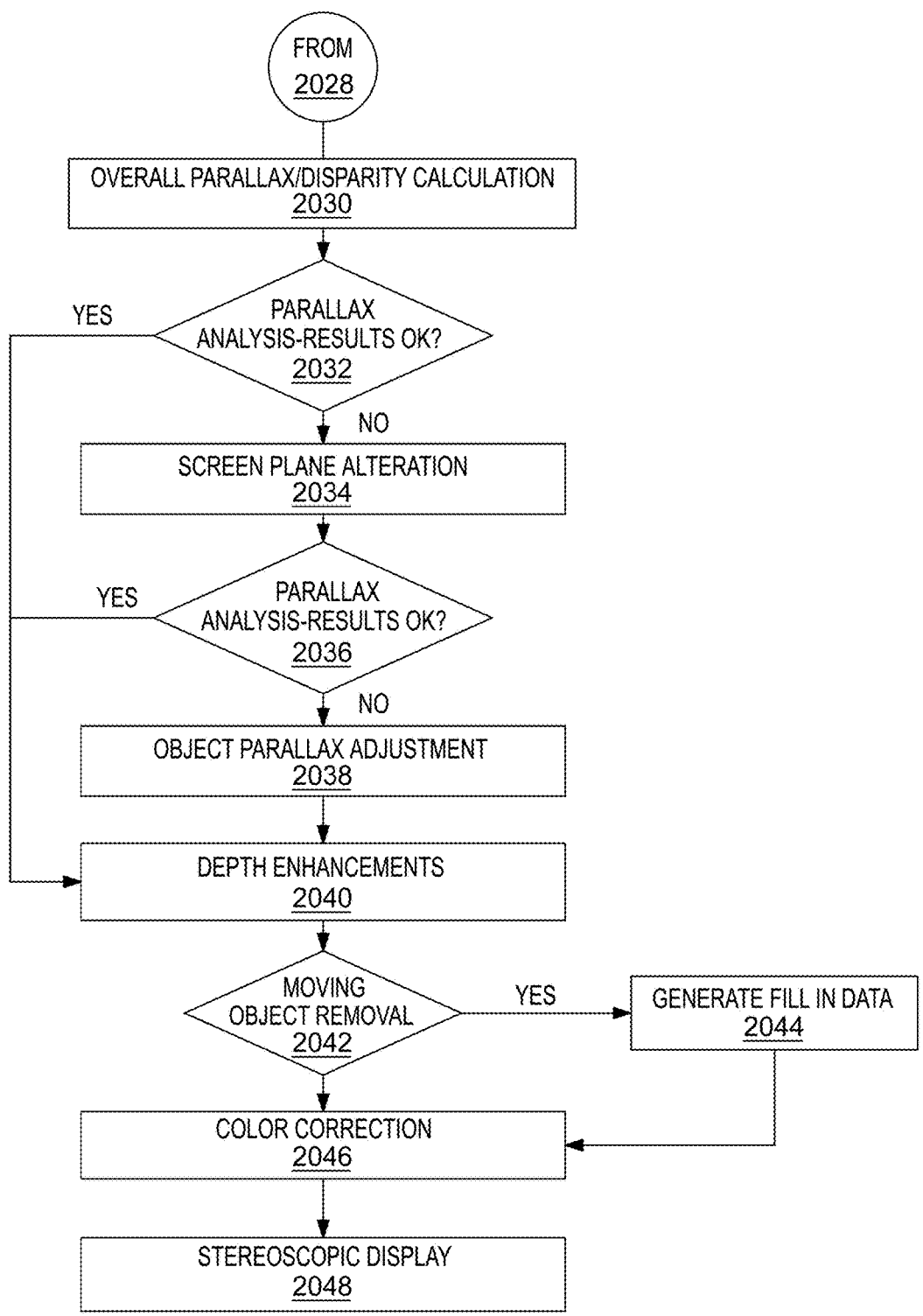

FIGS. 20A and 20B illustrate a flow chart of an exemplary method for generating a three-dimensional image of a scene in accordance with embodiments of the present disclosure. The method can convert a plurality of images to a three-dimensional image that can be viewed on a stereoscopic display. Referring to FIG. 20A, the method can begin with receiving 2000 a plurality of images of a scene. For example, the images can be captured by a standard digital video or still camera, or a plurality of different cameras of the same type or different types. A camera user may use the camera to capture an initial image. Next, the camera user may capture subsequent image(s) at positions to the left or right of the position at which the initial image was captured. These images may be captured as still images or as a video sequence of images. The images may be captured using a device such as the device 100 shown in FIG. 1. The images may be stored in a memory such as the memory 104 shown in FIG. 1. In another example, the images may be received at a device after they have been captured by a different device.

In accordance with embodiments of the present disclosure, a user may create high-quality, three-dimensional content using a standard digital still, video camera (or cameras), other digital camera equipment or devices (e.g., a camera-equipped mobile phone), or the like. In order to generate a good three-dimensional picture or image, a plurality of images of the same object can be captured from varied positions. In an example, in order to generate three-dimensional images, a standard digital still or video camera (or cameras) can be used to capture a plurality of pictures with the following guidelines. The user uses the camera to capture an image, and then captures subsequent pictures after moving the camera left or right from its original location. These pictures may be captured as still images or as a video sequence.

Figure 21:
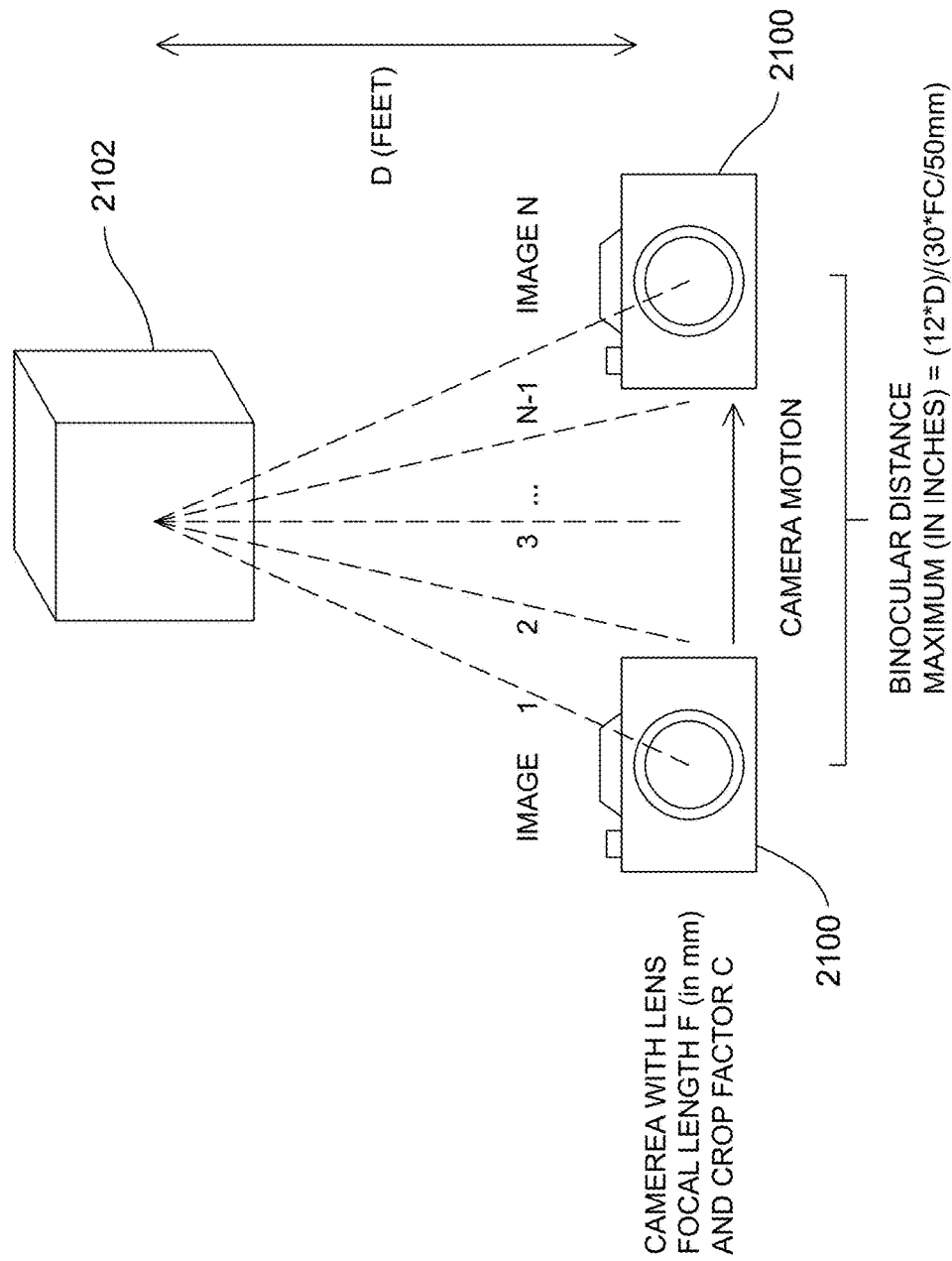
FIG. 21 is a diagram of an exemplary image capture technique for facilitating subsequent conversion to three-dimensional images in accordance with embodiments of the present disclosure.

FIG. 21 illustrates a diagram of an exemplary image capture technique for facilitating subsequent conversion to three-dimensional images in accordance with embodiments of the present disclosure. Referring to FIG. 21, a camera 2100 is used for capturing N images (i.e., images 1, 2, 3, . . . N−1, N) of an object of interest 2102 within a scene. The camera 2100 and the object 2102 are positioned approximately D feet apart as each image is captured. The distance between positions at which images are captured (the stereo baseline) for generating a three-dimensional image can affect the quality of the three-dimensional image. The optimal stereo baseline between the camera positions can vary anywhere between 3 centimeters (cm) and several feet, dependent upon a variety of factors, including the distance of the closest objects in frame, the lens focal length or other optics properties of the camera, the camera crop factor (dependent on sensor size), the size and resolution of the display on which the images will be viewed, and the distance from the display at which viewers will view the images. A general recommendation is that the stereo baseline should not exceed the distance defined by the following equation:

$$B = \frac{12D}{30FC/50},$$

where B is the stereo baseline separation in inches, D is the distance in feet to the nearest object in frame, F is the focal length of the lens in millimeters (mm), and C is the camera crop factor relative to a full frame (36×24 square mm) digital sensor (which approximates the capture of a 35 mm analog camera). In the examples provided herein, it is assumed that at least two images have been captured, at least two of which can be interpreted as a stereoscopic pair.

Figure 22:
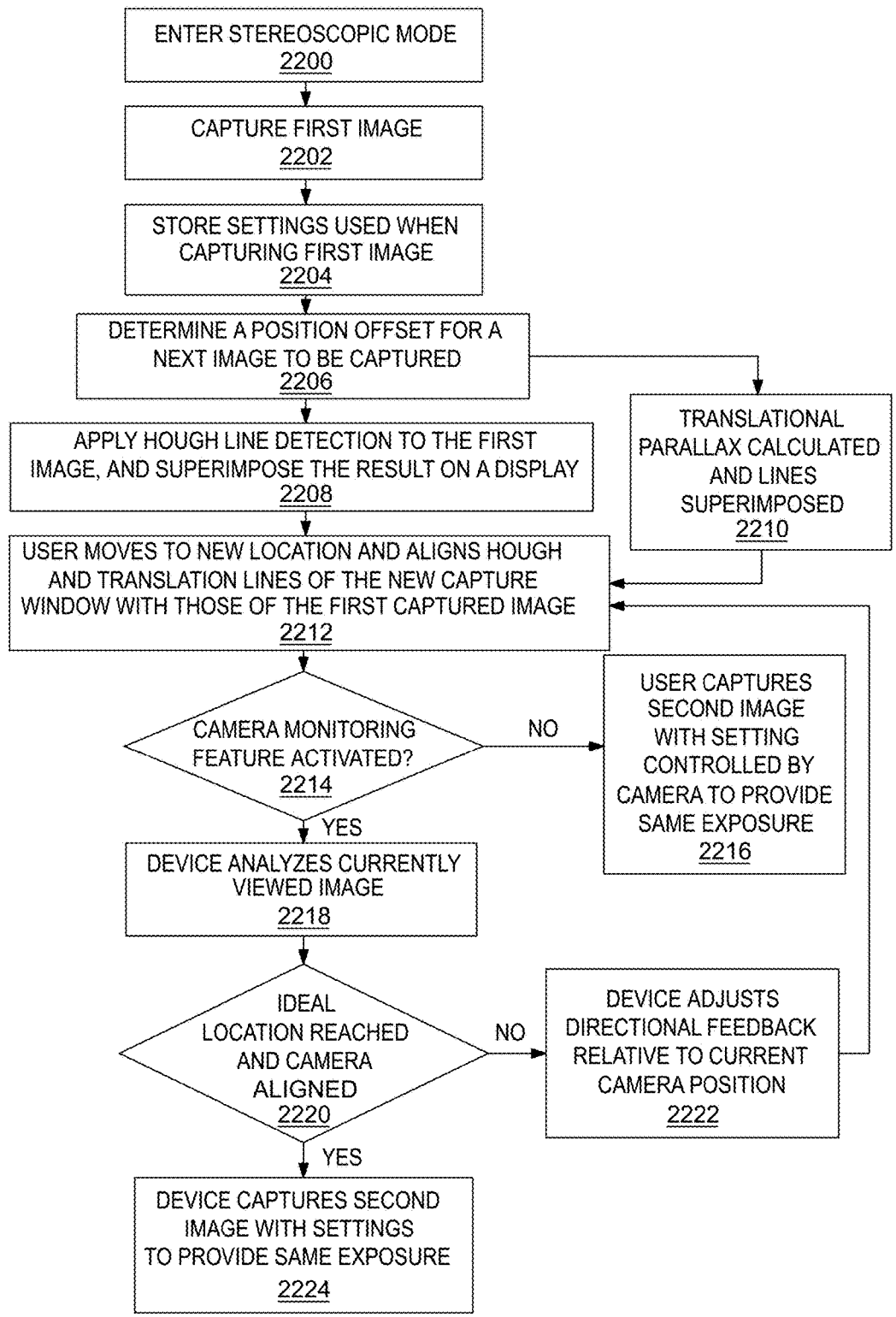
FIG. 22 is a flow chart of an exemplary method for assisting a user to capture images for use in a process to yield high-quality, three-dimensional images in accordance with embodiments of the present disclosure.

Embodiments of the present disclosure define a "stereoscopic mode," which may be used in conjunction with a standard digital still camera, standard video camera, other digital camera, or the like to assist the camera user in performing the function of capturing images that ultimately yield high-quality, three-dimensional images. FIG. 22 illustrates a flow chart of an exemplary method for assisting a user to capture images for use in a process to yield high-quality, three-dimensional images in accordance with embodiments of the present disclosure. The image generator function 114 shown in FIG. 1 may be used for implementing the steps of the method of FIG. 22. Referring to FIG. 22, the method includes entering 2200 a stereoscopic mode. After entering the stereoscopic mode, the method includes capturing 2202 the first image of the object or scene of interest. The camera stores 2204 its settings, including, but not limited to, aperture, focus point, focus algorithm, focal length, ISO, exposure, and the like, for use in capturing other images of the object or scene, to ensure consistent image quality. According to an aspect, the only camera variable that may be allowed to change between image captures of a pair is shutter speed, and then, only in the context of maintaining a constant exposure (to suitable tolerances).

The method of FIG. 22 includes determining 2206 a position offset for a next image to be captured. For example, in the stereoscopic mode, upon capture of the first image of a pair, the camera may use the information relating to optics, focus, and depth of field (Circle of Confusion), in combination with measurable qualities of the capture image, to approximate the depth of the closest focused object in the frame. For a given combination of image (camera) format circle of confusion (c), f-stop (aperture) (A), and focal length (F), the hyperfocal distance (the nearest distance at which the far end depth of field extends to infinity) of the combination can be approximated using the following equation:

$$H \approx \frac{F^2}{A*c}.$$

In turn, the near field depth of field ($D_n$) for an image can be approximated for a given focus distance (d) using the following equation:

$$D_n \approx \frac{H*d}{(H+d)}$$

(for moderate to large d), and the far field DOF ($D_f$) as $$D_f \approx \frac{H*d}{(H-d)}$$

for d<H. For values of d>=H, the far field DOF is infinite. Since the focus distance, focal length, and aperture are recorded at the time of capture, and the circle of confusion value is known for a given camera sensor format, the closest focused object can be assumed to be at the distance $D_n$, while the furthest focused pixels are at $D_f$.

In addition to this depth calculation, edge and feature point extraction may be performed on the image to identify interest points for later use. To reduce the complexity of this evaluation, the image may be down-scaled to a reduced resolution before subsequent processing. An edge detection operation is performed on the resultant image, and a threshold operation is applied to identify the most highly defined edges at a given focus distance. Finally, edge crossing points are identified. This point set, IP, represents primary interest points at the focused depth(s) of the image.

Figure 23A:
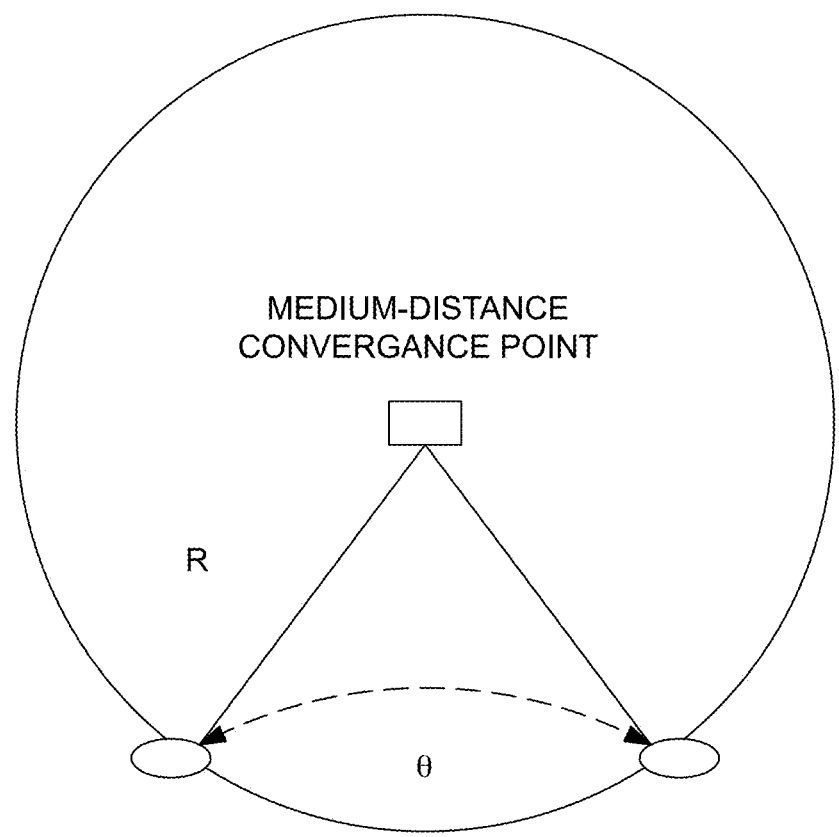
FIGS. 23A and 23B depict diagrams of examples of close and medium-distance convergence points, respectively, in accordance with embodiments of the present disclosure.
Figure 23B:
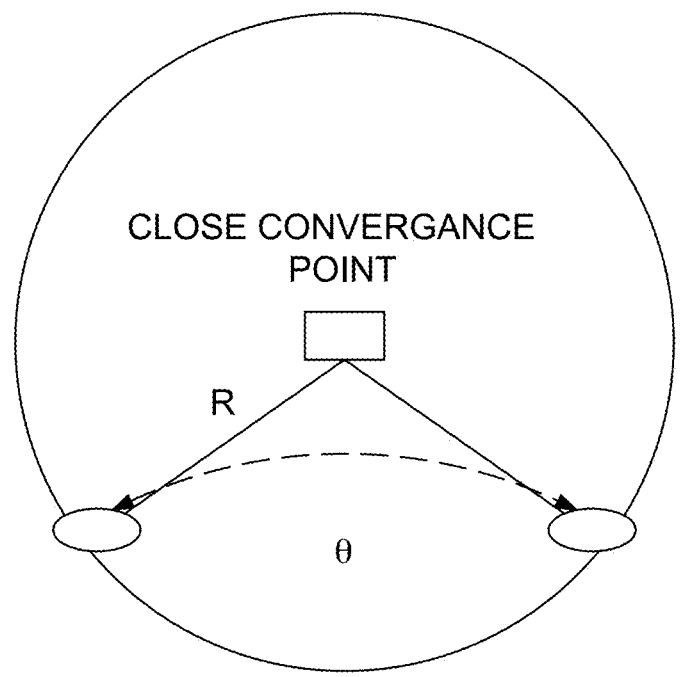

The stereoscopic camera assist method then uses the depth values $D_n$ and $D_f$ to determine the ideal distance to move right or left between the first and subsequent image captures. The distance to move right or left between the first and subsequent image captures is the position offset. It is assumed that the optimal screen plane is some percentage, P, behind the nearest sharp object in the depth of field, or at $$D_s = (D_n * (1 + P/100)),$$

where P is a defined percentage that may be camera and/or lens dependent. At the central point of this plane, an assumed point of eye convergence, there will be zero parallax for two registered stereoscopic images. Objects in front of and behind the screen plane will have increasing amounts of disparity as the distance from the screen increases (negative parallax for objects in front of the screen, positive parallax for object behind the screen). FIGS. 23A and 23B depict diagrams of examples of close and medium-distance convergence points, respectively, in accordance with embodiments of the present disclosure. Referring to the examples of FIGS. 23A and 23B, this central point of the overlapping field of view on the screen plane (zero parallax depth) of the two eyes in stereoscopic viewing defines a circle that passes through each eye with a radius, R, equal to the distance to the convergence point. Still referring to FIGS. 23A and 23B, the angle, θ, between the vectors from the central point on the screen plane to each of the two eyes is typically between 1° and 6°. A default of 2° is applied, with a user option to increase or decrease the angle for effect. Medium distance convergence gives a relatively small angular change, while close convergence gives a relatively large angular change.

The value $D_s$ gives the value of R. Hence, the binocular distance indicated to the user to move before the second/last capture is estimated as $$B = 2 * D_s \sin\frac{\theta}{2}.$$

or for default θ=2°, and $$B = \frac{D_s}{29}$$

for B and $D_s$ measured in inches (or centimeters, or any consistent unit).

The method of FIG. 22 includes identifying a bounding box for the set of focused points, IP, defined above, and superimposing the boundaries of this region with proper translational offset, S, on a display (or viewfinder) as a guide for taking the second picture 2210. In addition to the binocular distance calculation, a feedback mechanism may assist the user with camera alignment for the second/last capture 2208. One exemplary process for this is to apply a Hough transform for line detection to the first image, and superimpose the dominant horizontal and perspective lines in the two images (alternately colored) over the live-view mode or electronic viewfinder to assist the user in aligning the second/last picture vertically and for perspective. It should be noted that the Hough step is optional. For example, these guide lines may be displayed on the display 112 shown in FIG. 1. At step 2212, a user moves the image capture device to a new location, aligning the translation region and any other guides on the display with those of the first captured image.

The value S is calculated using the value $D_s$ (converted to mm) and the angle of view (V) for the capture. The angle of view (V) is given by the equation $$V = 2 * \tan^{-1}\frac{W}{2 * F}$$

for the width of the image sensor (W) and the focal length (F). Knowing V and $D_s$, the width of the field of view (WoV) can be calculated as $$WoV = 2 * D_s * \tan(V/2) = D_s * W/F.$$

The width of view for the right eye capture is the same. Hence, if the right eye capture at the camera is to be offset by the binocular distance B, and the central point of convergence is modeled as B/2, the position of the central point of convergence in each of $WoV_1$ and $WoV_2$ (the width of view of images 1 and 2, respectively) can be calculated. Within $WoV_1$, the central point of convergence will lie at a position $$C1 = \frac{WoV}{2} + \frac{B}{2}.$$

Conversely, within $WoV_2$, the central point of convergence will lie at a position $$C2 = \frac{WoV}{2} - \frac{B}{2}.$$

Figure 26:
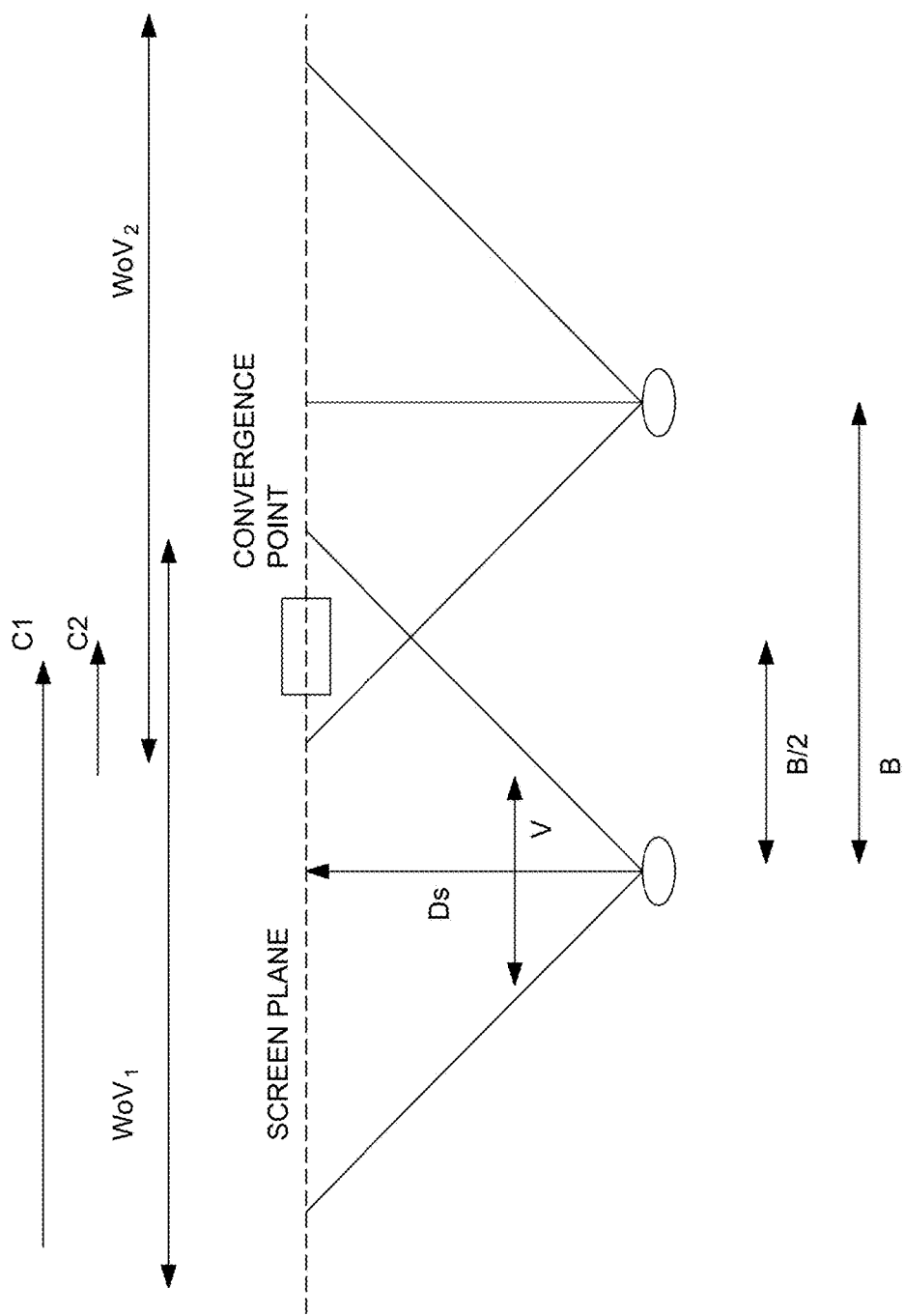
FIG. 26 is a schematic diagram illustrating translational offset determination according to embodiments of the present disclosure.

FIG. 26 is a schematic diagram illustrating translational offset determination according to embodiments of the present disclosure. If X1 is the X-coordinate in the left image that corresponds to C1, X1 is calculated as $$X1 = \frac{P_w}{WoV} * C1,$$

and X2 is the similar coordinate for the right image to be captured, calculated as $$X2 = \frac{P_w}{WoV} * C2,$$

where $P_w$ is the image width in pixels. Finally, S is calculated as $$S = X1 - X2 = \frac{P_w}{WoV} * B = \frac{2 * P_w}{\frac{W}{F}} * \sin\frac{\theta}{2}.$$

Since W, F, and $P_w$ are camera-specific quantities, the only specified quantity is the modeled convergence angle, θ, as noted typically 1-2 degrees. The value S may need to be scaled for use with a given display, due to the potentially different resolution of the display and the camera sensor.

Figure 24:
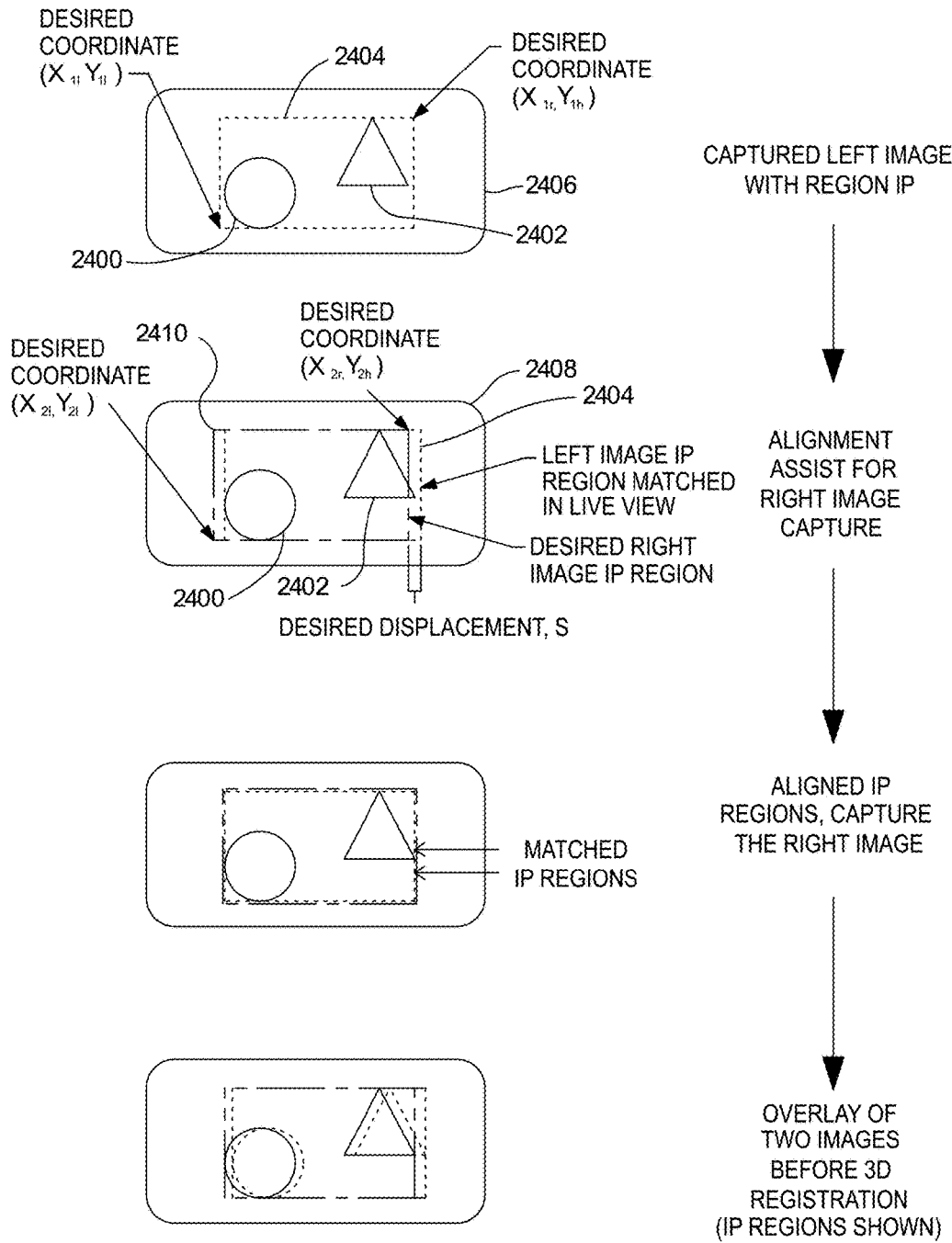
FIG. 24 illustrates an exemplary process of horizontal alignment assistance in accordance with embodiments of the present disclosure.

FIG. 24 illustrates an exemplary process of horizontal alignment assistance in accordance with embodiments of the present disclosure. For proper translation and vertical alignment, the guide region from this process should be aligned as precisely as possible. Referring to FIG. 24, objects 2400 and 2402 are within an interest point set (IP) (area of the image within the broken lines 2404) in a captured left image 2406. In the right image 2408 being shown in a live view on a camera display, the left image IP set 2404 is matched to the objects 2400 and 2402. Also, in the live view of the right image 2408, a desired right image IP set 2410 is displayed. The IP sets 2404 and 2410 serve as alignment guides. When the IP sets 2404 and 2410 are aligned exactly or sufficiently closely, the IP sets are suitably matched and the user knows that the subsequent image may be captured. FIG. 24 presents an example of the guides. In general, the current and target positions can be represented in various graphic forms. The current position can be represented by any set of guides and the target location by a different set of guides. A guide can be any collection of pixels shown on the display 112.

Figure 25:
FIG. 25 illustrates an example of Hough transform lines superimposed for stereo capture according to embodiments of the present disclosure.

In the case where guides beyond displacement and vertical alignment are generated (assisting with perspective alignment, rotation prevention, and the prevention of camera toe-in), FIG. 25 illustrates an example of Hough transform lines superimposed for stereo capture according to embodiments of the present disclosure. Three lines are superimposed on the live view or EVF window that are indicative of vertical alignment and perspective alignment, and three alternately colored lines are similarly superimposed at points on the live view or EVF window at the same distance, S, to the left (assuming left eye capture first) of where the IP region was captured in the first image. The guide region to be shown on the live view screen may be described by the following. Initially, the x-coordinate values of the left and right boundaries of the area defined by the interest point set of the captured left image (IP) are recorded as $X_{1l}$ and $X_{1r}$. The value S is calculated as described, and from this, the target offset coordinates for the right image capture are calculated as $X_{2l}$ and $X_{2r}$. Vertical lines may be superimposed at these coordinates in the live view screen as the "target lines," or another guide mechanism, such as a transparent overlay, may be used. The second guide that is superimposed is the "alignment guide," which represents the position of the left and right boundaries of the region of interest point set area as it is viewed in the live view window.

Figure 27:
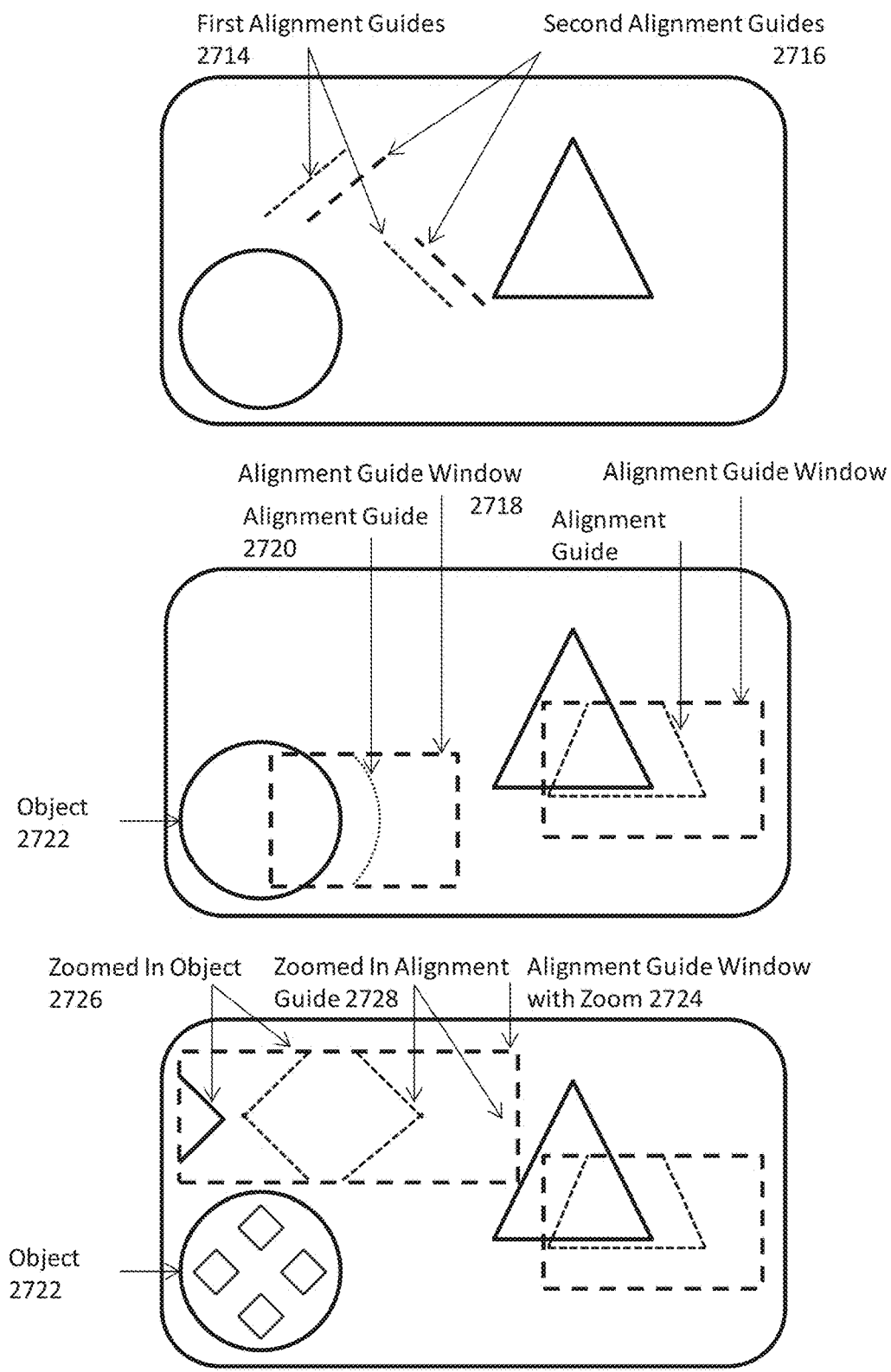
FIG. 27 is another exemplary process of "alignment guide" determination according to embodiments of the present disclosure.

FIG. 27 is another exemplary process of "alignment guide" determination according to embodiments of the present disclosure. Referring to FIG. 27, a position and shape of a first alignment guide 2714 and a second alignment guide 2716 may be calculated by the device based on key points found within the scene being viewed. The guides 2714 and 2716 may or may not have an obvious relationship to objects within the scene. When the camera moves, the key points and alignment guides 2714 and 2716 associated with those points move accordingly. The device displays the alignment guides 2714 and 2716 at the desired location and the user then moves the camera so the first (live-view) alignment guides 2714 align with the second (target) alignment guides 2716.

In accordance with other embodiments of user alignment assistance, one or more windows 2718 may be displayed which contain different alignment guides 2720 to assist the user in moving the camera for capturing the second image. The windows 2718 may include live views of the scene and alignment guides 2720 that are calculated based on various objects 2722 in the image. A feature may also be available which allows the user to control the zoom factor of one or more windows 2724 in order to improve viewing of the enclosed objects 2726 and alignment guides 2728, thus facilitating camera alignment in accordance with embodiments of the presently disclosed disclosure.

Note that although the convergent point at a distance $D_s$ should have zero parallax, the individual image captures do not capture the convergent center as the center of their image. To obtain the convergent view, registration of the image pair after capture must be performed.

Referring to FIG. 22, image generator function 114 determines whether a camera monitoring feature is activated (step 2214). A user of the device 100 may select to activate the camera monitoring feature. If the camera monitoring feature is not activated, the user may input commands for capturing a second image with settings controlled by the camera to provide the same exposure as when the first image was captured (step 2216). When the user is comfortable with the camera alignment, the second image can be captured automatically or the camera can stop capturing images when it is set in a continuous image capture mode. After capture, pairs of the captured images are combined to form a stereoscopic pair (or pairs) that is (are) suitable for three-dimensional registration and compression or rendering.

If the camera monitoring feature is activated, the device 100 may analyze the currently viewed image (step 2218). For example, in this mode, the device 100 continues to monitor the capture window as the user moves the camera in different positions to capture the second/last picture. The device 100 analyzes the image and determines if an ideal location has been reached and the camera is aligned (step 2220). If the ideal location has not been reached and the camera is not aligned, the device 100 may adjust directional feedback relative to its current camera position (step 2222). If the ideal location has not been reached and the camera is not aligned, the second image may be captured automatically when the calculated binocular distance is reached as indicated by proper alignment of the region of interest with the current live view data, and any assistance lines, such as those generated by Hough transform (step 2224).

Figure 28:
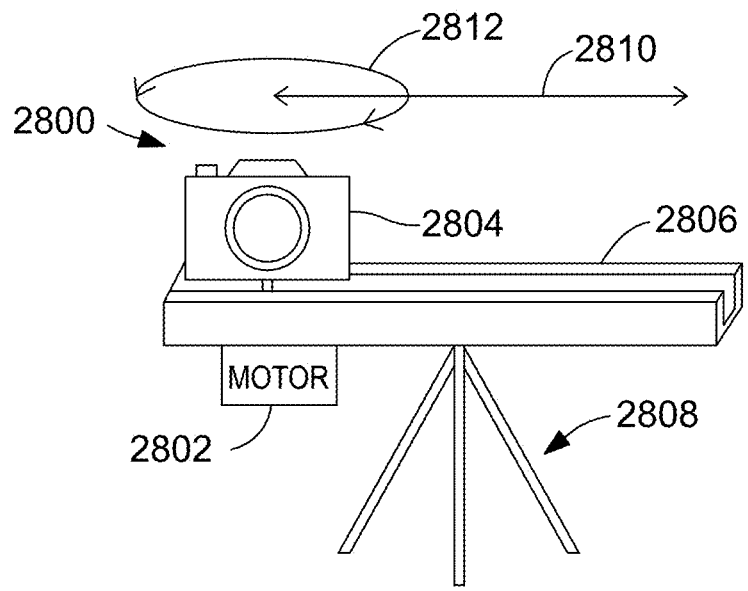
FIG. 28 is a schematic diagram of an exemplary camera-positioning mechanism for automating the camera-assisted image capture procedure according to embodiments of the present disclosure.

Although the camera may be moved manually, a mechanism may automate the movement process. For example, FIG. 28 is a schematic diagram of an exemplary camera-positioning mechanism 2800 for automating the camera-assisted image capture procedure according to embodiments of the present disclosure. Referring to FIG. 28, the mechanism 2800 may include a motorized mounting bracket 2802 which moves a camera 2804 as the camera 2804 calculates when in stereoscopic mode. The mounting bracket 2802 may connect to the camera 2804 via a suitable mount, such as, but not limited to a tripod-type mount. The bracket may rest on a tripod base 2808 or another type of base, such as a shoulder mount or handle, to be held by the user. The bracket may include a set of rails 2806 which allow the camera 2804 to move over it, but constrains the camera so that it can only move in a straight line in the horizontal direction (the direction indicated by direction arrow 2810). The camera 2804 connects to the motor controller via a digital communication interface such as USB or any other external interface. The camera 2804 may use this connection to communicate feedback information about the movement needed for the second/last image to be captured. In addition, the motor controller may control a suitable mechanism for rotating the camera 2804 in a direction indicated by direction arrow 2812.

Figure 29:
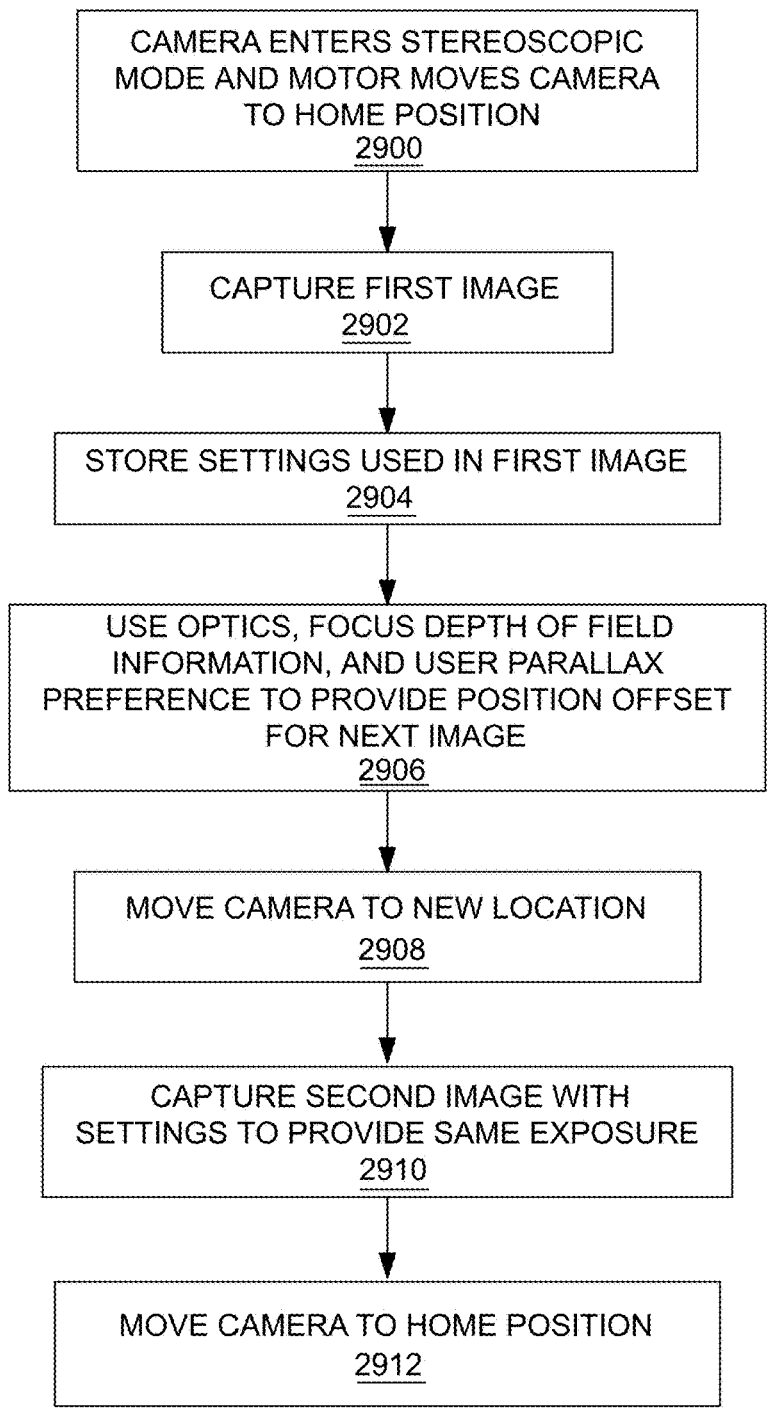
FIG. 29 illustrates an exemplary method of camera-assisted image capture using the automatic camera-positioning mechanism 1500 shown in FIG. 28 according to embodiments of the present disclosure.

FIG. 29 illustrates an exemplary method of camera-assisted image capture using the automatic camera-positioning mechanism 1500 shown in FIG. 28 according to embodiments of the present disclosure. Referring to FIG. 29, when the mechanism 2800 is to be used for the first time, the user may provide input to the camera 2804 for instructing the motor 2802 to move the camera 2804 to the "home" position (step 2900). The home position may be the farthest point of one end of the rails 2806, with the camera viewing angle perpendicular to the path of the rails 2806. The user can then adjust the camera settings and the orientation of the bracket and take a first image (step 2902). The settings used for capturing the first image (e.g., aperture and the like) may be stored for use in capturing subsequent images (step 2904).

At step 2906, the camera 2804 may use optics, focus, depth of field information, user parallax preference, and/or the like to determine position offset for the next image. For example, after the first image is captured, the camera 2804 may communicate feedback information about the movement needed for the second/last shot to the motor controller. The motor 2802 may then move the camera 2804 to a new location along the rails 2806 according to the specified distance (step 2908). When the calculated camera position is reached, the last image may be captured automatically with settings to provide the same exposure as the first image (step 2910). The camera 2804 may then be moved back to the home position (step 2912). Any of the captured images may be used to form stereoscopic pairs used to create three-dimensional images. All of the calculations required to determine the required camera movement distance are the same as those above for manual movement, although the process simplifies since the mount removes the possibility of an incorrect perspective change (due to camera toe-in) that would otherwise have to be analyzed.

The subject matter disclosed herein may be implemented by a digital still camera, a video camera, a mobile phone, a smart phone, phone, tablet, notebook, laptop, personal computer, computer server, and the like. In order to provide additional context for various aspects of the disclosed subject matter, FIG. 30 and the following discussion are intended to provide a brief, general description of a suitable operating environment 3000 in which various aspects of the disclosed subject matter may be implemented. While the presently disclosed subject matter is described in the general context of computer-executable instructions, such as program modules, executed by one or more computers or other devices, those skilled in the art will recognize that the disclosed subject matter can also be implemented in combination with other program modules and/or as a combination of hardware and software.

Generally, however, program modules include routines, programs, objects, components, data structures, etc. that perform particular tasks or implement particular data types. The operating environment 3000 is only one example of a suitable operating environment and is not intended to suggest any limitation as to the scope of use or functionality of the subject matter disclosed herein. Other well-known computer systems, environments, and/or configurations that may be suitable for use with the presently disclosed subject matter include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

Figure 30:
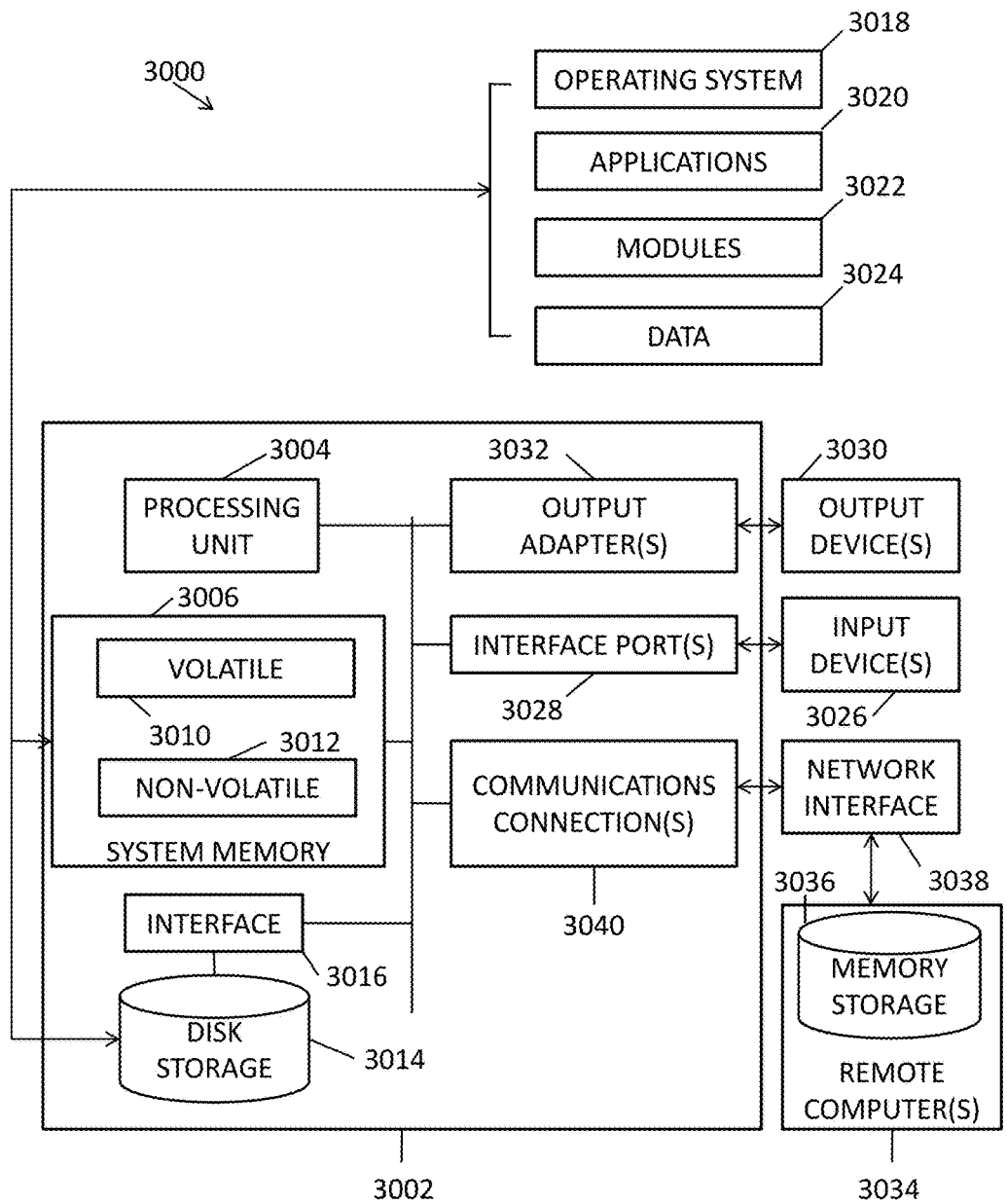
FIG. 30 illustrates an exemplary environment for implementing various aspects of the subject matter disclosed herein.

With reference to FIG. 30, an exemplary environment 3000 for implementing various aspects of the subject matter disclosed herein includes a computer 3002. The computer 3002 includes a processing unit 3004, a system memory 3006, and a system bus 3008. The system bus 3008 couples system components including, but not limited to, the system memory 3006 to the processing unit 3004. The processing unit 3004 can be any of various available processors. Dual microprocessors and other multiprocessor architectures also can be employed as the processing unit 3004.

The system bus 3008 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3006 includes volatile memory 3010 and nonvolatile memory 3012. The basic input/output system (BIOS), containing the basic routines to transfer information between elements within the computer 3002, such as during start-up, is stored in nonvolatile memory 3012. By way of illustration, and not limitation, nonvolatile memory 3012 can include read only memory (ROM), programmable ROM (PROM), electrically programmable ROM (EPROM), electrically erasable ROM (EEPROM), or flash memory. Volatile memory 3010 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESD-RAIVI), Synchlink DRAM (SLDRAM), and direct Rambus RAM (DRRAM).

Computer 3002 also includes removable/nonremovable, volatile/nonvolatile computer storage media. FIG. 30 illustrates, for example, disk storage 3014. Disk storage 3014 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3014 to the system bus 3008, a removable or nonremovable interface is typically used such as interface 3016.

It is to be appreciated that FIG. 30 describes software that acts as an intermediary between users and the basic computer resources described in suitable operating environment 3000. Such software includes an operating system 3018. Operating system 3018, which can be stored on disk storage 3014, acts to control and allocate resources of the computer system 3002. System applications 3020 take advantage of the management of resources by operating system 3018 through program modules 3022 and program data 3024 stored either in system memory 3006 or on disk storage 3014. It is to be appreciated that the subject matter disclosed herein can be implemented with various operating systems or combinations of operating systems.

A user enters commands or information into the computer 3002 through input device(s) 3026. Input devices 3026 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3004 through the system bus 3008 via interface port(s) 3028. Interface port(s) 3028 include, for example, a serial port, a parallel port, a game port, and a universal serial bus (USB). Output device(s) 3030 use some of the same type of ports as input device(s) 3026. Thus, for example, a USB port may be used to provide input to computer 3002 and to output information from computer 3002 to an output device 3030. Output adapter 3032 is provided to illustrate that there are some output devices 3030 like monitors, speakers, and printers among other output devices 3030 that require special adapters. The output adapters 3032 include, by way of illustration and not limitation, video and sound cards that provide a means of connection between the output device 3030 and the system bus 3008. It should be noted that other devices and/or systems of devices provide both input and output capabilities such as remote computer(s) 3034.

Computer 3002 can operate in a networked environment using logical connections to one or more remote computers, such as remote computer(s) 3034. The remote computer(s) 3034 can be a personal computer, a server, a router, a network PC, a workstation, a microprocessor based appliance, a peer device or other common network node and the like, and typically includes many or all of the elements described relative to computer 3002. For purposes of brevity, only a memory storage device 3036 is illustrated with remote computer(s) 3034. Remote computer(s) 3034 is logically connected to computer 3002 through a network interface 3038 and then physically connected via communication connection 3040. Network interface 3038 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3040 refers to the hardware/software employed to connect the network interface 3038 to the bus 3008. While communication connection 3040 is shown for illustrative clarity inside computer 3002, it can also be external to computer 3002. The hardware/software necessary for connection to the network interface 3038 includes, for exemplary purposes only, internal and external technologies such as, modems including regular telephone grade modems, cable modems and DSL modems, ISDN adapters, and Ethernet cards.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed subject matter. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed subject matter. When implemented on a general-purpose processor, the program code combines with the processor to provide a unique apparatus that operates to perform the processing of the presently disclosed subject matter.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. An apparatus for creating a three-dimensional image of a scene, the apparatus comprising:
at least one processor and memory configured to:
receive a plurality of captured images;
determine matching image features among the plurality of captured images;
determine a transformation to align at least one of the matched image features;
apply the transformation to a first captured image among the plurality of captured images such that the first captured image is aligned to a second captured image among the plurality of captured images to create one or more transformed images;
define a transformed image pair using one of transformed and captured images;
calculate at least one stereoscopic parameter utilizing the transformed image pair;
determine whether the calculated stereoscopic parameter does not meet a predetermined criteria;
in response to determining that the calculated stereoscopic parameter does not meet the predetermined criteria, apply a new transformation to the transformed image pair to create an adjusted image pair; and
define a three-dimensional image based on the adjusted image pair.

2. The apparatus of claim 1, wherein at least one stereoscopic parameter is calculated utilizing the matched image features of the transformed image pair.

3. The apparatus of claim 1, further comprising enhancing a depth of a transformed pair of images.

4. The apparatus of claim 1, further comprising automatically determining a left view image and a right view of an image pair for creating a stereoscopic pair.

5. The apparatus of claim 1, further comprising:
determining a parallax disparity between a left view image and a right view image among the captured images;
determining whether the parallax disparity meets a predetermined criteria; and
in response to determining that the parallax disparity does not meet the predetermined criteria, adjusting an attribute of at least one pixel in one of a left view image and a right view image such that the parallax disparity meets predetermined criteria.

6. The apparatus of claim 1, further comprising cropping one of the left view image and the right view of one of the transformed and adjusted image pair.

7. The apparatus of claim 1, further comprising creating a new stereoscopic image by identifying at least a moving object in a pair of images and by modifying at least one of the images to compensate for the moving object by performing at least one of the following operations in the pair of images:
   moving the object to another position of the same image;
   removing the object from an image, and filling the image area corresponding to the removed object by interpolating pixels from the image pair;
   adding an object from one image to the other image in the image pair.

8. A non-transitory computer-readable medium comprising one or more computer-readable instructions that, when executed by at least one processor of a computing device, cause the computing device to:
   receive a plurality of captured images;
   determine matching image features among the plurality of captured images;
   determine a transformation to align at least one of the matched image features;
   apply the transformation to a first captured image among the plurality of captured images such that the first captured image is aligned to a second captured image among the plurality of captured images to create one or more transformed images;
   define a transformed image pair using one of transformed and captured images;
   calculate at least one stereoscopic parameter utilizing the transformed image pair;
   determine whether the calculated stereoscopic parameter does not meet a predetermined criteria;
   in response to determining that the calculated stereoscopic parameter does not meet the predetermined criteria, applying a new transformation to the transformed image pair to create an adjusted image pair; and
   define a three-dimensional image based on the adjusted image pair.

9. The non-transitory computer-readable medium of claim 8, wherein at least one stereoscopic parameter is calculated utilizing the matched image features of the transformed image pair.

10. The non-transitory computer-readable medium of claim 8, further comprising enhancing a depth of a transformed pair of images.

11. The non-transitory computer-readable medium of claim 8, further comprising automatically determining a left view image and a right view of an image pair for creating a stereoscopic pair.

12. The non-transitory computer-readable medium of claim 8, further comprising:
   determining a parallax disparity between a left view image and a right view image among the captured images;
   determining whether the parallax disparity meets a predetermined criteria; and
   in response to determining that the parallax disparity does not meet the predetermined criteria, adjusting an attribute of at least one pixel in one of a left view image and a right view image such that the parallax disparity meets predetermined criteria.

13. The non-transitory computer-readable medium of claim 8, further comprising cropping one of the left view image and the right view of one of the transformed and adjusted image pair.

14. The non-transitory computer-readable medium of claim 8, further comprising creating a new stereoscopic image by identifying at least a moving object in a pair of images and by modifying at least one of the images to compensate for the moving object by performing at least one of the following operations in the pair of images:
   moving the object to another position of the same image;
   removing the object from an image, and filling the image area corresponding to the removed object by interpolating pixels from the image pair;
   adding an object from one image to the other image in the image pair.

15. A system for creating a three-dimensional image of a scene, the system comprising:
   at least one image capture device;
   at least one processor, the processor for:
   receiving a plurality of captured images;
   determining matching image features among the plurality of captured images;
   determining a transformation to align at least one of the matched image features;
   applying the transformation to a first captured image among the plurality of captured images such that the first captured image is aligned to a second captured image among the plurality of captured images to create one or more transformed images;
   defining a transformed image pair using one of transformed and captured images;
   calculating at least one stereoscopic parameter utilizing the transformed image pair;
   determining whether the calculated stereoscopic parameter does not meet a predetermined criteria;
   in response to determining that the calculated stereoscopic parameter does not meet the predetermined criteria, applying a new transformation to the transformed image pair to create an adjusted image pair; and
   defining a three-dimensional image based on the adjusted image pair.

16. The system of claim 15, wherein at least one stereoscopic parameter is calculated utilizing the matched image features of the transformed image pair.

17. The system of claim 15, further comprising enhancing a depth of a transformed pair of images.

18. The system of claim 15, further comprising:
   determining a parallax disparity between a left view image and a right view image among the captured images;
   determining whether the parallax disparity meets a predetermined criteria; and
   in response to determining that the parallax disparity does not meet the predetermined criteria, adjusting an attribute of at least one pixel in one of a left view image and a right view image such that the parallax disparity meets predetermined criteria.

19. The system of claim 15, further comprising cropping one of the left view image and the right view of one of the transformed and adjusted image pair.

20. The system of claim 15, further comprising creating a new stereoscopic image by identifying at least a moving object in a pair of images and by modifying at least one of the images to compensate for the moving object by performing at least one of the following operations in the pair of images:

moving the object to another position of the same image;
removing the object from an image, and filling the image area corresponding to the removed object by interpolating pixels from the image pair;
adding an object from one image to the other image in the image pair.

* * * * *